US007085019B2

(12) United States Patent
Yoshida et al.

(10) Patent No.: US 7,085,019 B2
(45) Date of Patent: Aug. 1, 2006

(54) FACSIMILE APPARATUS

(75) Inventors: Takehiro Yoshida, Tokyo (JP); Motoaki Yoshino, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 959 days.

(21) Appl. No.: 10/106,767

(22) Filed: Mar. 27, 2002

(65) Prior Publication Data

US 2002/0163672 A1 Nov. 7, 2002

(30) Foreign Application Priority Data

| | | | |
|---|---|---|---|
| Mar. 27, 2001 | (JP) | ............................. | 2001-089033 |
| Apr. 10, 2001 | (JP) | ............................. | 2001-110737 |
| Dec. 28, 2001 | (JP) | ............................. | 2001-398785 |

(51) Int. Cl.
*H04M 11/00* (2006.01)
*H04N 1/00* (2006.01)

(52) U.S. Cl. ................. 358/405; 358/406; 379/100.01; 379/100.06

(58) Field of Classification Search ................ 358/400, 358/401, 403, 404, 406, 407, 500, 468, 1.15; 379/100.01, 100.06

See application file for complete search history.

(56) References Cited

U.S. PATENT DOCUMENTS

| | | | | |
|---|---|---|---|---|
| 4,554,592 | A | 11/1985 | Yoshida | 358/257 |
| 4,609,927 | A | 9/1986 | Yoshida | 346/154 |
| 4,727,576 | A | 2/1988 | Yoshida | 379/100 |
| 5,299,257 | A * | 3/1994 | Fuller et al. | 379/100.05 |
| 5,345,517 | A | 9/1994 | Katayama et al. | 382/54 |
| 5,448,654 | A | 9/1995 | Katayama et al. | 382/298 |
| 5,490,199 | A * | 2/1996 | Fuller et al. | 379/1.04 |
| 5,619,344 | A | 4/1997 | Yoshida et al. | 358/468 |
| 5,638,384 | A * | 6/1997 | Hayashi et al. | 714/752 |
| 5,682,248 | A | 10/1997 | Yoshida | 358/404 |
| 5,724,441 | A | 3/1998 | Yoshida | 382/166 |
| 5,748,715 | A * | 5/1998 | Shinagawa et al. | 379/100.13 |
| 5,854,830 | A * | 12/1998 | Kenmochi | 379/100.15 |
| 6,088,128 | A * | 7/2000 | Nishii et al. | 358/434 |
| 6,088,129 | A | 7/2000 | Yoshida | 358/439 |
| 6,275,308 | B1 | 8/2001 | Yoshida | 358/450 |
| 2005/0108584 | A1* | 5/2005 | Kawakami et al. | 713/300 |
| 2005/0210031 | A1* | 9/2005 | Kasatani | 707/10 |

FOREIGN PATENT DOCUMENTS

| | | |
|---|---|---|
| JP | 361242156 | * 10/1986 |

(Continued)

*Primary Examiner*—Jerome Grant, II
(74) *Attorney, Agent, or Firm*—Fitzpatrick, Cella, Harper & Scinto

(57) ABSTRACT

The present invention relates to a facsimile apparatus for providing a single/dual side mixture mode capable of transmitting and receiving original images including single/dual side mixture efficiently. Under control of a CPU 22, information indicating presence/absence of back side image information corresponding to transmission/reception image information is informed together with page number and image front/back information, by a post message signal transmitted from a transmitter to a receiver. If the image information read from a back side of an original is substantially entire-white, the transmitter omits transmission of back side image information having the entire-white. In this case, by informing information indicating absence of back side image information corresponding to front side image information from the transmitter to the receiver by the post message signal, single/dual side mixture image informations can be transmitted and received.

36 Claims, 49 Drawing Sheets

FOREIGN PATENT DOCUMENTS

| | | | |
|---|---|---|---|
| JP | 2-194769 | | 8/1990 |
| JP | 403267870 | * | 11/1991 |
| JP | 405292283 | * | 11/1993 |
| JP | 9-252386 | | 9/1997 |
| JP | 410215360 | * | 8/1998 |
| JP | 11-27434 | | 1/1999 |
| JP | 2000-156771 | | 6/2000 |
| JP | 02003134316 | * | 5/2003 |

* cited by examiner

FIG. 2

| BIT NO. | DIS/DTC | DCS |
|---|---|---|
| X | PRESENCE/ABSENCE OF DUAL-SIDE RECORDING FUNCTION (ALTERNATE MODE) | DUAL-SIDE TRANSMISSION (ALTERNATE MODE) |
| X+1 * | PRESENCE/ABSENCE OF DUAL-SIDE RECORDING FUNCTION (CONTINUOUS MODE) | DUAL-SIDE TRANSMISSION (CONTINUOUS MODE) |

* WHEN BIT X+1 IS SET TO 1 IN DIS/DTC, BIT X IS SET TO 1

| BIT NO. | DIS/DTC | DCS |
|---|---|---|
| Z | PRESENCE/ABSENCE OF DUAL/SINGLE SIDE MIXTURE RECORDING FUNCTION (ALTERNATE MODE) | DUAL/SINGLE SIDE MIXTURE TRANSMISSION (ALTERNATE MODE) |
| Z+1 * | PRESENCE/ABSENCE OF DUAL/SINGLE SIDE MIXTURE RECORDING FUNCTION (CONTINUOUS MODE) | DUAL/SINGLE SIDE MIXTURE TRANSMISSION (CONTINUOUS MODE) |

* WHEN BIT Z+1 IS SET TO 1 IN DIS/DTC, BIT Z IS SET TO 1

EXAMPLE OF DUAL/SINGLE SIDE MIXTURE COMMUNICATION IN ALTERNATE MODE (NON ECM)

EXAMPLE OF DUAL/SINGLE SIDE MIXTURE COMMUNICATION IN ALTERNATE MODE (ECM)

EXAMPLE OF DUAL/SINGLE SIDE MIXTURE COMMUNICATION IN CONTINUOUS MODE (NON ECM)

(1ST PAGE DUAL-SIDE INFO
2ND PAGE SINGLE-SIDE INFO
3RD PAGE DUAL-SIDE INFO)

EXAMPLE OF DUAL/SINGLE SIDE MIXTURE COMMUNICATION IN CONTINUOUS MODE (ECM)

FIG. 19

| BIT NO. | DIS/DTC | DCS |
|---|---|---|
| X | PRESENCE/ABSENCE OF DUAL-SIDE RECORDING FUNCTION (ALTERNATE MODE) | DUAL-SIDE TRANSMISSION (ALTERNATE MODE) |
| X+1 * | PRESENCE/ABSENCE OF DUAL-SIDE RECORDING FUNCTION (CONTINUOUS MODE) | DUAL-SIDE TRANSMISSION (CONTINUOUS MODE) |

* WHEN BIT X+1 IS SET TO 1 IN DIS/DTC, BIT X IS SET TO 1

| BIT NO. | DIS/DTC | DCS |
|---|---|---|
| Y | PRESENCE/ABSENCE OF DUAL/SINGLE SIDE MIXTURE MODE | DESIGNATION OF DUAL/SINGLE SIDE MIXTURE MODE |

FIG. 29

| BIT NO. | DIS/DTC | DCS |
|---|---|---|
| X | PRESENCE/ABSENCE OF DUAL-SIDE RECORDING FUNCTION (ALTERNATE MODE) | DUAL-SIDE TRANSMISSION (ALTERNATE MODE) |
| X+1 | PRESENCE/ABSENCE OF DUAL-SIDE RECORDING FUNCTION (CONTINUOUS MODE) | DUAL-SIDE TRANSMISSION (CONTINUOUS MODE) |
| Y | PRESENCE/ABSENCE OF DUAL/SINGLE SIDE MIXTURE RECEPTION FUNCTION (ALTERNATE MODE) | DESIGNATION OF DUAL/SINGLE SIDE MIXTURE TRANSMISSION (ALTERNATE MODE) |
| Y+1 | PRESENCE/ABSENCE OF DUAL/SINGLE SIDE MIXTURE RECEPTION FUNCTION (CONTINUOUS MODE) | DESIGNATION OF DUAL/SINGLE SIDE MIXTURE TRANSMISSION (CONTINUOUS MODE) |

FIG. 30

ONLY IN ECM (PC, BC, FC)

| | | | | | | | | | | | | |
|---|---|---|---|---|---|---|---|---|---|---|---|---|
| FLAG | ADDRESS | CONTROL | FCF | PC | BC | FC | LENGTH | PAGE NUMBER | PAGE INFORMATION | ENTIRE PAGE NUMBER | FCS | FLAG |

ALTERNATE MODE (NON ECM)

ALTERNATE MODE (ECM)

CONTINUOUS MODE (NON ECM)

CONTINUOUS MODE (ECM)

FACSIMILE APPARATUS

BACKGROUND OF THE INVENTION

1. Field of the Invention

The present invention relates to a facsimile apparatus capable of effecting dual-side transmission of dual-side information between a transmitter and a receiver, a method for controlling such a facsimile apparatus, and a control program.

2. Related Background Art

In conventional facsimile apparatuses, fundamentally, single-side information of an original has been transmitted and a receiver has recorded the received image on a single side of a sheet. In old ITU-T Recommendation T.4 and T.30, only such single-side transmission is described.

However, recently, interest regarding the saving of resources has been increased, and, in many printers and copying machines, a so-called dual-side recording system in which the recording is effected on front and back sides of a single paper has been adopted. To this end, a standard regarding dual-side facsimile transmission was advised in ITU-T on February, 2000.

In new ITU-T Recommendation T.30 or its tentative plan, as dual-side image information transferring systems, a dual-side alternate transferring (alternate mode) in which an image on a front side of an original and an image on a back side of the original are alternately transmitted for each page, and a dual-side continuous transferring (continuous mode) in which all of images on front sides of all originals are transmitted and then all of images on back sides of the originals are transmitted are defined.

The dual-side transmission according to the new ITU-T Recommendation T.30 or its tentative plan is based on assumption that the original is dual-side original, i.e., the original always includes useful images on its both sides, and, thus, even when the dual-side originals and single-side originals (including entire-white (or all-blank) informations on their back sides) are mixed, it was necessary that the back side informations (entire-white informations) of the single-side originals be transmitted.

Thus, when originals including mixture of the single-side originals and the dual-side originals are transmitted, if a rate of the single-side originals in the mixed originals is great, the total transmitting time will be increased because the back sides of entire-white informations must be transmitted, thereby wasting the transmitting cost.

At present, although the transmission of the mixed informations of single-side information and dual-side information is not recommended in ITU-T, there is a need for a single/dual side mixture mode which can be realized by simple protocol (for example, by using the already recommended protocol) or without greatly modifying such protocol and in which original images of the single/dual side mixture can be transmitted efficiently.

On the other hand, a technique in which header information is recorded at a receiver side is well known. The header information is information obtained by forming transmission date/time, identification number (telephone number, mail address and the like) of a calling station, name of the calling station (or any user-defined character train), page number and the like as images by using a character generator (in many cases, such image data are produced at a calling side) and to be recorded on a head portion of a recording paper and also referred to as calling side information.

In consideration of a combination of the recording of the header information and a specification of the above-mentioned ITU-T Recommendation T.30 in which the entire-white information must be transmitted formally even in the single-side original, there is adopted a specification in which the header information is recorded even on the recording paper having the entire-white (or all-blank) surface. However, although it is natural in the specification style, if only the header information is recorded on the white paper, the user at the receiver side will feel a strange impression.

SUMMARY OF THE INVENTION

An object of the present invention is to provide a single/dual side mixture mode in which the above-mentioned conventional problems can be eliminated and single/dual side mixture original images can be transmitted and received efficiently.

Another object of the present invention is to eliminate the above-mentioned conventional problems and to permit transmission/reception of single/dual side mixture original images efficiently or without reducing transmission exchangeability, and to permit recording of natural header information even in the single/dual side mixture original images without affording a strange impression to the user at a receiver side.

BRIEF DESCRIPTION OF THE DRAWINGS

FIG. 2 is a table showing FIF of DIS/DTC and DCS signals used in dual-side transferring according to the present invention;

FIG. 19 is a table showing FIF of DIS/DTC and DCS signals used in dual-side transferring according to a second embodiment of the present invention;

FIG. 29 is a table showing FIF of DIS/DTC and DCS signals used in dual-side transferring according to the third embodiment of the present invention;

FIG. 30 is an explanatory view showing format of a post message signal used in the dual-side transferring according to the present invention;

DETAILED DESCRIPTION OF THE PREFERRED EMBODIMENTS

The present invention will now be explained in connection with embodiments thereof with reference to the accompanying drawings.

First Embodiment

Figure 1:
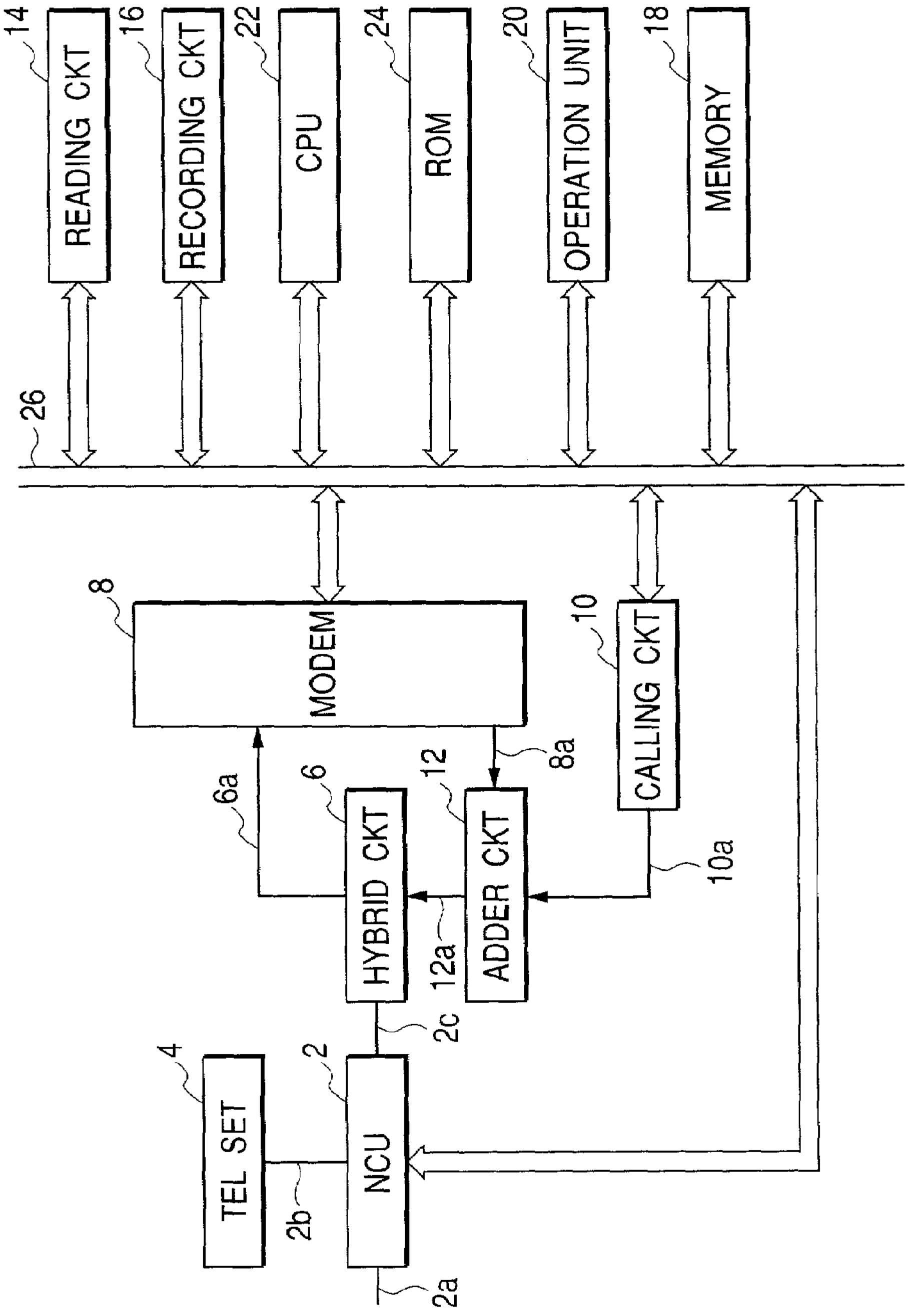
FIG. 1 is a block diagram showing a hardware arrangement of a facsimile apparatus to which the present invention is adopted.

FIG. 1 shows a hardware arrangement of a facsimile apparatus to which the present invention is adopted. In FIG. 1, an NCU (network control unit) 2 serves to be connected to a terminal of a telephone circuit to utilize a telephone network in data communication and to effect connection control of a telephone exchange network and/or to effect switching to a data communication path and/or to hold a loop. The NCU 2 serves to connect a telephone line 2*a* to a telephone set 4 (CML OFF) or connect the telephone line 2*a* to a facsimile apparatus (CML ON), in accordance with control from a bus 26. In a normal condition, the telephone line 2*a* is connected to the telephone set 4.

A hybrid circuit 6 serves to separate signals in a transmitting system from signals in a receiving system, to send a transmission signal from an adder circuit 12 to the telephone line 2*a* through the NCU 2, and to receive a signal from the other party and to send it to a MODEM 8 through a signal line 6*a*.

The MODEM 8 serves to effect modulation and demodulation on the basis of ITU-T Recommendation V.8, V.21, V.27ter, V.29, V.17 and V.34, and various transferring modes are designated by the control from the bus 26. The MODEM 8 serves to input a transmission signal from the bus 26, to output modulation data to a signal line 8*a*, to input a reception signal being outputted to the signal line 6*a*, and to output demodulation data to the bus 26.

A calling circuit 10 serves to input telephone number information and to output a selection signal in the form of DTMF to a signal line 10*a*, in accordance with the control from the bus 26.

The adder circuit 12 serves to input information on the signal line 8*a* and information on the signal line 10*a* and to output an added result to a signal line 12*a*.

A reading circuit 14 capable of reading dual-side informations on an original is constituted by an optical reading element and an original conveying system and serves to output read data to the bus 26. Any arrangement of the original conveying system for reading the dual-side information can be used, and, for example, an arrangement in which informations are read from both sides of the original while reversing the original from a front side to a back side or a semi-automatic arrangement in which, after informations on front sides of the originals are read, an operator reverses the original stack and then informations on back sides of the originals are read may be used.

A recording circuit 16 capable of recording the dual-side informations serves to record the information being outputted to the bus 26 successively line by line. In the illustrated embodiment, the recording circuit 16 is constituted by a recording mechanism such as a laser beam printer having a recording paper reversing mechanism (not shown).

A memory circuit 18 includes a RAM (or a read/write memory such as a hard disk drive) and is used as a work area for a CPU 22 which will be described later. The read or received image data is stored in the memory in the form of row data or coded data, and other control data are also stored. Access to the memory circuit 18 is effected via the bus 26.

An operation unit 20 includes a one-touch dial, abbreviation dial, ten-key, * key, # key, start key, stop key, set key, dual-side transmission selection key and other function keys, and informations obtained by manipulating these keys are outputted to the bus 26. The operation unit 20 is provided with a display portion comprised of display elements such as LCD's, which is used to monitor an operating condition of the apparatus or as a user interface for effecting various setting operations. Access to the operation unit 20 is effected via the bus 26.

The CPU (central processing unit) 22 serves to control the entire operation of the facsimile apparatus and to execute facsimile transfer control procedure, and a control program therefore is stored in a ROM 24. The bus 26 for the CPU 22 is constituted by an address bus and a data bus.

In the illustrated embodiment, information representing presence/absence of back side image information corresponding to transmission image information can be informed by using a procedure signal sent from the transmitter to the receiver. Accordingly, if the transmitter does not transmit back side image information corresponding to certain image information, single/dual side mixture image information can be transmitted and received by informing the receiver of information representing absence of the back side image information corresponding to the transmission image information from the transmitter via said procedure signal.

Now, the communication procedure for dual-side transferring in the illustrated embodiment will be briefly described with reference to FIGS. 2 to 11.

As communication modes for the dual-side transferring, there are two modes, i.e., an alternate mode (dual-side alternate transferring mode) and a continuous mode (dual-side continuous transferring mode). The former is a mode in which front sides and back sides of respective originals (such as a front side and a back side of a first page, a front side and a back side of a second page, and so on) are alternately transferred. On the other hand, the latter is a mode in which only front sides of originals (such as a front side of a first page, a front side of a second page, . . . and so on) are transferred in a page order and then back sides of the originals (such as a back side of the first page, a back side of the second page, . . . and so on) are transferred in a page order. The facsimile apparatus can utilize either of these modes in accordance with its mounting style.

Although the alternate mode and the continuous mode are well known in the ITU-T Recommendation T.30, in the illustrated embodiment, a dual/single side mixture mode is also defined. It is desirable that the dual/single side mixture mode can be used in both the alternate mode and the continuous mode, and accordingly, in the illustrated embodiment, an alternate dual/single side mixture mode and a continuous dual/single side mixture mode are defined.

In the alternate dual/single side mixture mode and the continuous dual/single side mixture mode according to the illustrated embodiment, on the basis of a post message signal (more specifically, Q signal or PPS-Q signal) immediately after front side image data of a certain original is transmitted, it can be designated or determined whether the transmission of the back side information of this page is skipped (not transmitted).

The use of either of known alternate mode, known continuous mode, alternate dual/single side mixture mode according to the illustrated embodiment and continuous dual/single side mixture mode according to the illustrated embodiment can be negotiated,between the transmitter and the receiver by using a DIS signal (digital identification signal: transmitted from an image receiving station), a DTC signal (digital transmission command signal: transmitted from an image transmitting station) and a DCS signal (digital command signal: transmitted from the image transmitting station).

FIG. 2 shows format of the DIS/DTC/DCS signals used in the illustrated embodiment.

As shown in FIG. 2, in the DIS/DTC signals, presence/absence of a dual-side recording function in the alternate mode is represented by bit X of FIF (although the bit number is indicated by "X" in FIG. 2, actually 113), and presence/absence of a dual-side recording function in the continuous mode is represented by bit (X+1) of FIF (actually 114). Further, in the DCS signal, dual-side transmission in the alternate mode is designated by bit X of FIF (actually 113) and dual-side transmission in the continuous mode is designated by bit (X+1) of FIF (actually 114).

Further, presence/absence of a receiving function in the alternate dual/single side mixture reception mode (i.e., function for receiving mixture information of dual side information and single-side information in the alternate mode) is represented by bit Z of FIF (any possible bit may be used in accordance with construction of FIF or Recommendation) in the DIS/DTC signals. Further, in the DCS signal, presence/absence of a transmitting function in the alternate dual/single side mixture transmission mode (i.e., function for transmitting mixture information of dual side information and single-side information in the alternate mode) is designated by bit Z of FIF.

Similarly, presence/absence of a receiving function in the continuous dual/single side mixture reception mode (i.e., function for receiving mixture information of dual side information and single-side information in the continuous mode) is represented by bit (Z+1) of FIF in the DIS/DTC signals, and presence/absence of a transmitting function in the continuous dual/single side mixture transmission mode (i.e., function for transmitting mixture information of dual side information and single-side information in the continuous mode) is designated by bit (Z+1) of FIF in the DCS signal.

Since bit X and bit (X+1) are well known, after all, only bit Z and bit (Z+1) may be added to FIF of the DIS/DCS/

DTC signals to realize transmission and reception of the dual/single side mixture information in the illustrated embodiment.

Figure 3:
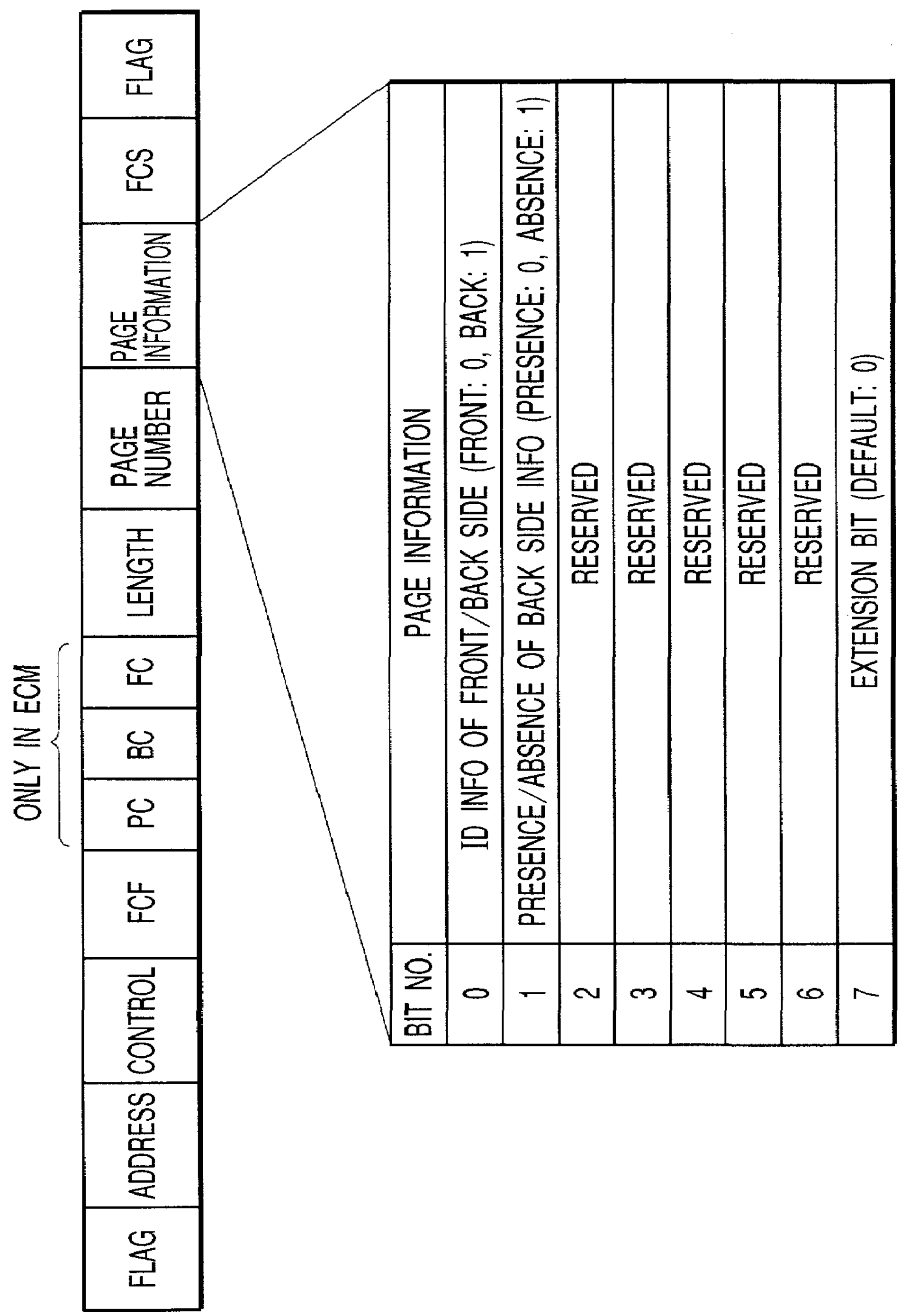
FIG. 3 is an explanatory view showing format of a post message signal used in the dual-side transferring according to the present invention.

Now, construction of the post massage signal (Q signal) transmitted to follow the image message is shown in FIG. 3.

FIG. 3 shows a frame structure of the Q signal (more specifically, EOP (end-of-page) or MPS (multi page) or EOM (end-of-message) signal or the like) in normal G3 transferring and the PPS-Q signal (more specifically, post massage signal such as PPS-EOP or PPS-MPS or PPS-EOM or PPS-NULL signal).

As shown in FIG. 3, in these post massage signals, after Flag (flag), Address (address), Control (control data), FCF (facsimile information field), PC (page counter), BC (block counter) and FC (frame counter), Length (total octet number of Page numbers (2 octets) and Page information (presently 1 octet)) and Page number (added one page by one page from a first page in a case where a front side and a back side of a dual-side originals are transmitted in a page order)) are transmitted.

Although the following Page Information (page information) serves to transmit information regarding the pages transmitted, an arrangement thereof is more or less differs from that in the conventional post massage signal. That is to say, in the Page Information according to the illustrated embodiment, a front side (set to 0) or a back side (set to 1) is designated by bit 0 (similar to the prior art), and further, it can be designated whether the back side information is not transmitted (set to 1) or the back side information is transmitted (set to 0) on the basis of bit 1 which was not used in the prior art (refer to a lower table in FIG. 3).

Further, following to the Page Information, FCS (frame check sequence) and Flag (flag) are transmitted.

Incidentally, since the bit 1 in the Page Information represents presence/absence of transmission of the corresponding back side information, naturally, it is effectively interpreted at the signal receiving side only when the front side is designated by bit 0.

After all, in the post message signal, in order to realize transmission and reception of the dual/single side mixture information in the illustrated embodiment, bit 1 may merely be added to Page Information in FIF of the Q or PPS-Q signal as new bit.

Incidentally, three factors, i.e., Length, Page number and Page information are not included in the conventional single-side protocol and are octets newly added for the dual-side transferring. Further, here, PC, BC and FC are not included in the post message signal used in the normal G3 communication, and they are used only in the PPS-Q signal used in the ECM communication.

Next, FIGS. 4 to 7 show states of communications in a known alternate mode (non-ECM), an alternate mode (ECM), a continuous mode (non-ECM) and a continuous mode (ECM) in the normal G3 mode, respectively.

As shown in FIGS. 4 to 7, the dual-side transferring function of the receiver is indicated by bit X and bit (X+1) in the DIS signal (permitted in both the alternate and continuous modes), and the dual-side transferring mode to be carried out by the transmitter is declared by bit X and bit (X+1) in the DCS signal. In the continuous modes shown in FIGS. 6 and 7, the execution of transmission in the continuous mode is declared by setting bit (X+1) in the DCS signal to 1.

Figure 4:
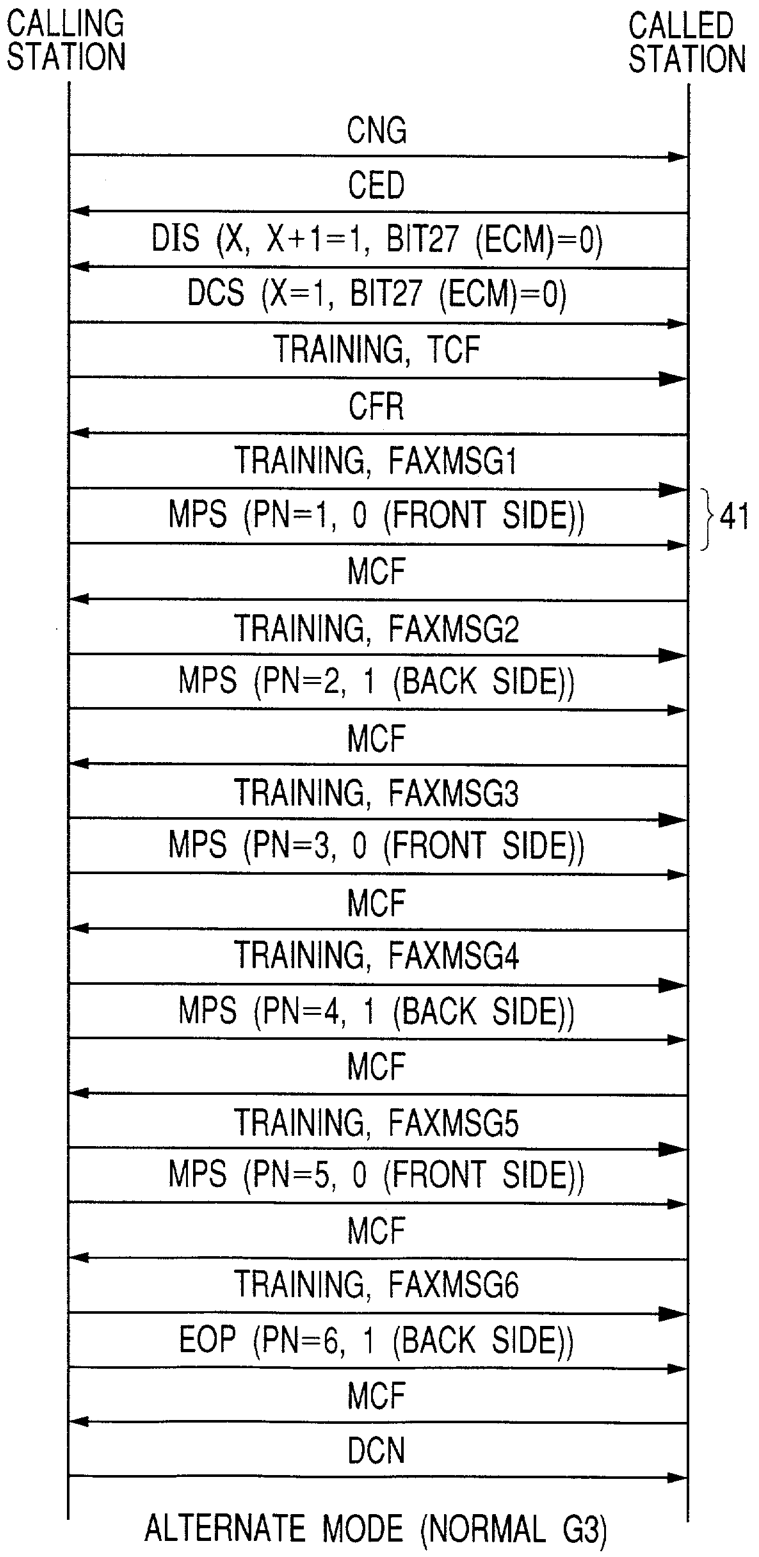
FIG. 4 is an explanatory view showing a state of dual-side transmission at an alternate mode in a non-ECM transmission mode.
Figure 5:
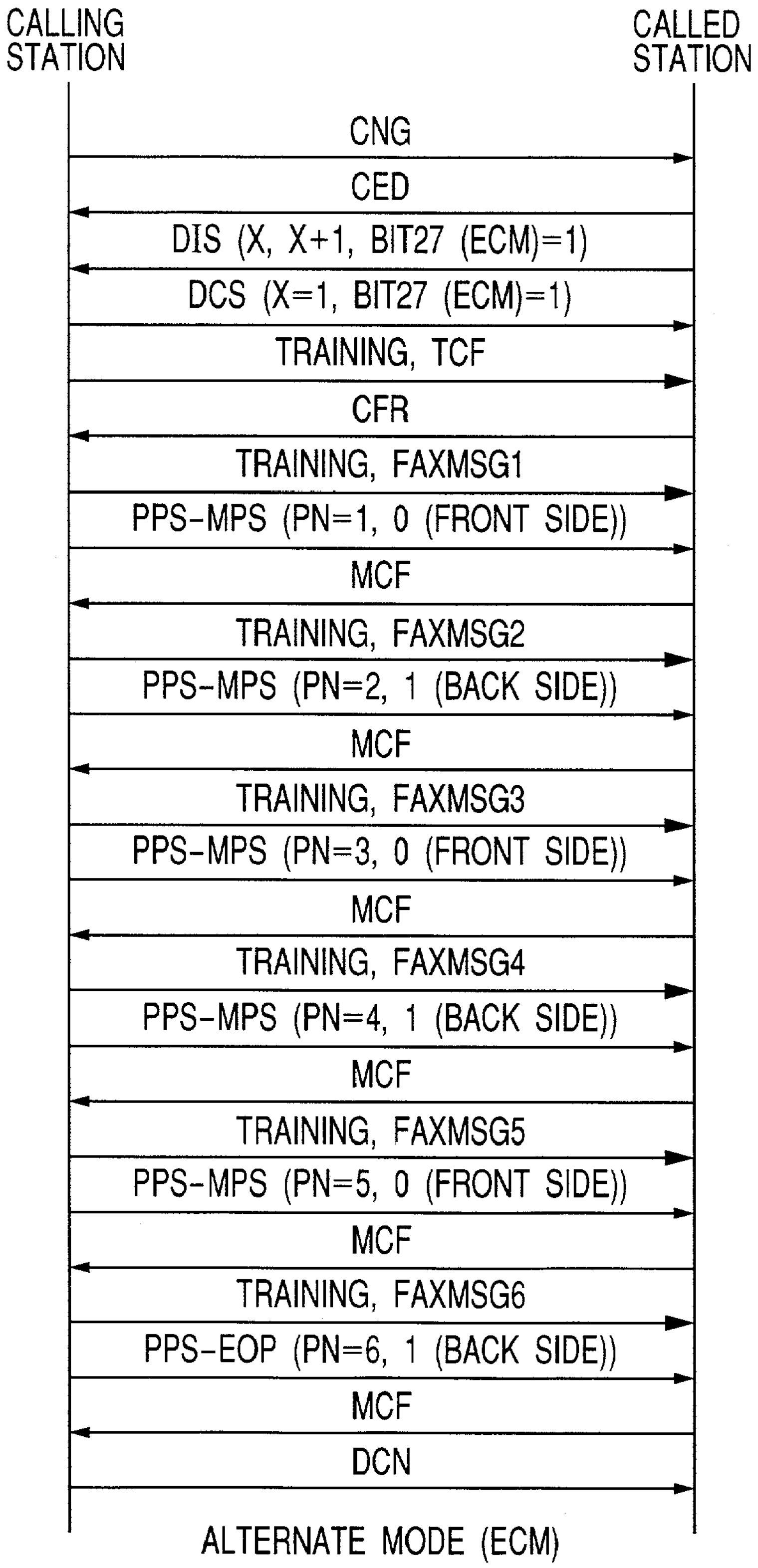
FIG. 5 is an explanatory view showing a state of dual-side transmission at an alternate mode in an ECM transmission mode.
Figure 6:
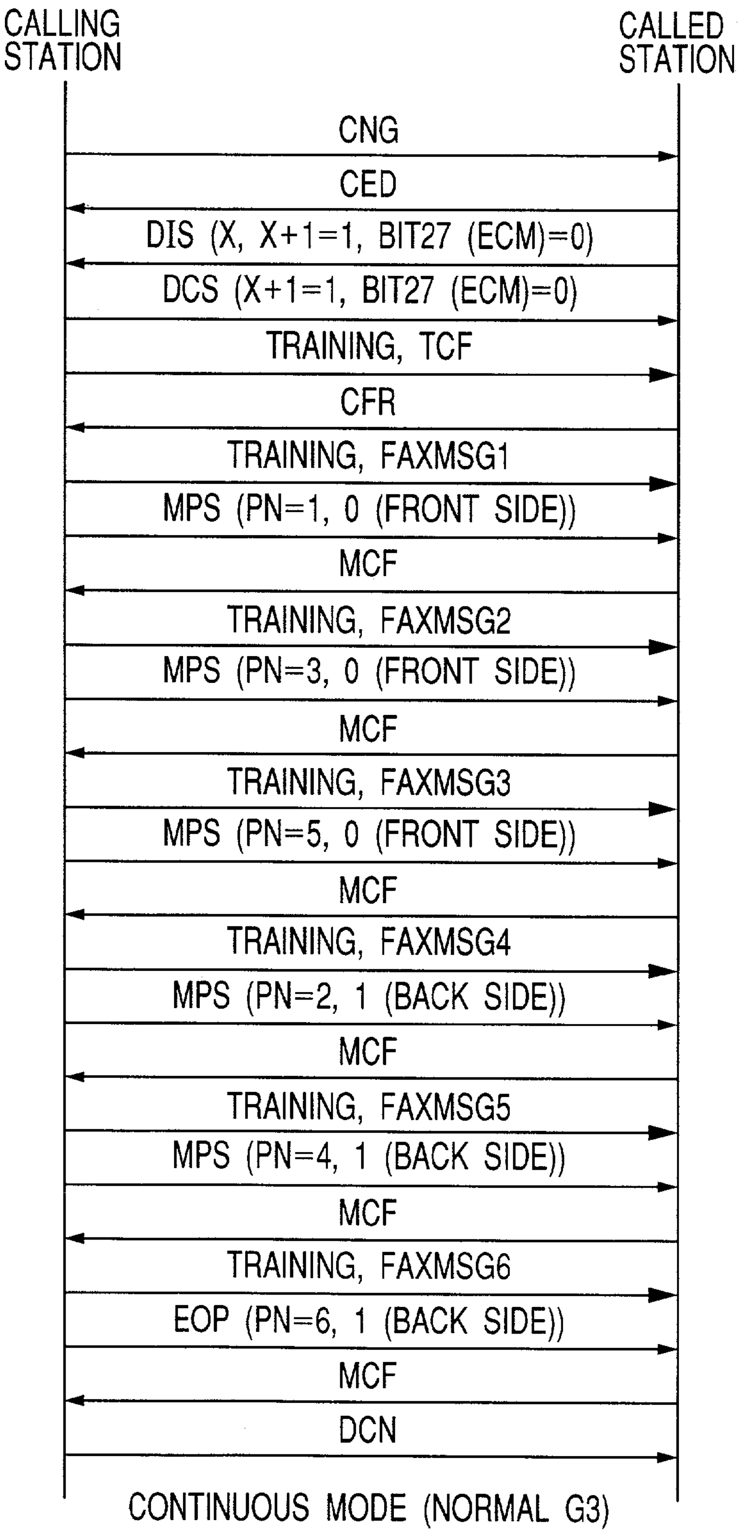
FIG. 6 is an explanatory view showing a state of dual-side transmission at a continuous mode in the non-ECM transmission mode.
Figure 7:
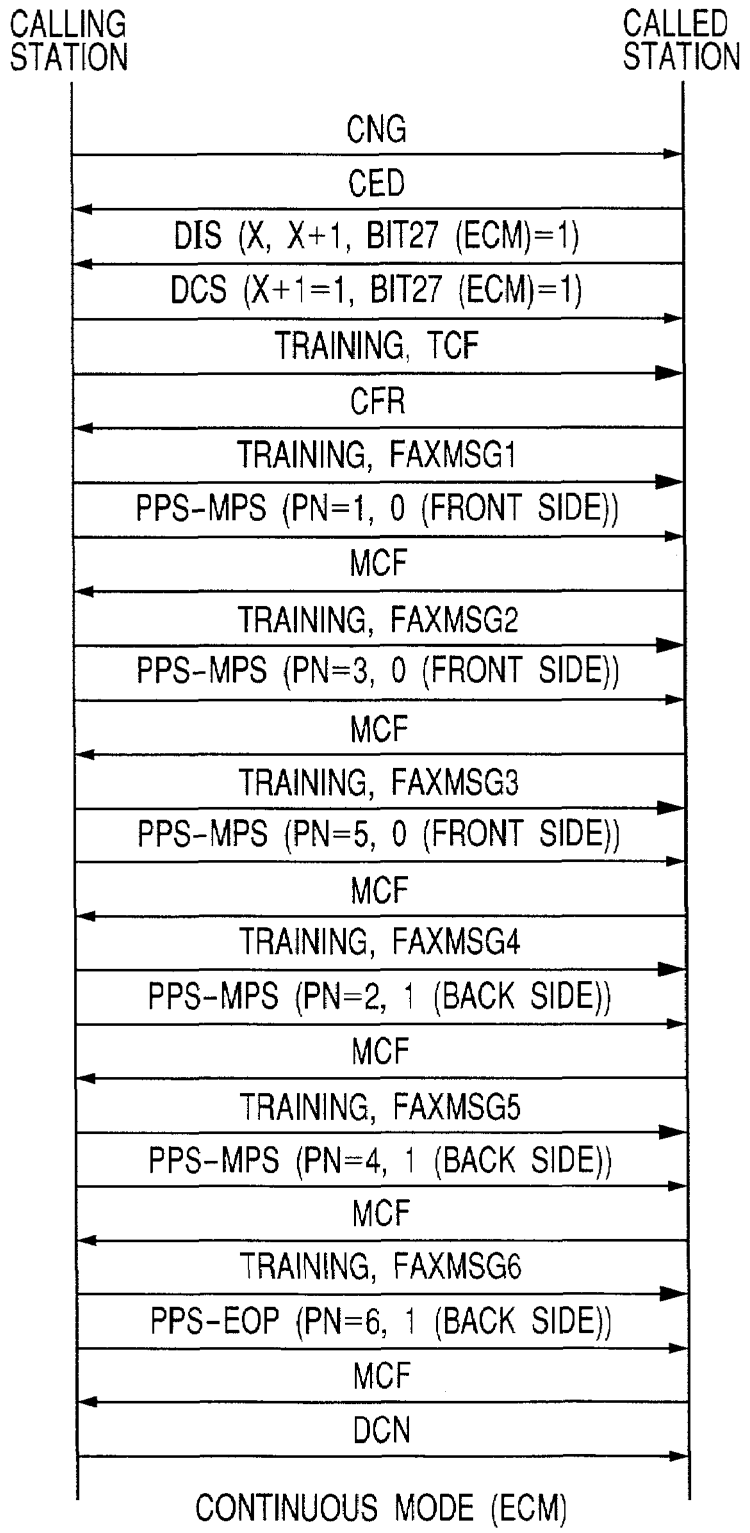
FIG. 7 is an explanatory view showing a state of dual-side transmission at a continuous mode in the ECM transmission mode.

Further, as shown in FIGS. 4 and 6, in the normal mode, the MPS signal is used as the post message signal, and, as shown in FIGS. 5 and 7, in case of ECM, the PPS-MPS signal is used as the post message signal.

Here, three dual-side originals are transmitted, and "PN" in FIGS. 4 to 7 shows the Page Number.

For example, although the MPS signal designated by the reference numeral 41 in FIG. 4 (alternate mode) is shown as "MPS (PN=1, 0 (front side))", this indicates the fact that the image information on the front side (0) of the page number 1 (PN=1) is transmitted (expression of the MPS or PPS-MPS signal shown in FIG. 5 and so on is the same as the above).

That is to say, in the alternate modes shown in FIGS. 4 and 5, the image informations on the originals are transmitted in order of a front side (0) of a first original (PN=1), a back side (1) of the first original (PN=2), a front side (0) of a second original (PN=3), a back side (1) of the second original (PN=4), a front side (0) of a third original (PN=5), a back side (1) of the third original (PN=6).

Further, in the continuous modes shown in FIGS. 6 and 7, the image informations on the originals are transmitted in order of a front side (0) of a first original (PN=1), a front side (0) of a second original (PN=3), a front side (0) of a third original (PN=5), a back side (1) of the first original (PN=2), a back side (1) of the second original (PN=4), a back side (1) of the third original (PN=6).

Incidentally, in the communications shown in FIGS. 4 to 7, the transmitter and the receiver both utilize only the known dual-side communication protocol and do not use bit Z and bit (Z+1) in the DIS/DCS/DTC signals and also do not use bit 1 of Page information of the post massage signal.

FIGS. 8 to 11 show states of communications in a dual/single side mixture mode (non-ECM) in the alternate communication according to the illustrated embodiment, a dual/single side mixture mode (ECM) in the alternate communication, a continuous dual/single side mixture mode (non-ECM) and a continuous dual/single side mixture mode (ECM), respectively.

Many parts of the communications shown in FIGS. 8 to 11 are similar to those of the communications shown in FIGS. 4 to 7, and, although explanation of the same or similar parts will be omitted, the differences from FIGS. 4 to 7 are application manner of page number of Page information and format of procedure signals to be changed.

That is to say, in the communications shown in FIGS. 8 to 11, three originals are transmitted, and contents thereof are first original=dual-side informations, second original=single-side information and third original=dual-side informations.

Figure 8:
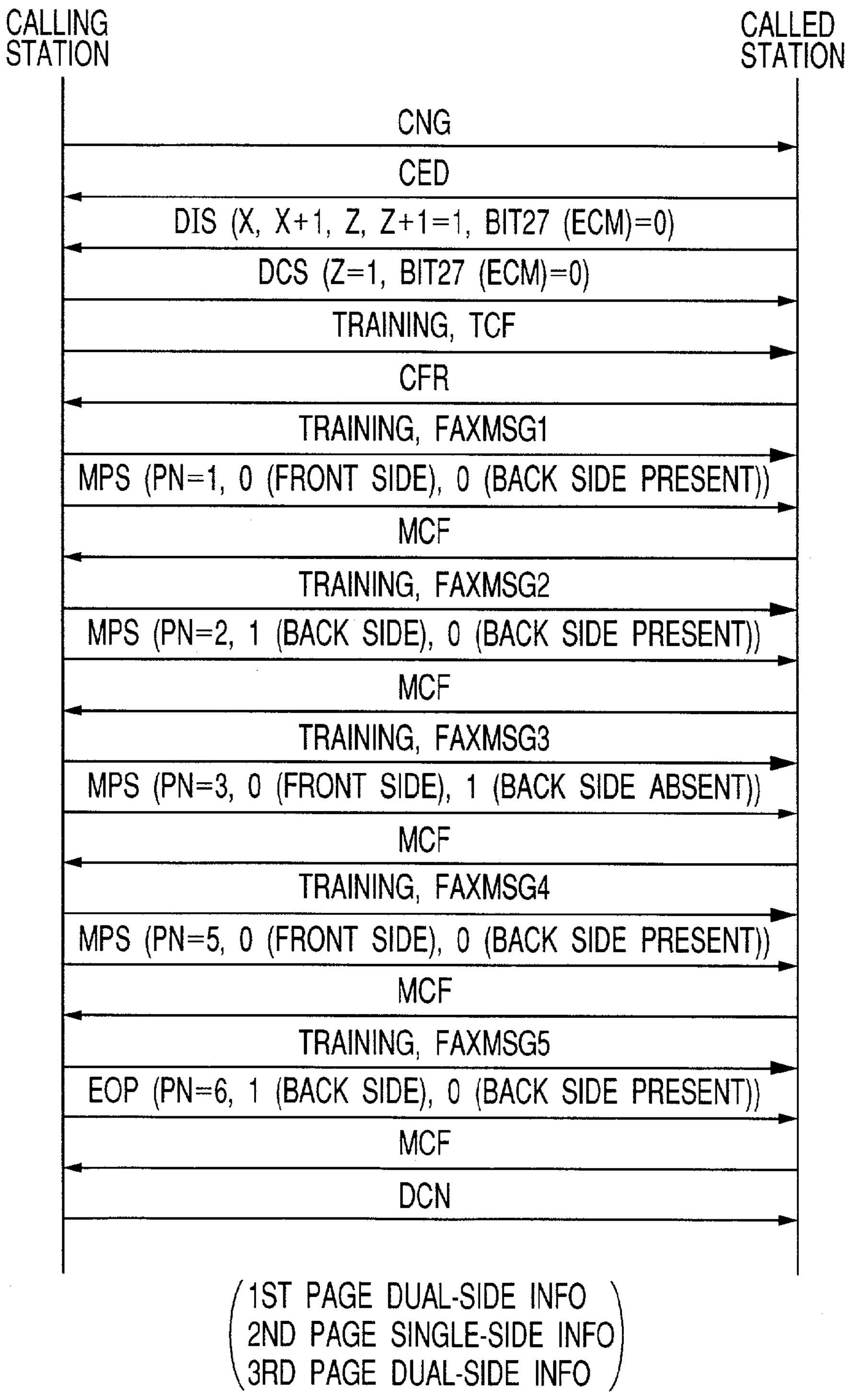
FIG. 8 is an explanatory view showing a state of dual-side transmission at an alternate dual/single side mixture reception mode (non-ECM) according to the present invention.
Figure 9:
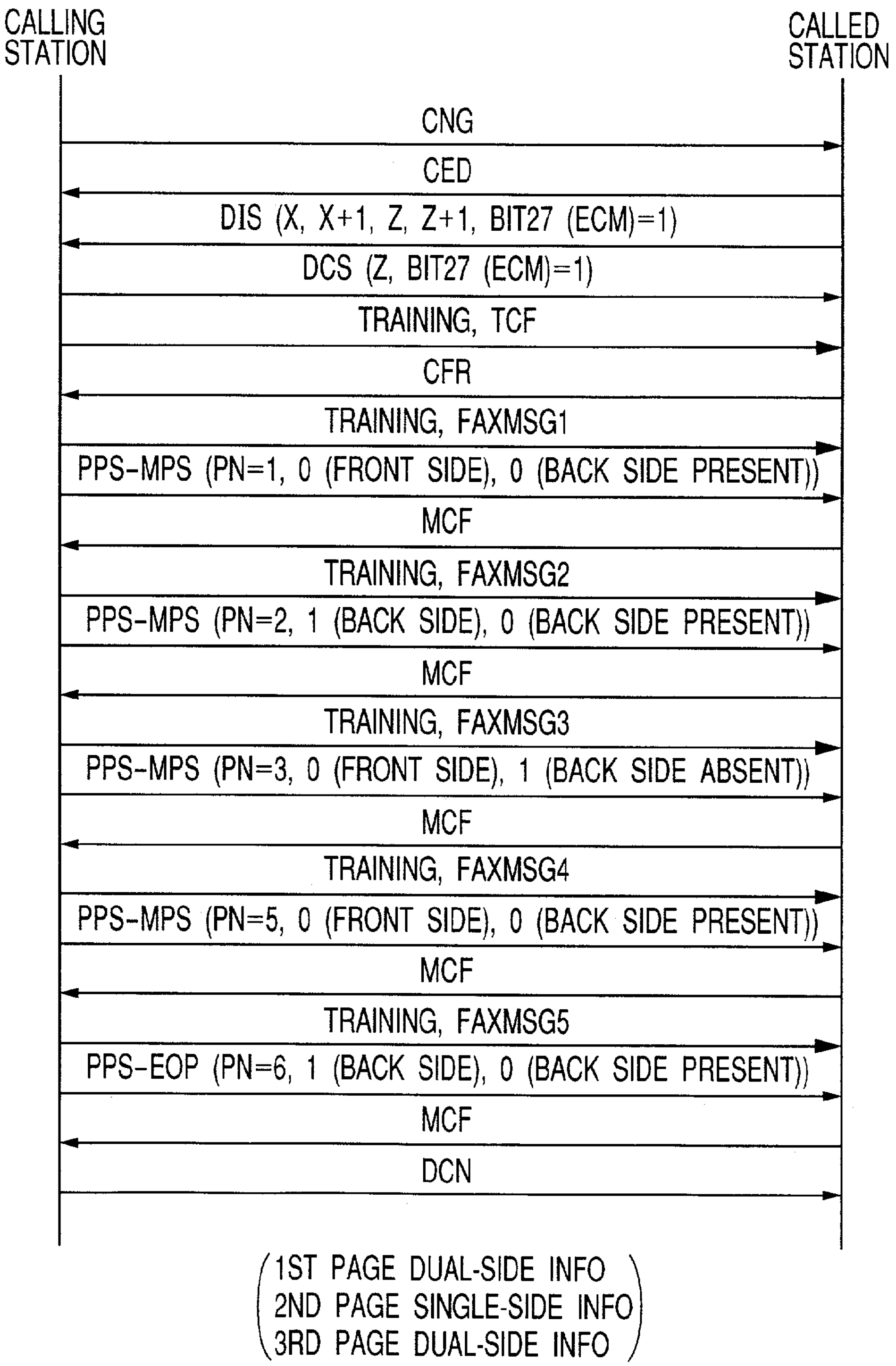
FIG. 9 is an explanatory view showing a state of dual-side transmission at an alternate dual/single side mixture reception mode (ECM) according to the present invention.
Figure 10:
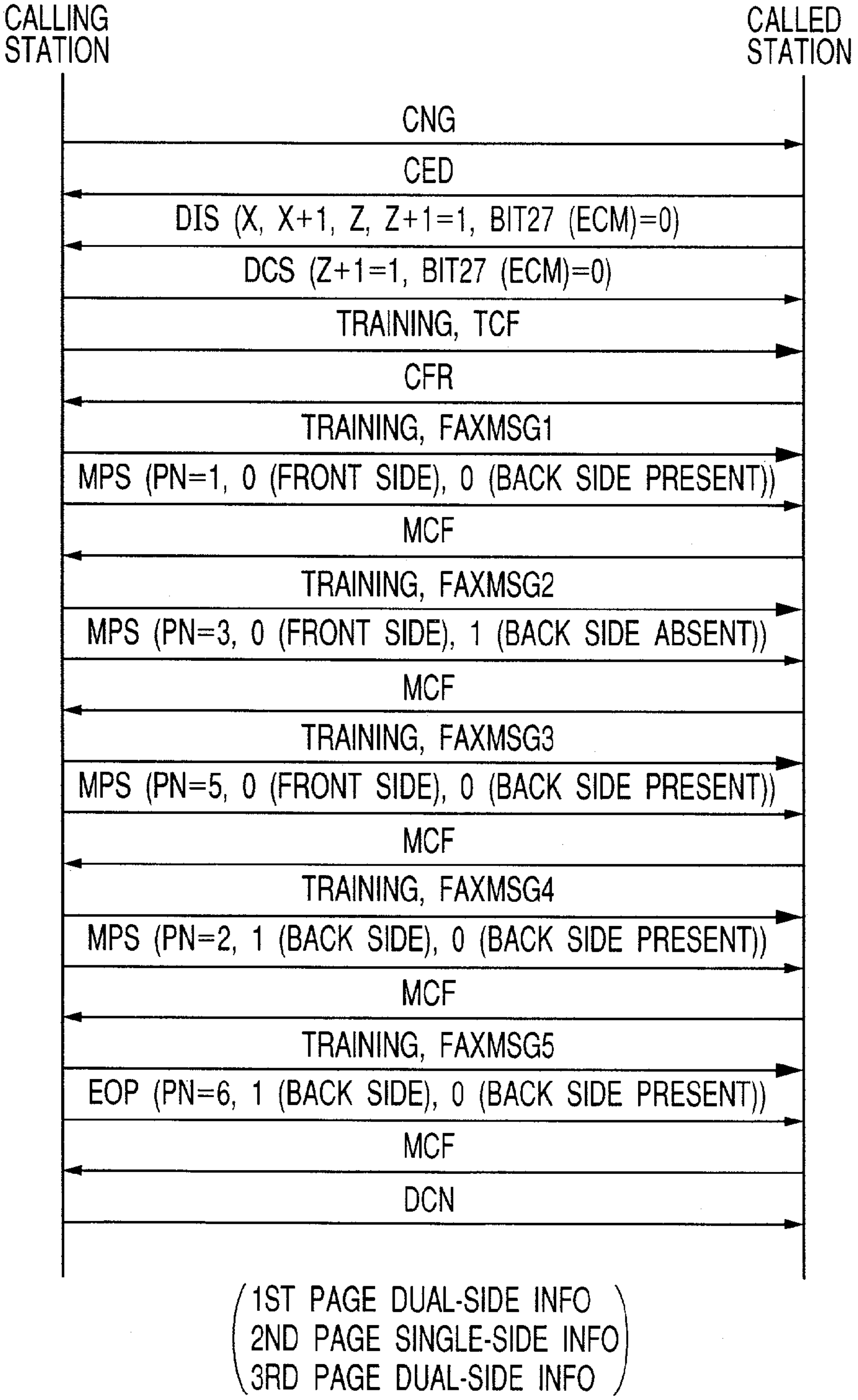
FIG. 10 is an explanatory view showing a state of dual-side transmission at a continuous dual/single side mixture reception mode (non-ECM) according to the present invention.
Figure 11:
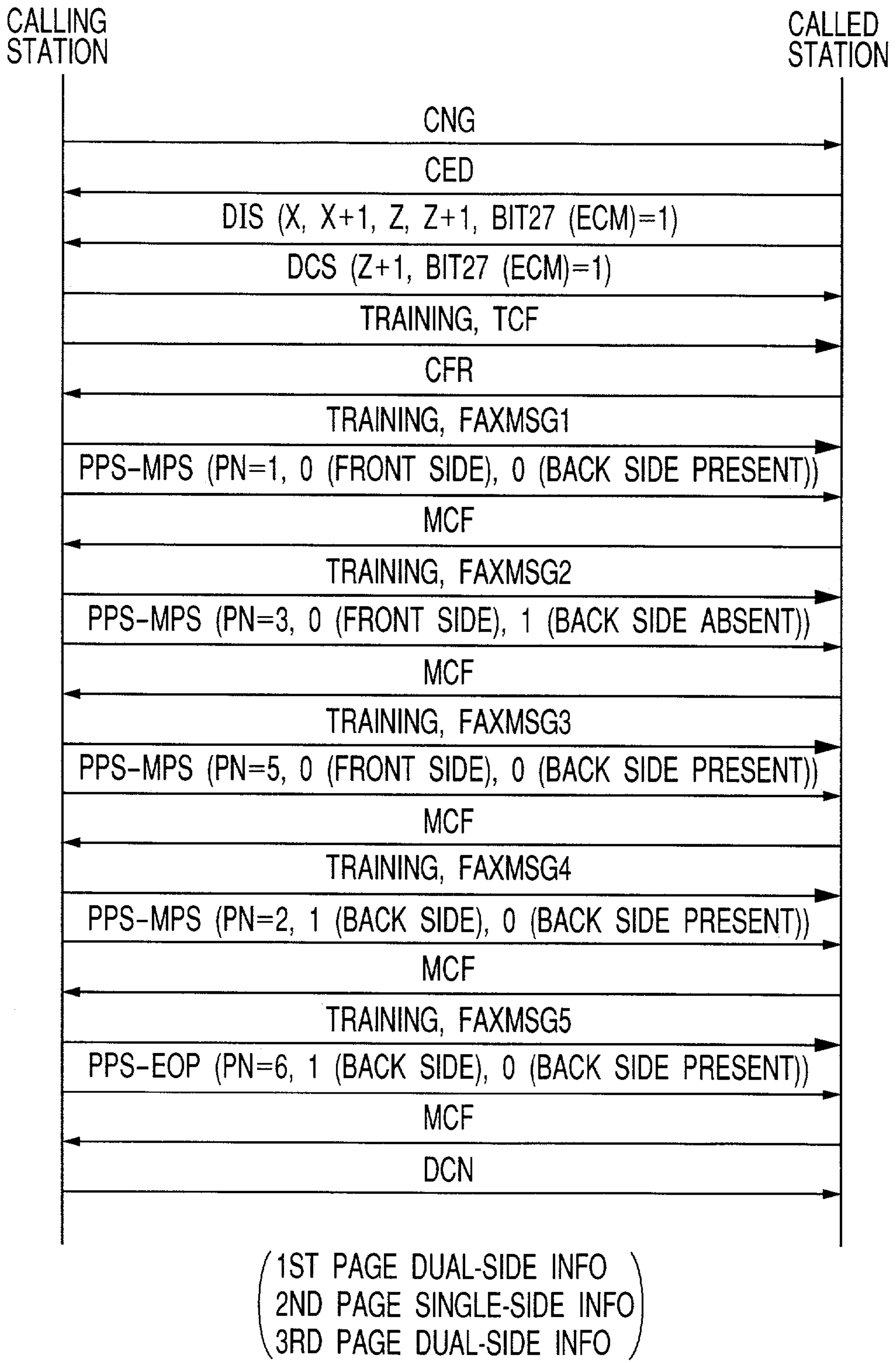
FIG. 11 is an explanatory view showing a state of dual-side transmission at a continuous dual/single side mixture reception mode (ECM) according to the present invention.

At a called station (receiver in the illustrated embodiment) side shown in FIGS. 8 to 11, bit X, bit (X+1), bit Z and bit (Z+1) in the DIS signal are all set to 1 so that the fact that all of these functions can be used is declared. Further, declaration of ECM in the DIS signal is similar to that shown in FIGS. 4 to 7, and bit 27 is set to 0 in non-ECM (FIGS. 8 and 10) and set to 1 in ECM (FIGS. 9 and 11).

On the other hand, response of the DCS signal at a calling station side is bit Z=1, bit 27 (ECM)=0 (FIG. 8); bit Z=1, bit 27 (ECM)=1 (FIG. 9); bit (Z+1)=1, bit 27 (ECM)=0 (FIG. 10); and bit (Z+1)=1, bit 27 (ECM)=1 (FIG. 11).

Further, regarding to FIGS. 8 to 11, in the above-mentioned construction of original informations (three originals, no back side of second original), page numbers (PN) and bit 0 and bit 1 of Page information assigned to respective sides (these three data are isolated by ",") are as follows:

first original/front side 1, 0, 0
first original/back side 2, 1, 0
second original/front side 3, 0, 1 (no back side)
(second original/back side: not transmitted)
third original/front side 5, 0, 0
third original/back side 6, 1, 0

The difference between the alternate dual/single side mixture modes (non-ECM, ECM) shown in FIGS. 8 and 9 and the continuous dual/single side mixture modes (non-ECM, ECM) shown in FIGS. 10 and 11 is similar to that regarding to FIGS. 4 to 7; namely, image informations on front and back sides (except absent back side) are transmitted alternately in FIGS. 8 and 9, and image informations on front sides are all firstly transmitted and then image informations on back sides (except absent back side) are all transmitted in FIGS. 10 and 11.

By transmitting the page numbers (PN) and bit 0 and bit 1 of the Page information by the post message signal as shown in FIGS. 8 to 11, with regard to presence/absence of the back side information, the receiver side monitors bit 1 of Page information of the front side informations and determines presence of the back side information if bit 1=0 and the absence of the back side information if bit 1=1.

FIGS. 12 to 18 show communication control to be executed in the CPU 22 in order to effect the above-mentioned dual-side communication and dual/single side mixture communication processing. The control procedure shown in FIGS. 12 to 18 is stored in the ROM 24 as a program for the CPU 22. FIGS. 12 to 18 show a flow of processing for realizing the communication control as flow charts, and, in these Figures, the same reference number indicates continuation.

Figure 12:
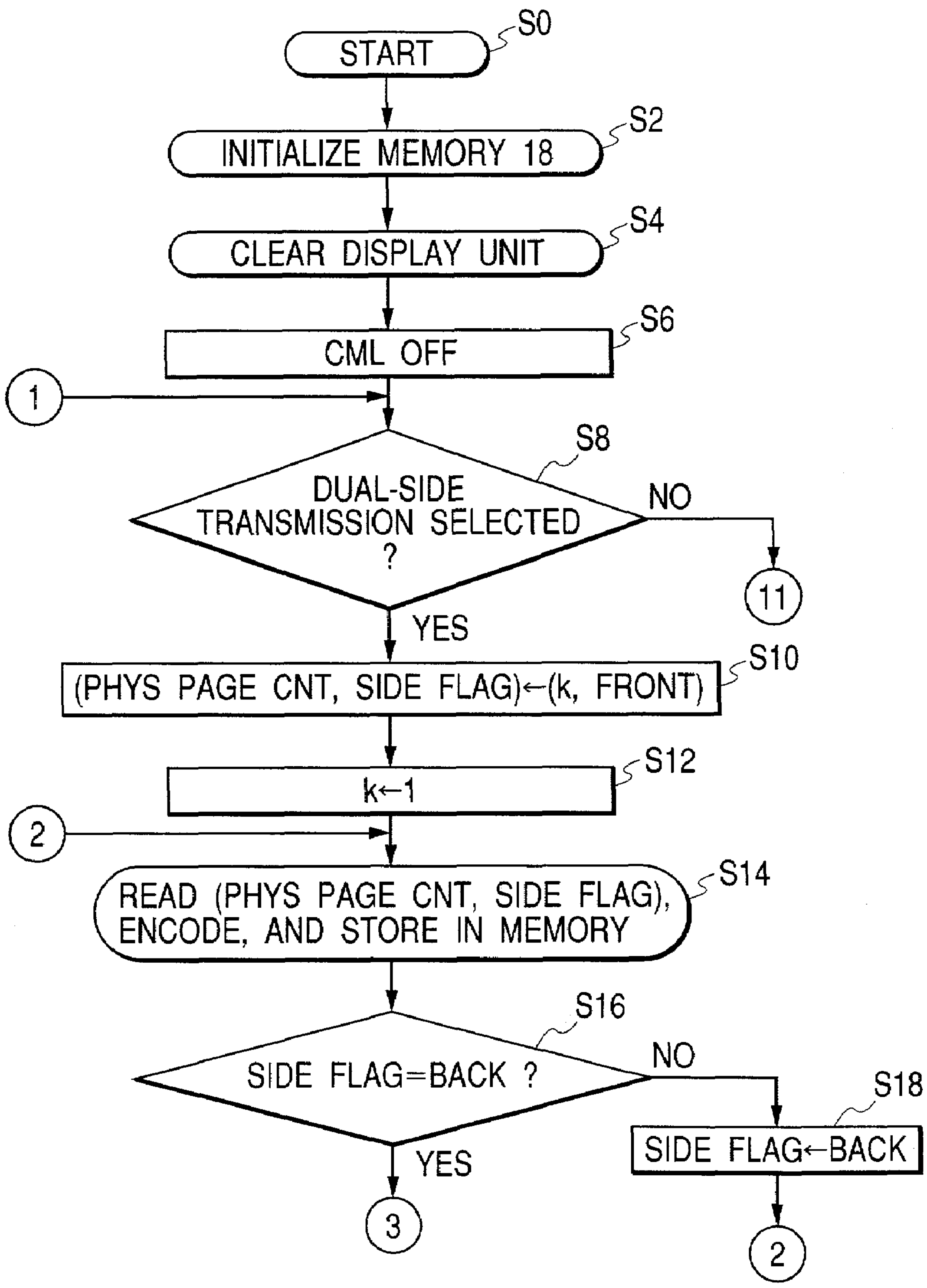
FIG. 12 is a flow chart showing communication control of a CPU 22 of FIG. 1.

In FIG. 12, a step S0 shows start of the processing initiated by predetermined reset operation.

In a step S2, the memory circuit 18 is initialized via the bus 26, and, in a step S4, the display portion of the operation unit 20 is initialized (cleared) via the bus 26.

In a step S6, CML of the NCU 2 is turned off via the bus 26, thereby connecting the telephone line 2*a* to the telephone set 4.

Figure 17:
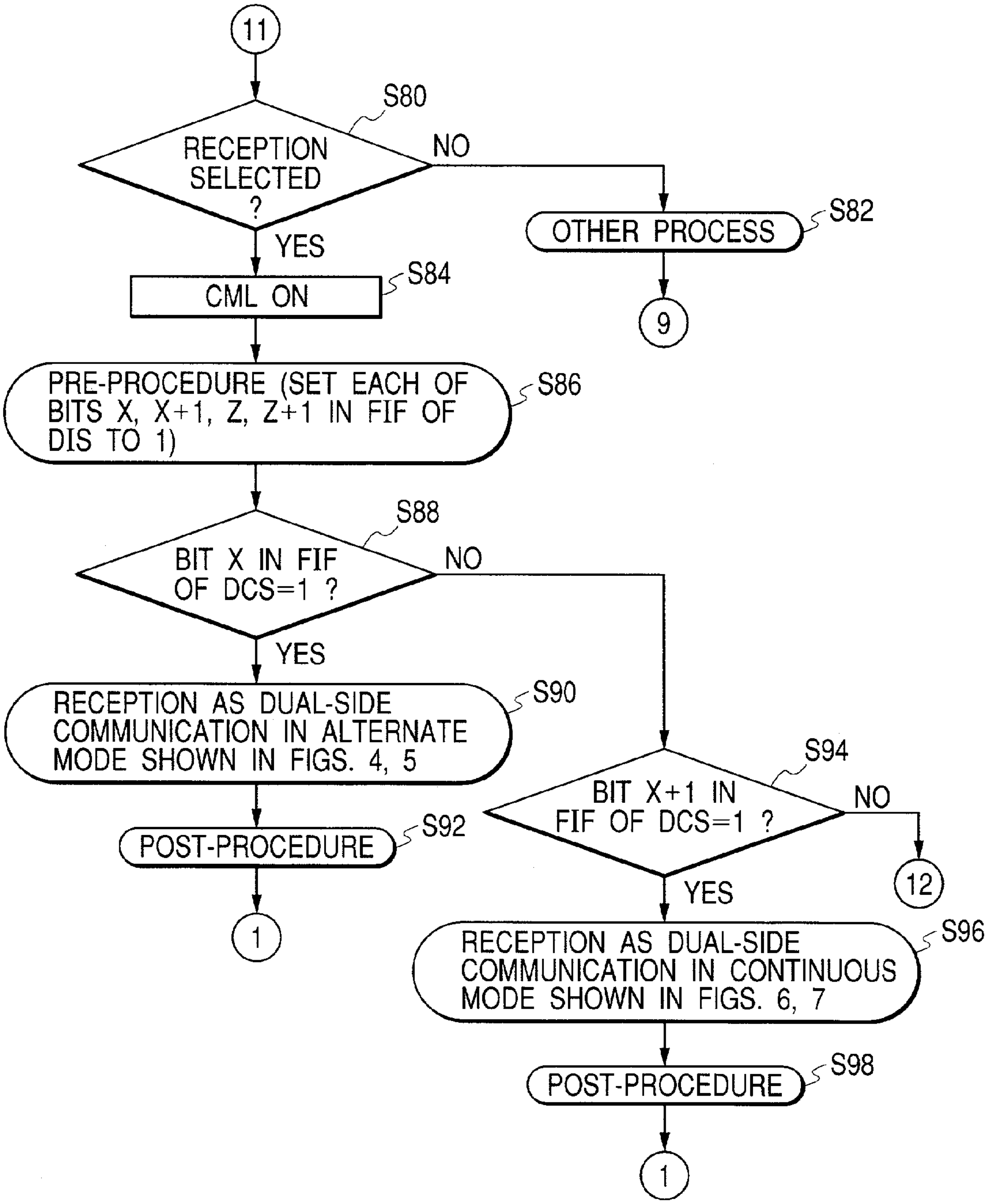
FIG. 17 is a flow chart showing communication control effected by the CPU 22 of FIG. 1.

In a step S8, the information of the operation unit 20 is inputted via the bus 26, and it is judged whether the transmission of the dual-side original is selected or not. If the transmission of the dual-side original is selected, the processing goes to a step S10; whereas, if the transmission of the dual-side original is not selected, the processing goes to a step S80 (FIG. 17).

In the step S10, a physical page counter k and a side flag are initialized. Here, the physical page counter serves to count physical pages (corresponding to the number of sheets of originals). Further, the side flag serves to discriminate a front side and a back side of the original and store 0 corresponding to the front side or 1 corresponding to the back side. The counter and the flag are assigned to predetermined areas in the memory circuit 18.

In a step S12, the physical page counter k is set to 1. Then, in a step S14, the original informations in the physical page counter k and the side flag are read, and the read data are encoded and stored in the memory circuit 18.

In a step S16, it is judged whether the side flag shows the back side or not. If the side flag is the back side, the processing goes to a step S20; whereas, if the side flag is not the back side, the processing goes to a step S18. In the step S18, the side flag is set to the back side.

Figure 13:
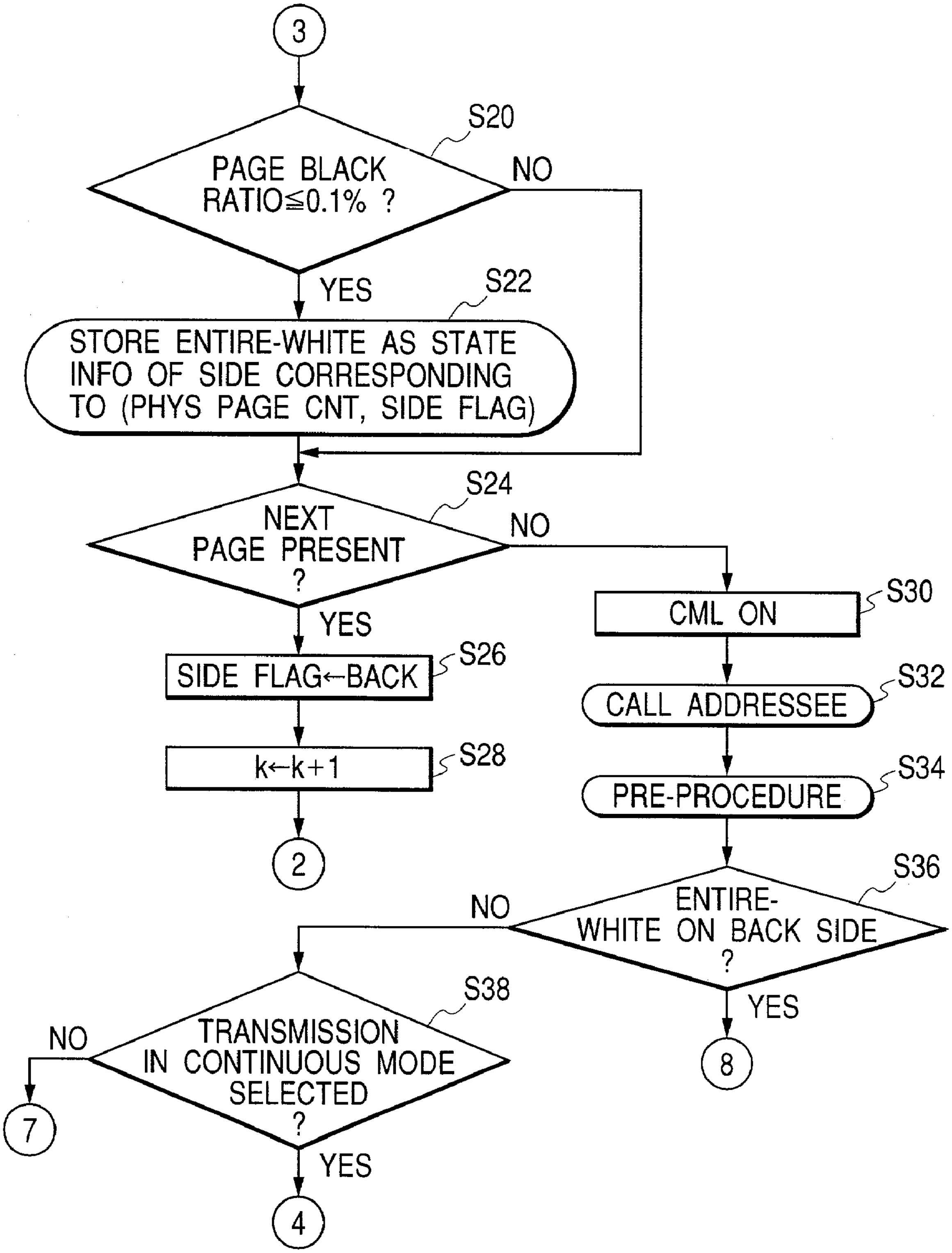
FIG. 13 is a flow chart showing communication control effected by the CPU 22 of FIG. 1.

Following to the step S18, in the step S20 shown in FIG. 13, one side of the original is read by the reading circuit 14, thereby judging whether the read side is (substantially) white entirely or not. This can be achieved, for example, by judging whether percentage of the number of black dots is smaller than 0.1% (this reference value can appropriately be selected by any skilled person in the art). If affirmative in the step S20, the processing goes to a step S22; whereas, if negative, the processing goes to a step S24.

In the step S22, the information that the side is entire-white (or all-blank) is stored in an area for storing a state of the side (entire-white or not) corresponding to the physical page counter k and the side flag.

In the step S24, it is judged whether there is a next pate to be read by the reading circuit 14. If there is the next page, the processing goes to a step S26; whereas, if there is no next page, the processing goes to a step S30.

If there is the next page in the step S24, in the step S26, the side flag is set to information (for example, 0) representing the front side, and, in a step S28, the value of the physical page counter k is incremented by one, and the processing is returned to the step S14.

When all of the originals are read, in the step S30, CML of the NCU 2 is turned on, thereby connecting the telephone circuit 2*a* to the facsimile apparatus (hybrid circuit 6).

In a step S32, the calling circuit 10 is controlled via the bus 26 to call a designated address. The address is designated by the ten-key or the one-touch key in the operation unit 20.

In a step S34, pre-procedure of the facsimile is carried out, and, in a step S36, it is judged whether there is any entire-white information on the back sides. This judgement may be effected by checking the side flags set in the step S22 with reference to the physical page counter k and the side flag corresponding to respective original sides. If there is the entire-white information on the back side or sides, the processing goes to a step S62; whereas, if there is no entire-white information on the back side, the processing goes to a step S38.

In the step S38, it is judged whether transmission in the continuous mode is selected by the predetermined operation in the operation unit 20 or not. If the transmission in the continuous mode is selected, the processing goes to a step S40 (FIG. 14); whereas, if the transmission in the continuous mode is not selected, the processing goes to a step S48 (FIG. 14).

Figure 14:
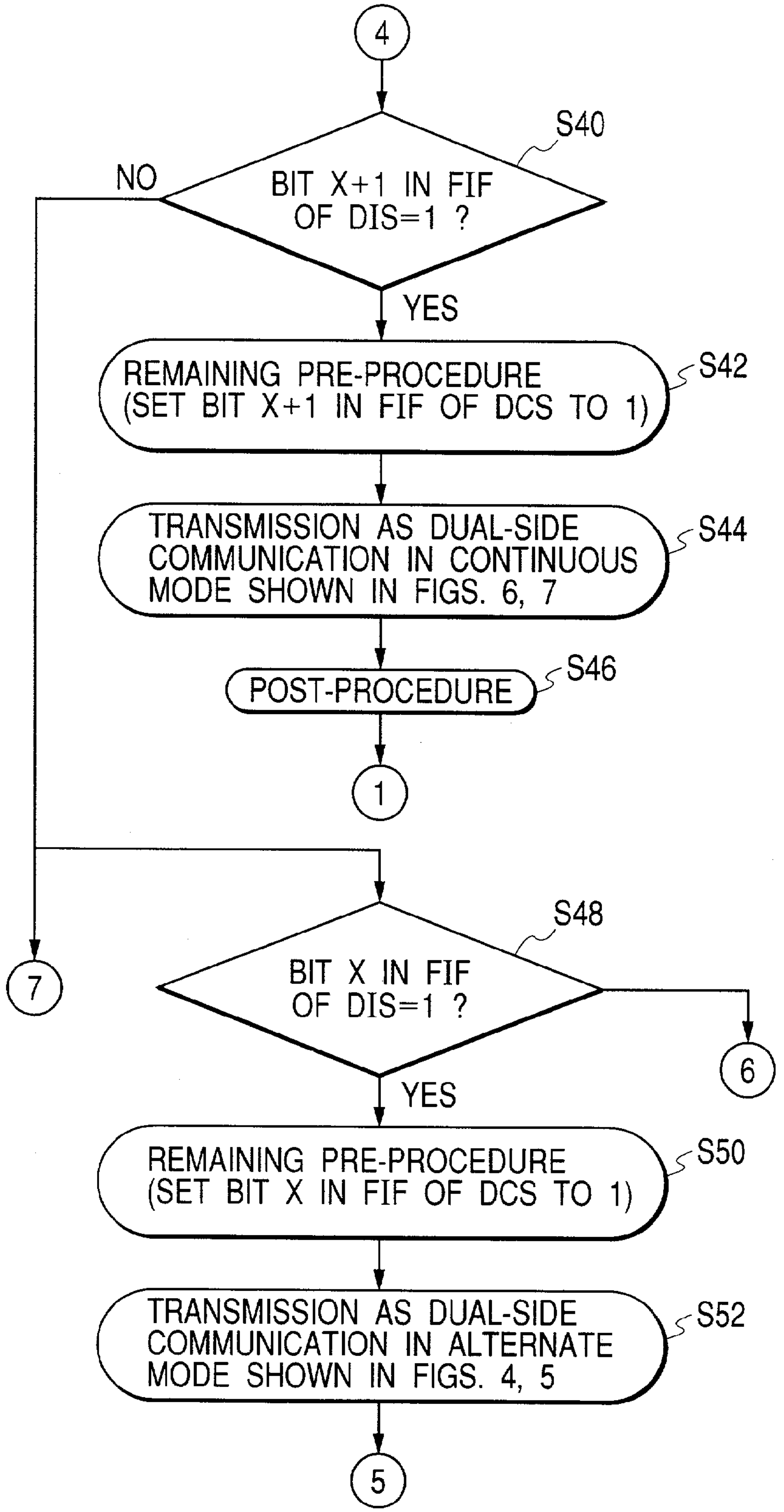
FIG. 14 is a flow chart showing communication control effected by the CPU 22 of FIG. 1.

In case of the transmission in the continuous mode, in the step S40 shown in FIG. 14, it is judged whether bit (X+1) of FIF in the DIS signal of the receiver is 1 or not. If bit (X+1) of FIF in the DIS signal of the receiver is 1, i.e., if the receiver supports the continuous mode, the processing goes to a step S42; whereas, if the receiver does not support the continuous mode, the processing goes to a step S48.

In the step S42, the remaining pre-procedure of the facsimile is carried out. Here, since the receiver supports the continuous mode, bit (X+1) of FIF in the DCS signal is set to 1 to support the continuous mode.

In a step S44, the transmission at the dual-side communication mode in the continuous mode shown in FIG. 6 or 7 is carried out. By judging the bit 27 of FIF in the DIS signal, it is selected whether the ECM communication is effected or not in the step S44. In a step S46, post-procedure of the facsimile is carried out, and the processing is returned to the step S8 shown in FIG. 12.

On the other hand, if the receiver does not support the continuous mode, in the step S48, it is judged whether bit X of FIF in the DIS signal of the receiver is 1 or not. If bit X of FIF in the DIS signal of the receiver is 1, i.e., if the receiver supports the alternate mode, the processing goes to a step S50; whereas, if the receiver does not support the alternate mode, the processing goes to a step S56 (FIG. 15B).

If the receiver supports the alternate mode, in the step S50, the remaining pre-procedure of the facsimile is carried out. Here, bit X of FIF in the DCS signal is set to 1 and the transmission is effected.

In a step S52, the transmission at the dual-side communication mode in the alternate mode shown in FIG. 4 or 5 is carried out. By judging the bit 27 of FIF in the DIS signal, it is selected whether the ECM communication is effected or not in the step S52. Thereafter, in a step S54 shown in FIG. 15A, the post-procedure is carried out, and the processing is returned to the step S8 shown in FIG. 12.

Figure 15A:
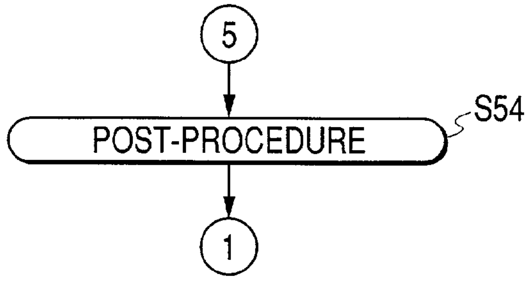
FIGS. 15A, 15B and 15C are flow charts showing communication control of the CPU 22 of FIG. 1.
Figure 15B:
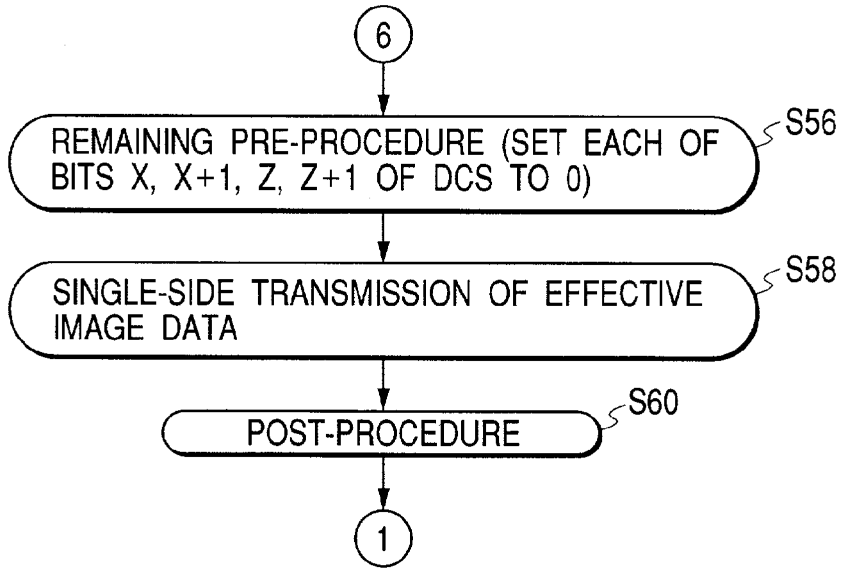
Figure 15C:
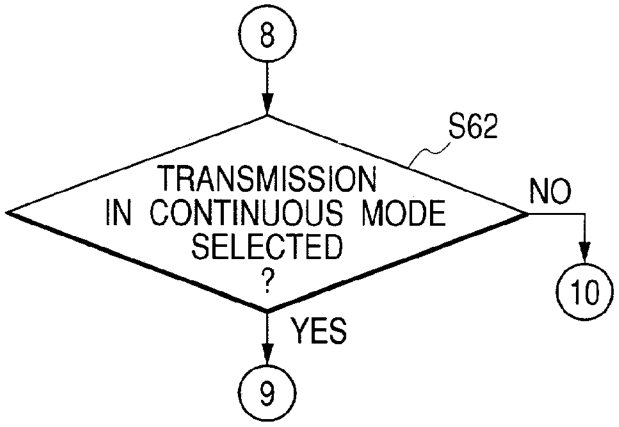

On the other hand, if the receiver also does not support the alternate mode, in the step S56 shown in FIG. 15B, the remaining pre-procedure of the facsimile is carried out. Here, bit X, bit (X+1), bit Z and bit (Z+1) of FIF in the DCS signal are all set to 0, and the transmission is effected.

In a step S58, effective informations (images of pages having no entire-white) are transmitted in the single-side transmission, and, in a step S60, the post-procedure is carried out, and the processing is returned to the step S8 shown in FIG. 12.

On the other hand, in the step S36, if there is the entire-white information on the back side or sides, in the step S62, it is judged whether the transmission in the continuous mode is selected by the operation unit 20. If the transmission in the continuous mode is selected, the processing goes to a step S64 (FIG. 16); whereas, if the transmission in the continuous mode is not selected, the processing goes to a step S66 (FIG. 16).

Figure 16:
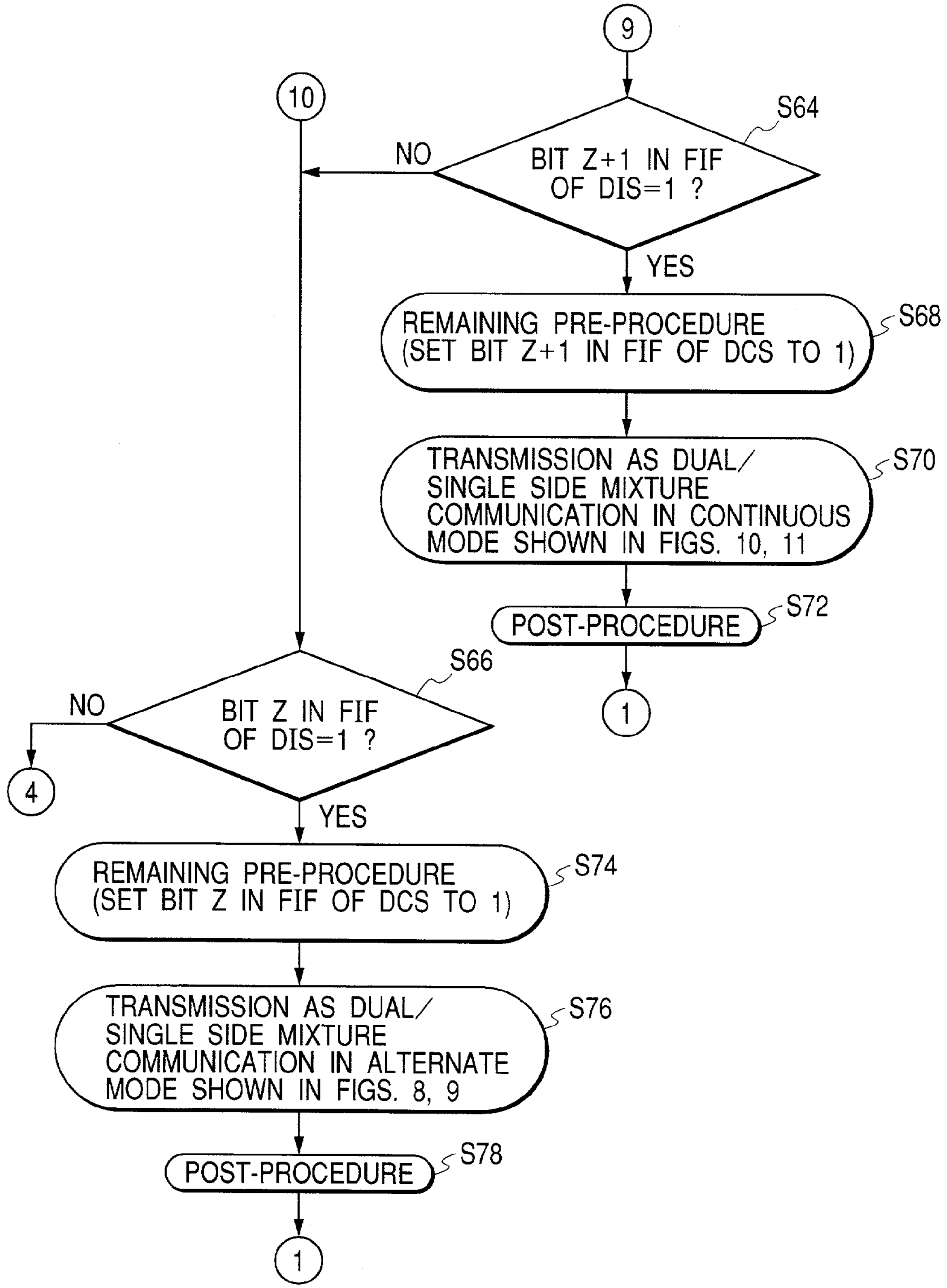
FIG. 16 is a flow chart showing communication control effected by the CPU 22 of FIG. 1.

In the step S64 shown in FIG. 16, it is judged whether bit (Z+1) of FIF in the DIS signal received from the receiver is 1 or not. If bit (Z+1) of FIF in the DIS signal received from the receiver is 1, i.e., if the receiver supports the continuous dual/single side mixture mode, the processing goes to a step S68; whereas, if does not support such a mode, the processing goes to the step S66.

If the receiver does not support the continuous dual/single side mixture mode, in the step S66, it is further judged whether bit Z of FIF in the DIS signal received from the receiver is 1 or not. If bit Z of FIF in the DIS signal is 1, i.e., if the receiver supports the alternate dual/single side mixture mode, the processing goes to a step S74; whereas, if does not support such a mode, the processing is returned to the step S40 (FIG. 14), where dual-side transmission in the known alternate or continuous mode is effected in accordance with bit X and bit (X+1) in the DIS signal.

If the receiver supports the continuous dual/single side mixture mode, in the step S68, the remaining pre-procedure of the facsimile is carried out. Here, bit (Z+1) of FIF in the DCS signal is set to 1 and the use of the continuous dual/single side mixture mode is declared. Then, in a step S70, the transmission at the dual/single side mixture communication mode in the continuous mode shown in FIG. 10 or 11 is effected. By judging the bit 27 of FIF in the DIS signal, it is selected whether the ECM communication is effected or not in the step S70. Thereafter, in a step S72, post-procedure is carried out, and the processing is returned to the step S8 shown in FIG. 12.

On the other hand, in the step S66, if bit Z of FIF in the DIS signal is 1, i.e., if the receiver supports the alternate dual/single side mixture mode, in the step S74, the remaining pre-procedure of the facsimile is carried out. Here, bit Z of FIF in the DCS signal is set to 1 and the use of the alternate dual/single side mixture mode is declared.

Then, in a step S76, the transmission at the dual/single side mixture communication mode in the alternate mode shown in FIG. 8 or 9 is effected. By judging the bit 27 of FIF in the DIS signal, it is selected whether the ECM communication is effected or not in the step S76. Thereafter, in a step S78, post-procedure is carried out, and the processing is returned to the step S8 shown in FIG. 12.

On the other hand, if the transmission of the dual-side original is not selected in the step S8, in a step S80 shown in FIG. 17, it is further judged whether facsimile reception is selected. If the reception is selected by satisfying a condition such as arrival of a calling signal from the line or manual reception operation via the operation unit 20 or arrival of designated time of time designating pouring, the processing goes to a step S84. If the reception is not effected, the processing goes to a step S82, where other processing (original copying processing or the like) is carried out.

If the reception processing is effected, in the step S84, CML of the NCU 2 is turned on via the bus 26, thereby connecting the telephone line 2*a* to the facsimile apparatus.

In a step S86, the pre-procedure of the facsimile is carried out. Here, bit X, bit (X+1), bit Z and bit (Z+1) of FIF in the DIS signal are set to 1. That is to say, the fact that all of the known alternate mode and continuous mode, and alternate dual/single side mixture mode and continuous dual/single side mixture mode according to the illustrated embodiment are supported is declared.

In a step S88, it is judged whether bit X of FIF in the DCS signal received from the transmitter is 1 or not. If bit X of FIF in the DCS signal is 1, i.e., if the transmitter declares the dual-side transmission in the alternate mode, the processing goes to a step S90; whereas, if bit X of FIF in the DCS signal is not 1, the processing goes to a step S94.

In the step S90, the reception at the dual-side communication mode in the alternate mode shown in FIG. 4 or 5 is executed. By judging the bit 27 of FIF in the DIS signal, it is selected whether the ECM communication is effected or not in the step S90. Then, in a step S92, post-procedure of the facsimile is carried out, and the processing is returned to the step S8 shown in FIG. 12.

On the other hand, in the step S94, it is further judged whether bit (X+1) of FIF in the DCS signal is 1 or not. If bit (X+1) of FIF in the DCS signal is 1, i.e., if the transmitter declares the dual-side transmission in the continuous mode, the processing goes to a step S96; whereas, if bit (X+1) of FIF in the DCS signal is not 1, the processing goes to a step S100 (FIG. 18).

In the step S96, the reception at the dual-side communication mode in the continuous mode shown in FIG. 6 or 7 is executed. By judging the bit 27 of FIF in the DIS signal, it is selected whether the ECM communication is effected or not in the step S96. Then, in a step 98, post-procedure of the facsimile is carried out, and the processing is returned to the step S8 shown in FIG. 12.

Figure 18:
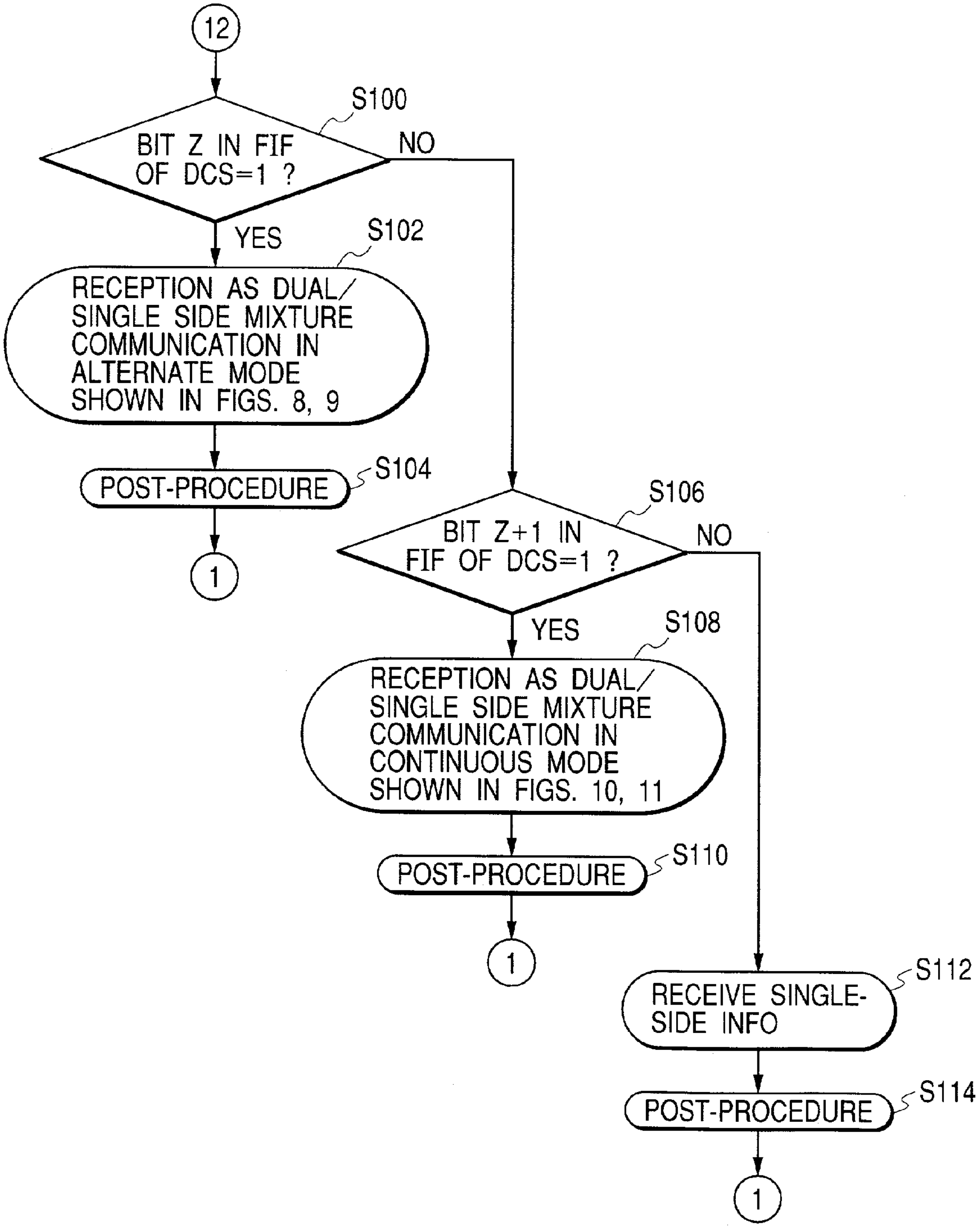
FIG. 18 is a flow chart showing communication control of the CPU 22 of FIG. 1.

In the step S100 shown in FIG. 18, it is judged whether bit Z of FIF in the DCS signal received from the transmitter is 1 or not. If bit Z of FIF in the DCS signal is 1, i.e., if the transmitter declares the alternate dual/single side mixture mode, the processing goes to a step S102; whereas, if bit Z of FIT in the DCS signal is not 1, the processing goes to a step S106.

In the step. S102, the reception at the dual/single side mixture communication mode in the alternate mode shown in FIG. 8 or 9 is executed. By judging the bit 27 of FIF in the DIS signal, it is selected whether the ECM communication is effected or not in the step S102. Then, in a step S104, post-procedure of the facsimile is carried out, and the processing is returned to the step S8 shown in FIG. 12.

In the step S106, it is further judged whether bit (Z+1) of FIF in the DCS signal is 1 or not. If bit (Z+1) of FIF in the DCS signal is 1, i.e., if the transmitter declares the continuous dual/single side mixture mode, the processing goes to a step S108; whereas, if bit (Z+1) of FIF in the DCS signal is not 1, the processing goes to a step S112.

In the step S108, the reception at the dual/single side mixture mode in the continuous mode shown in FIG. 10 or 11 is executed. By judging the bit 27 of FIF in the DIS signal, it is selected whether the ECM communication is effected or not in the step S108. Then, in a step S110, post-procedure of the facsimile is carried out, and the processing is returned to the step S8 shown in FIG. 12.

On the other hand, if negative in the step S106, since the transmitter designates the conventional single-side mode, in the step S112, reception of the single-side information is carried out. By judging the bit 27 of FIF in the DIS signal, it is selected whether the ECM communication is effected or not in the step S112. Then, in a step S114, post-procedure of the facsimile is carried out, and the processing is returned to the step S8 shown in FIG. 12.

In this way, according to the illustrated embodiment, not only the dual-side transmission and reception (non-ECM and ECM) in the conventional alternate and continuous modes can be executed, but also transmission and reception of the dual-side original can be executed by using the alternate dual/single side mixture communication mode (non-ECM and ECM) and the continuous dual/single side mixture communication mode (non-ECM and ECM).

According to the alternate and continuous dual/single side mixture communication modes of the illustrated embodiment, since the phase (page-to-page procedure and image message transferring phase) for transmitting image information of the back side which does not need to be transmitted (for example, back side having entire-white) is not included at all, even when the original images of the originals including single-side originals are transmitted, single/dual side mixture original images can be transmitted at a high speed with low cost and without reducing the communication efficiency.

Further, according to the illustrated embodiment, since the dual-side communication mode in the conventional alternate and continuous modes is effected if the opponent machine does not support the alternate and continuous dual/single side mixture communication modes and since the single-side communication is effected if the opponent machine does also not support the dual/single side mixture communication modes, exchangeability of the communication may not be deteriorated.

Further, in the illustrated embodiment, since the dual-side communication using the alternate or continuous dual/single side mixture communication mode is effected by automatically judging the entire-white back side, even when the single-side originals are mixed in the dual-side originals, the user may merely set the original stack in the reading circuit 14 and effect the transmitting operation without any troublesome operation.

In the above explanation, while the facsimile exclusive machine was described, the present invention is not limited to the facsimile exclusive machine but can be applied to other types of facsimile apparatuses. For example, the present invention can be applied to an arrangement in which a FAX MODEM is externally or internally mounted to a general-purpose terminal such as a personal computer and facsimile communication is effected by software control. In this case, a control program of the present invention can be stored in an supplied from not only the above-mentioned ROM 24 but also any computer readable storing medium such as a hard disk, a floppy disk, an optical disk, a magneto-optical disk or a memory card. Further, it should be noted that the present invention can also be applied to a so-called digital composite machine in which a FAX communication interface or a network interface is mounted to an image forming apparatus.

Second Embodiment

In a second embodiment of the present invention, the same elements as those in the first embodiment are designated by the same reference numerals, and explanation thereof will be omitted.

In the second embodiment, the following facsimile communication is effected under the control of the CPU 22.

(1) When the image information on the back side does not need to be transmitted because of the (substantially) entire-white, only the image information on the front side which is effective image information is transmitted, and the transmission of the back side is skipped (dual/single side mixture mode).

(2) The page numbers (PN) and the front/back discrimination information (SIDE) stipulated in the ITU-T Recommendation are transmitted by the post message signal in the same manner that the transmission of the back side is not skipped with respect to respective images transmitted without skipping.

(3) Control is effected so that the header information (transmitter's information) regarding the back side to be skipped is not recorded at the receiver side.

(3') Regarding the page numbers recorded at the receiver side as the header information, the pages of the effective image informations are counted and the image informations on the skipped back sides are not counted.

Figure 28:
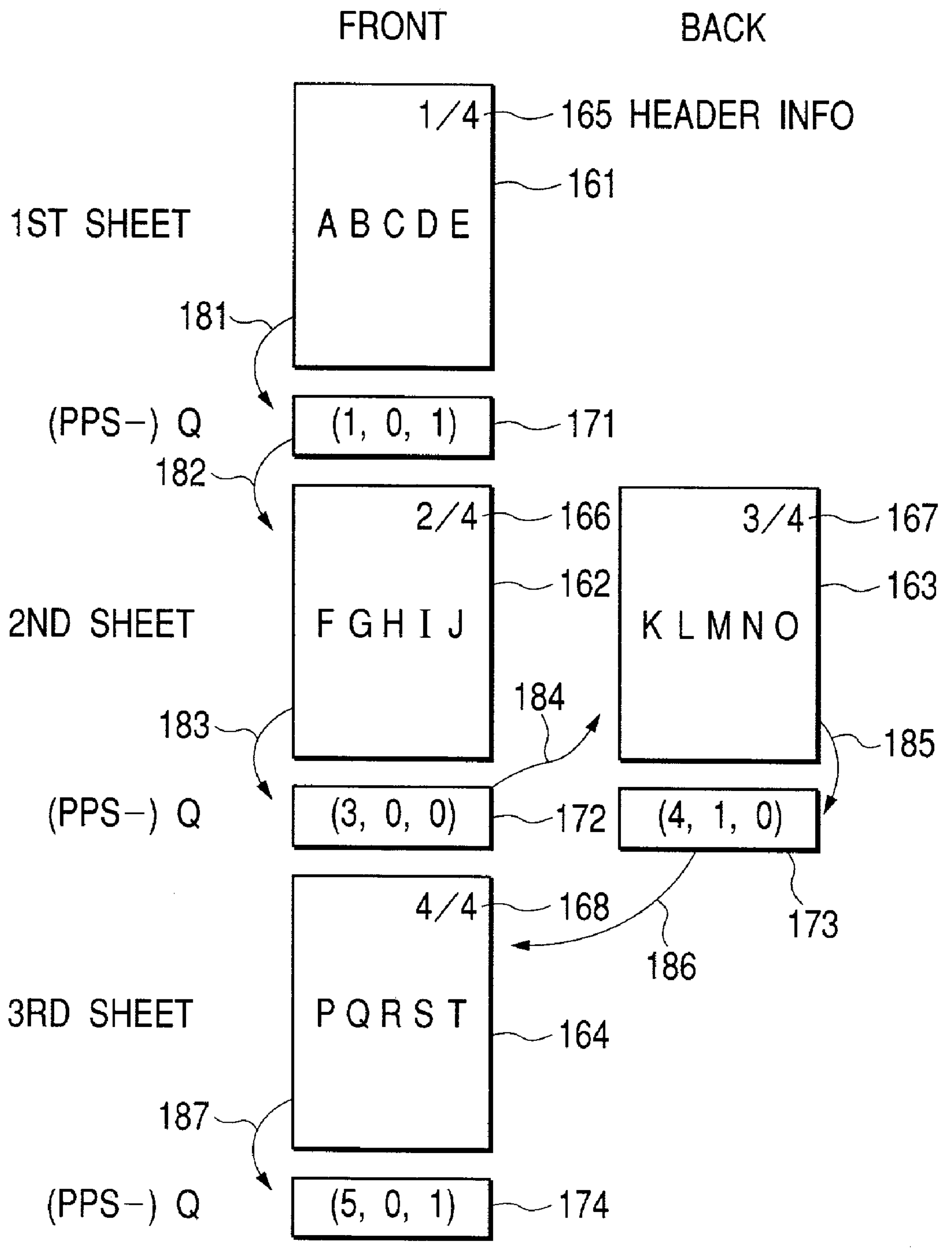
FIG. 28 is an explanatory view showing constructions of original images transmitted in the second embodiment of the present invention.

For example, in case of three sheets of originals having the following construction:

first original: single-side information (back side is entire-white and does not need to be transmitted)

second original: dual-side informations third original: single-side information (backside is entire-white and does not need to be transmitted), in the second embodiment, the transmission is effected as shown in FIG. 28.

In FIG. 28, the reference numerals 161 to 164 denote image data of four sides to be transmitted, and header informations 165 to 168 are recorded on head portions of the four sides in the form of "page number/total page number". The total page number corresponds to the number of effective images, and, in case of FIG. 28, the total page number is 4. Incidentally, a denominator portion of "total page number" among "page number/total page number" of the header information is optional information, and, it is not necessary that such denominator portion be transmitted.

The reference numerals 171 to 174 denote post message signals (so-called Q signals) which will be described later, and three numbers within a parenthesis ( ) indicate page number (PN), front/back information (SIDE) and presence/absence of back side image (presence: 0/absence: 1) from the left.

Among them, the page number (PN) and the front/back information (SIDE) are determined by the ITU-T Recommendation T.30. The page number (PN) advances from the front side to the back side, and the front side is always denoted by the odd number. The front/back information is represented by front=0 and back=1.

The presence/absence of back side image is inherent to the present invention and is represented by presence of back side image=0 and absence of back side image=1.

The image data 101 to 164 and the post message signals 171 to 174 shown in FIG. 28 are transmitted in a sequence shown by the arrows 181 to 187.

FIG. 19 shows format of DIS/DTC/DCS signals used in the illustrated embodiment.

In the illustrated embodiment, presence/absence of the dual/single mixture more is represented by bit Y of FIF in the DIS/DTC signals (any bit depending upon construction of FIF or Recommendation may be used). Further, in the DCS signal, transmission in the dual/single mixture mode is designated by bit Y of FIF.

Since X-bit and bit (X+1) are well known, after all, only bit Y may be added to FIF in the DIS/DCS/DTC signals in order to realize transmission and reception of dual/single side mixture informations in the illustrated embodiment.

FIGS. 20 to 27 show communication control to be executed by the CPU 22 in order to effect facsimile communication according to the illustrated embodiment. The control procedure shown in FIGS. 20 to 27 is stored in the ROM 24 as a program for the CPU 22.

FIGS. 20 to 27 sow a flow of processing for realizing the communication control as flow charts, and, in FIGS. 20 to 27, the same numerical numbers indicate continuation.

Incidentally, in the following explanation, while explanation of ECM control will be omitted, as is in the conventional case, negotiation using DIS/DCS signals can determine whether the ECM communication is effected or not.

Figure 20:
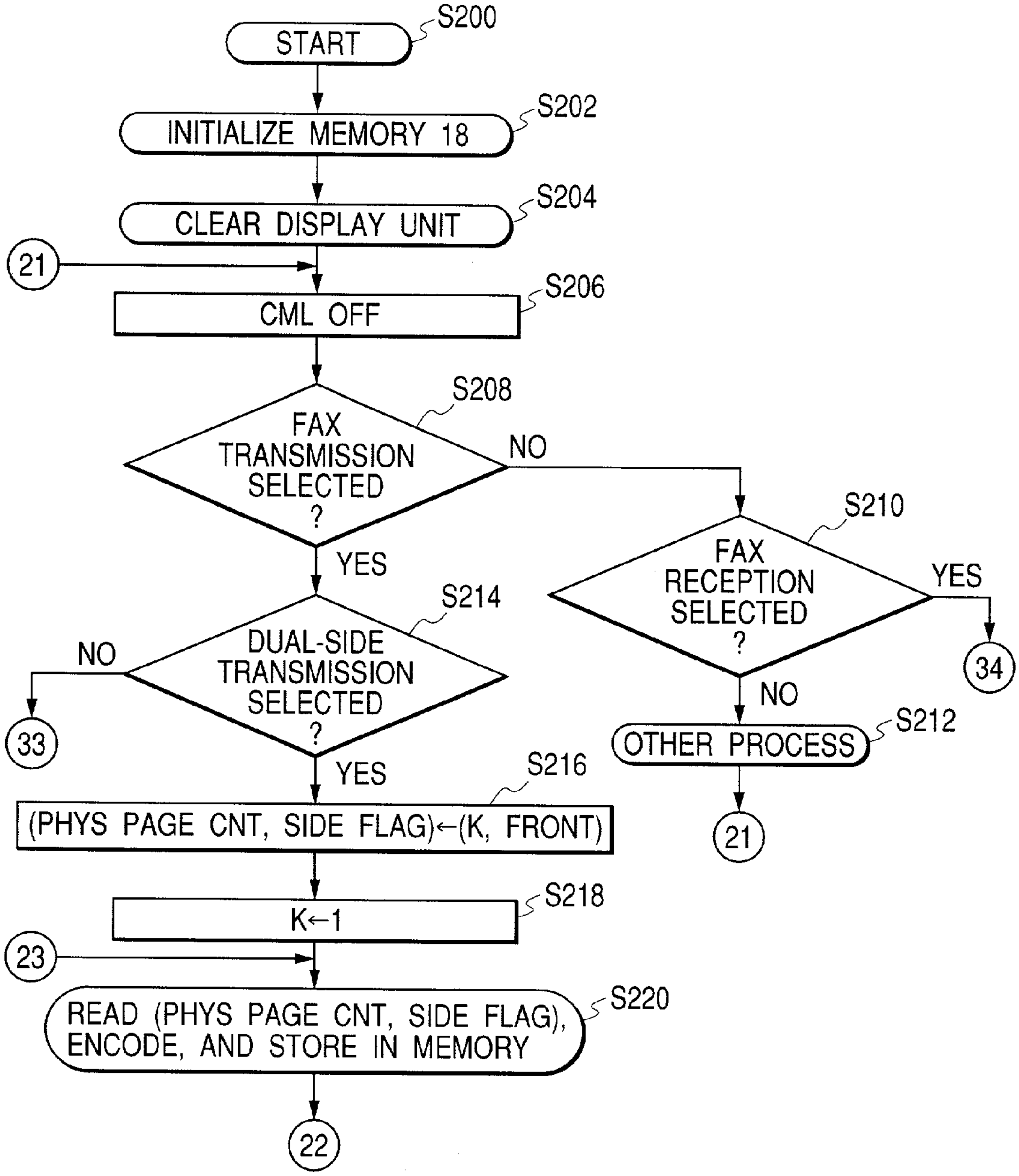
FIG. 20 is a flow chart showing communication control of a CPU 22 of the second embodiment.

In FIG. 20, step S200 shows start of the processing initiated by predetermined reset operation.

In a step S202, the memory circuit 18 is initialized via the bus 26, and, in a step S204, the display portion of the operation unit 20 is initialized (cleared) via the bus 26.

In a step S206, CML of the NCU 2 is turned off via the bus 26, thereby connecting the telephone line 2*a* to the telephone set 4.

In a step S208, the operation information of the operation, unit 20 is inputted via the bus 26, and it is judged whether the facsimile transmission is selected or not. If the facsimile transmission is selected, the processing goes to a step S214; whereas, if the facsimile transmission is not selected, the processing goes to a step S210.

In the step S210, it is judged whether the facsimile reception is selected. If the reception is selected by satisfying a condition such as arrival of a calling signal from the circuit or manual reception operation via the operation unit 20 or arrival of designated time of time designating pouring, the processing goes to a step S314 (FIG. 26). If the reception is not effected, the processing goes to a step S212, where other processing (original copying processing or the like) is carried out.

In the step S214, the information of the operation unit 20 is inputted via the bus 26, and it is judged whether the transmission of the dual-side original is selected or not. If the transmission of the dual-side original is effected, the processing goes to a step S216; whereas, if the transmission of the dual-side original is not effected, the processing goes to a step S312 (FIG. 26).

In the step S216, prior to the image reading (step S220), initialization is effected so that a physical page counter is set to K and a side flag is set to "front". Here, "K" is a counter for counting the number of originals (physical pages), which is assigned to a predetermined area of the memory circuit 18 as a variable area. The "physical page counter" is a pointer to the variable K (or variable L which will be described later) and is assigned to the predetermined area in the memory circuit 18 and is initialized to point out address of the variable K. Reference of a value of the physical page counter (described later) is reference to contents of the variable K (or variable L which will be described later).

Further, the side flag is the same as that transmitted as a value of the front/back information (SIDE) based upon the Recommendation and represents a "front" of the original as 0 and a "back" of the original as 1.

In a step S218, the variable K is set to 1 (meaning of 1 page).

In a step S220, the original image on the side represented by the side flag and corresponding to the page determined by the value of the variable of address (i.e., K) shown by the physical page counter by means of the reading circuit 14, and the read data are encoded and stored in an image memory area (corresponding to the page counter and the side flag) of the memory circuit 18.

Figure 21:
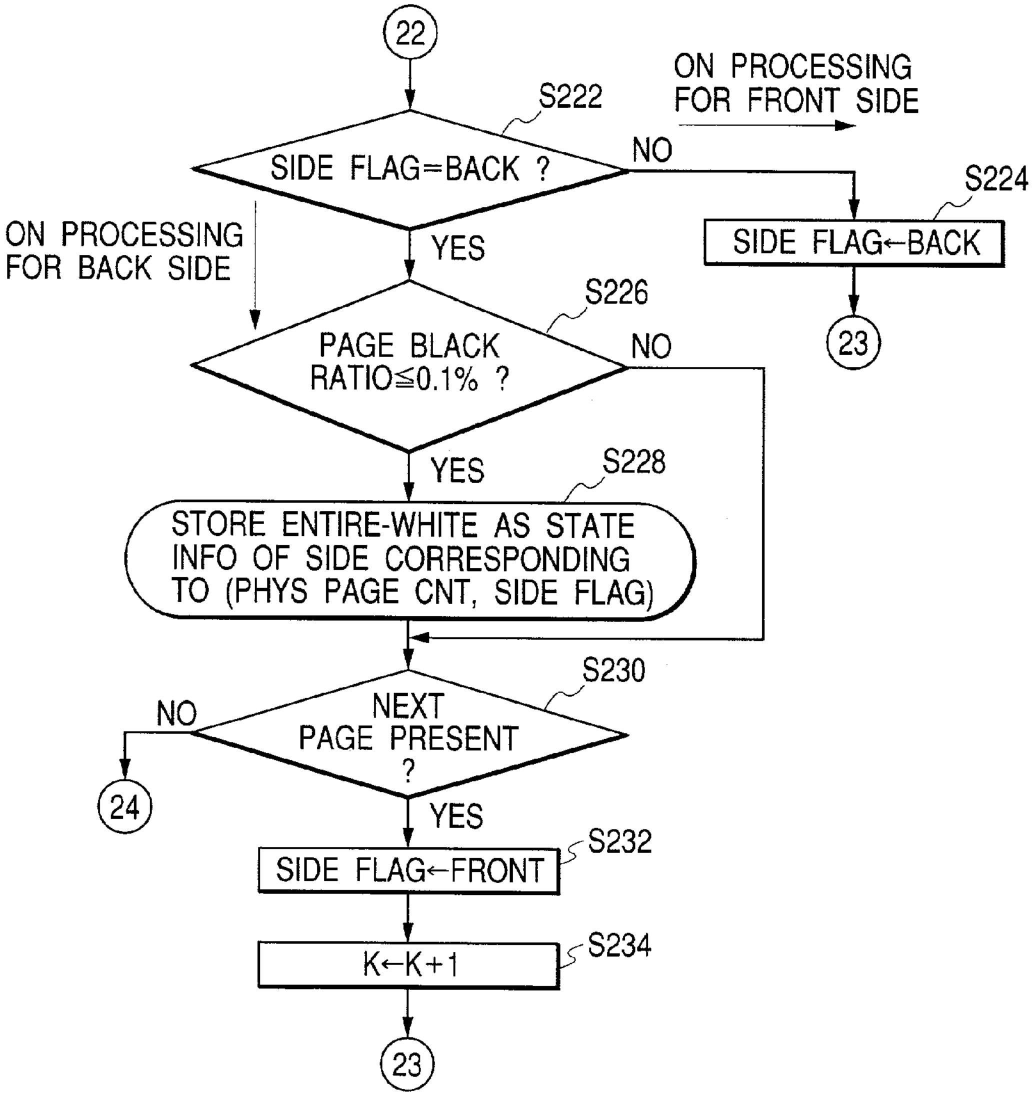
FIG. 21 is a flow chart showing communication control effected by the CPU 22 of the second embodiment.

In a step S222 shown in FIG. 21, it is judged whether the side flag shows the back side or not (namely, whether the "back" side is being processed or not). If affirmative in the step S222, the processing goes to a step S226; whereas, if negative, the processing goes to a step S224.

In the step S224, the side flag is set to "back" side, and the processing is returned to the step S220, where the back side is read.

If the back side is being processed in the step S222, in the step S226, it is judged whether the image read in the step S220 is (substantially) entire-white or not. This can be achieved, for example, by judging whether percentage of the number of black dots in the image data on the side is smaller than 0.1% (this reference value can appropriately be selected by any skilled person in the art). If affirmative in the step S226, the processing goes to a step S228; whereas, if negative, the processing goes to a step S230.

In the step S228, the fact that the side ("front" or "back") represented by the side flag and corresponding to the page shown by the physical page counter is the entire-white information is stored in the memory circuit 18.

In the step S230, it is judged whether there is a next one page to be read by the reading circuit 14. If there is the next page, the processing goes to a step S232; whereas, if there is no next page, the processing goes to a step S236 (FIG. 22).

In the step S232, the side flag is set to the "front" side. In a step S234, the value of the variable K is incremented by one, and the processing is returned to the step S220 to process the front side of the next original. By the step S234, the variable K points out the next page original. That is to say, the variable K is incremented by one only after the back side was read, and, after all, when all of the originals were read, the variable K indicates the number of originals read.

Figure 22:
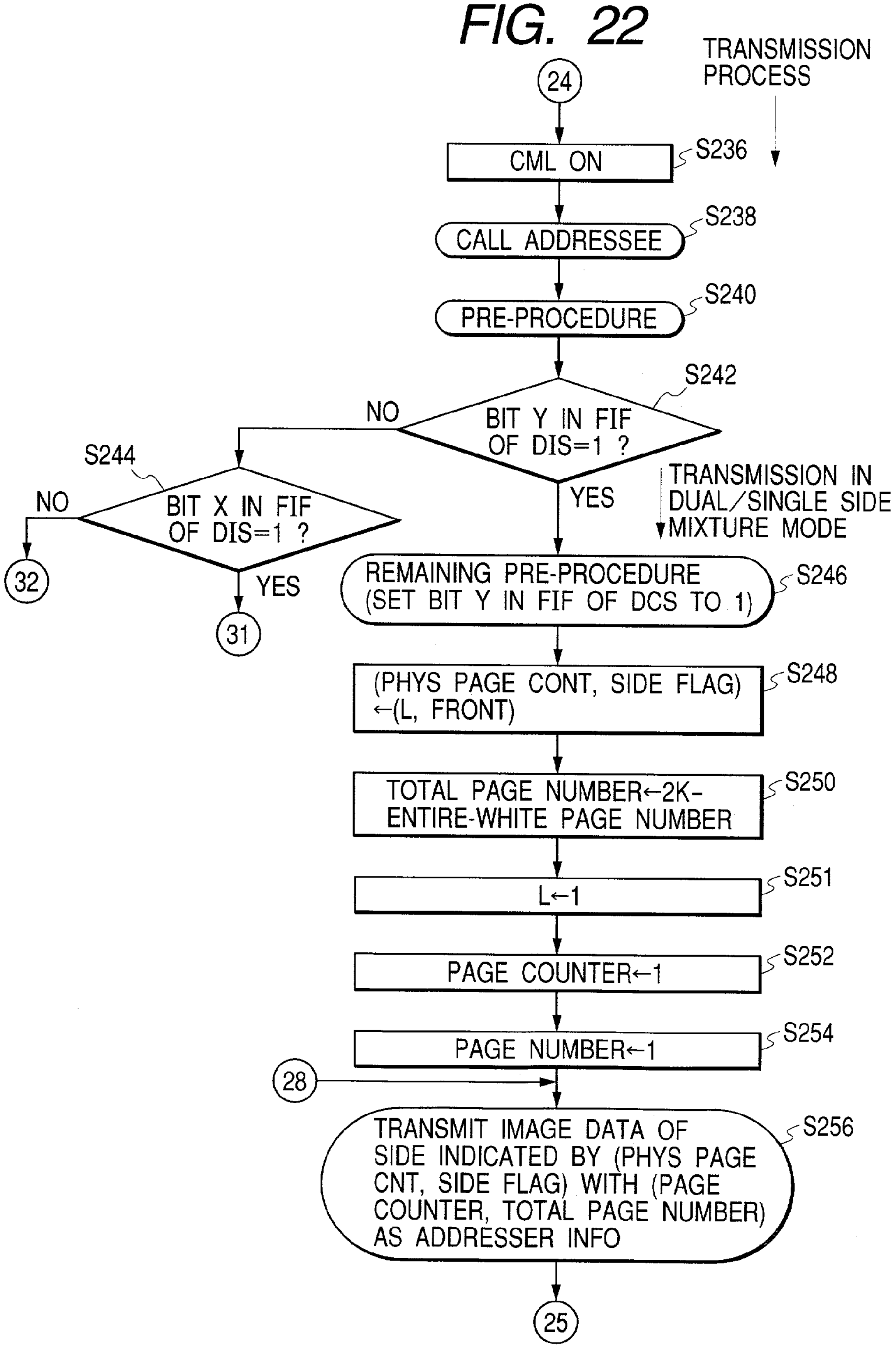
FIG. 22 is a flow chart showing communication control effected by the CPU 22 of the second embodiment.

When all of the originals are read, in the step S236 shown in FIG. 22, CML of the NCU 2 is turned on via the bus 26, thereby connecting the telephone line 2*a* to the facsimile apparatus (hybrid circuit 6).

In a step S238, the calling circuit 10 is controlled via the bus 26 to call a designated address. The address is designated by the ten-key or the one-touch key in the operation unit 20.

In a step S240, pre-procedure of the facsimile is carried out.

In a step S242, it is judged whether bit Y of FIF in the DIS signal of the receiver is 1 or not, i.e., whether or not the receiver supports the dual/single mixture mode of the present invention. If affirmative in the step S242, the processing goes to a step S246; whereas, if negative (NO), the processing goes to a step S244.

In the step S244, it is judged whether bit X of FIF in the DIS signal of the receiver is 1 or not, i.e., whether or not the receiver supports the normal dual-side mode. If affirmative in the step S244, the processing goes to a step S308 (FIG. 26); whereas, if negative, the processing goes to a step S310 (FIG. 26).

In the step S242, if the receiver supports the dual/single mixture mode of the present invention, in the step S246, the remaining pre-procedure of the facsimile is carried out. Here, bit Y of FIF in the DCS signal is set to 1 and the transmission is effected.

In a step S248, initialization is effected so that address of variable L is set in the physical page counter and the side flag is set to "front" side. The variable L is a counter similar to the variable K and is operated to indicate the number originals being transmitted.

In a step S250, a variable area of "total page number" (assigned to the memory circuit 18) is set to (2K–entire-white page number). That is to say, since the variable K is the number of the originals read, the "total page number" obtained by subtracting the entire-white page number from the variable K indicates the page number of the image data including the effective (not entire-white) images. Incidentally, the entire-white page number can be sought by counting the number of flags set in the step S228.

In a step S251, the variable L is set to 1 (first page of the transmitted original).

In a step S252, a variable area of "page counter" (assigned to the memory circuit 18) is set to 1. The "page counter" serves to count page number added to header informations (transmitter informations) 165 to 168 (refer to FIG. 28).

In a step S254, a variable area of "page number" (assigned to the memory circuit 18) is set to 1. The "page number" is a counter for counting the page number (PN) transmitted by the Q signal or the PPS-Q signal.

In a step S256, the image information on the side ("front" or "back") represented by the side flag and corresponding to the page shown by the physical page counter is transmitted as facsimile image message. In this case, the header informations (transmitter informations) 165 to 168 are obtained by forming transmission date/time, identification number (telephone number, mail address and the like) of a calling station, name of the calling station (or nay user-defined character train), page number and the like as images by using a character generator. In this case, information of the page number included in the header informations (transmitter informations) 165 to 168 is produced in the form of "page counter"/"total page number" (refer to FIG. 28).

Figure 23:
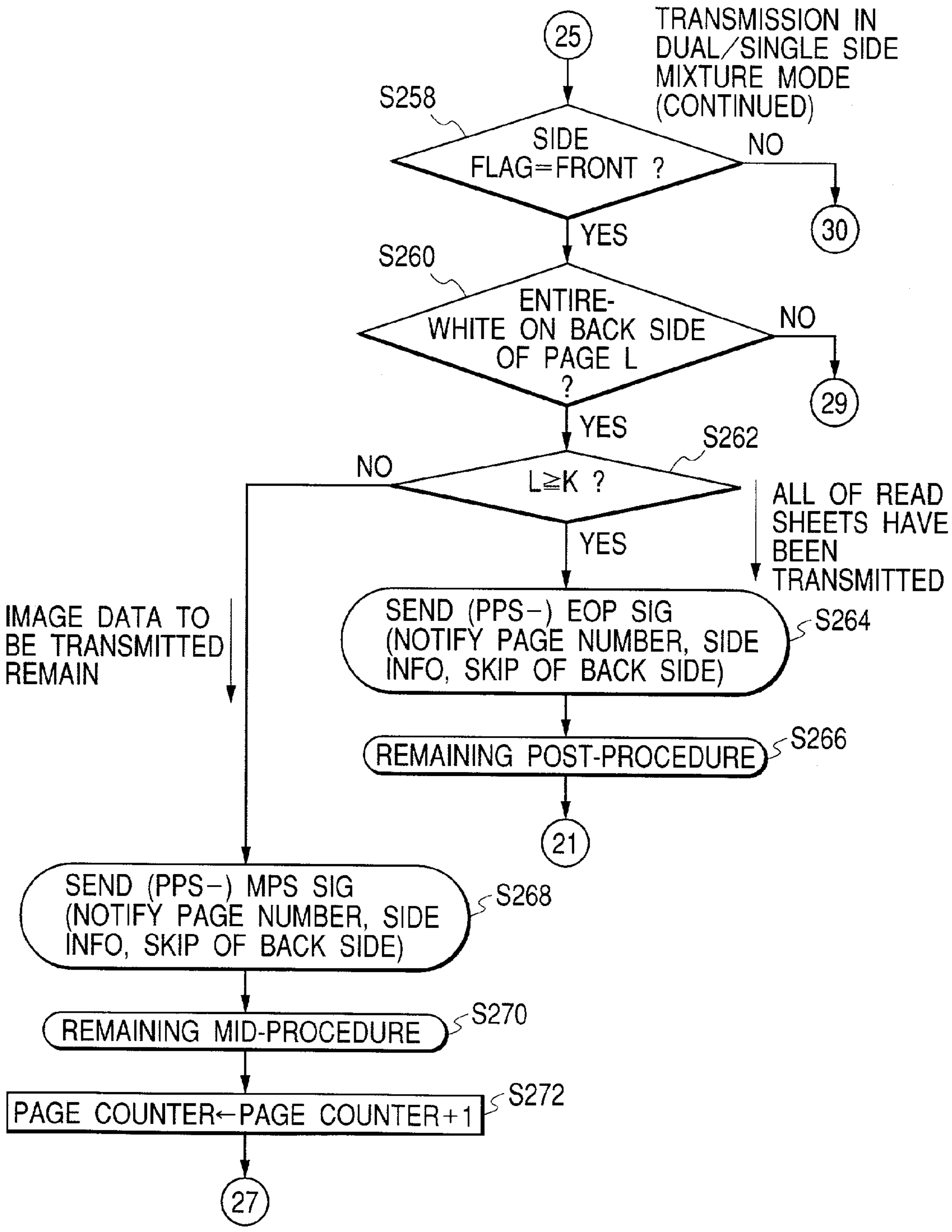
FIG. 23 is a flow chart showing communication control of the CPU 22 of the second embodiment.
Figure 25:
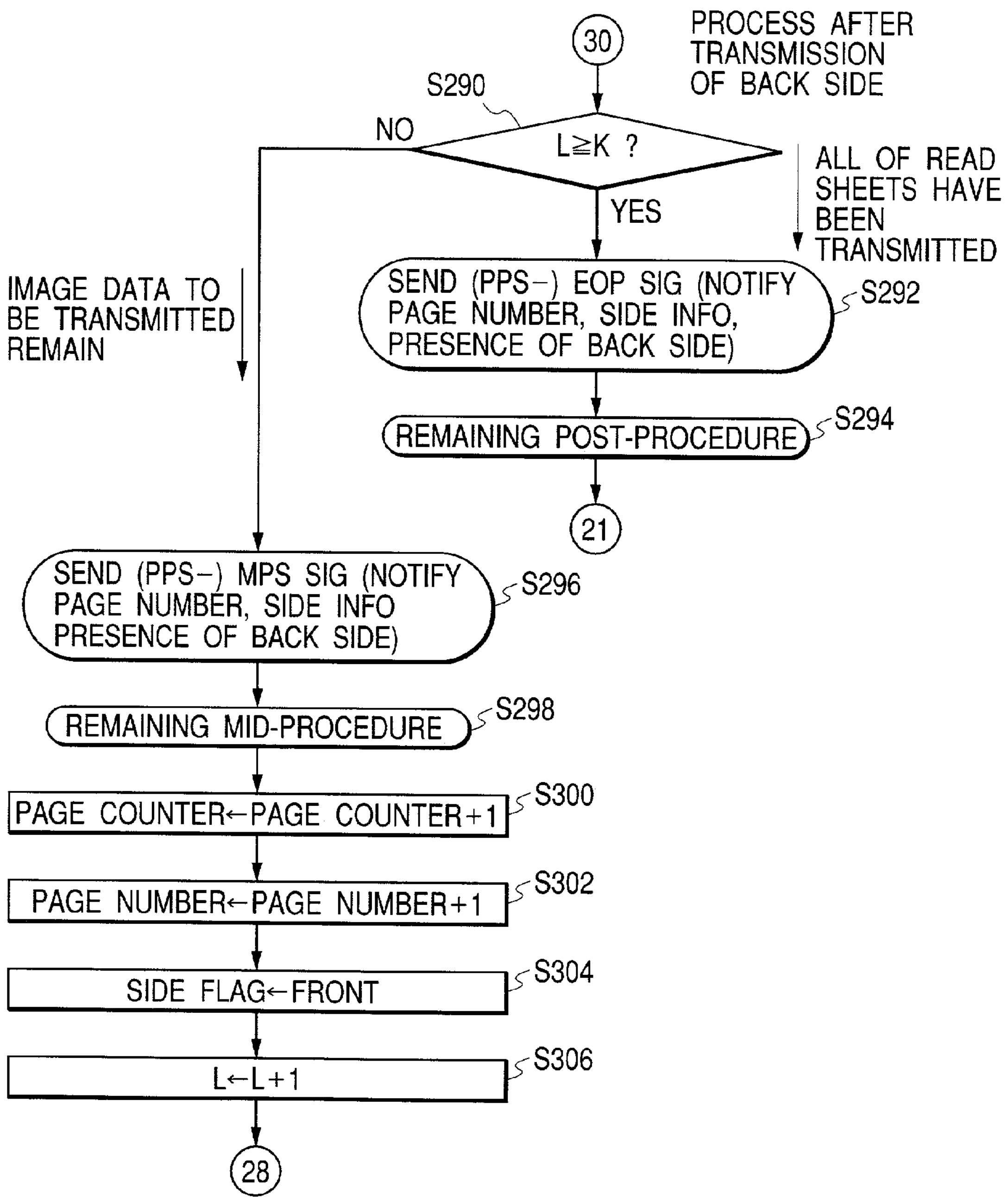
FIG. 25 is a flow chart showing communication control effected by the CPU 22 of the second embodiment.
Figure 26A:
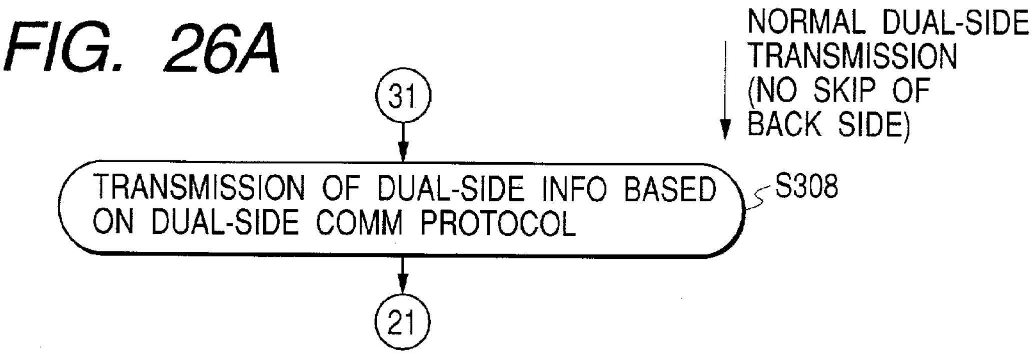
FIGS. 26A, 26B, 26C and 26D are flow charts showing communication control of the CPU 22 of the second embodiment.
Figure 26B:
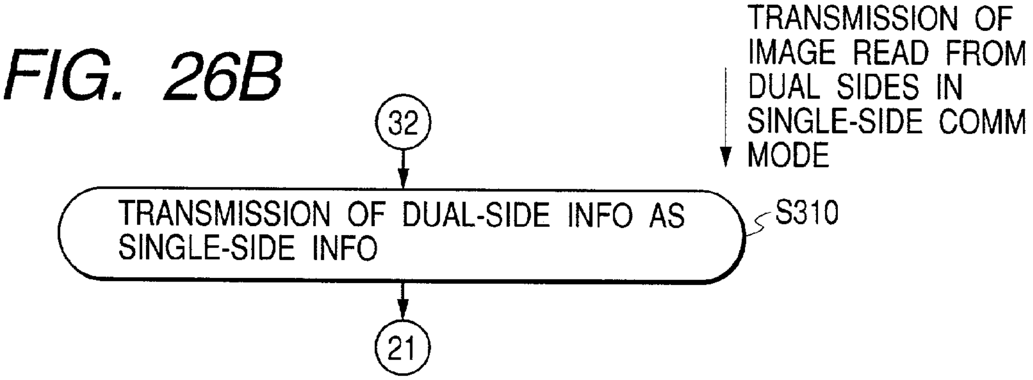
Figure 26C:
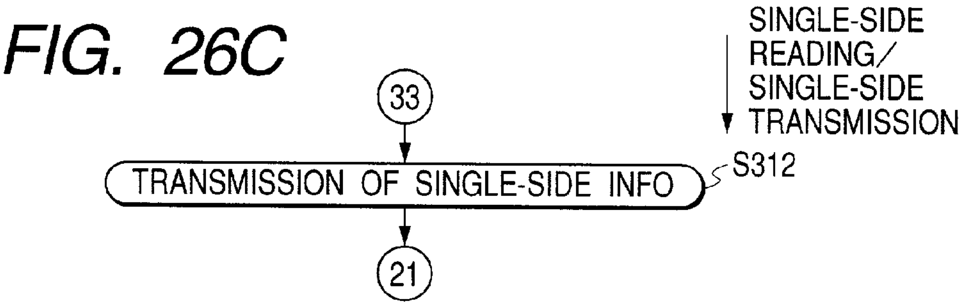
Figure 26D:
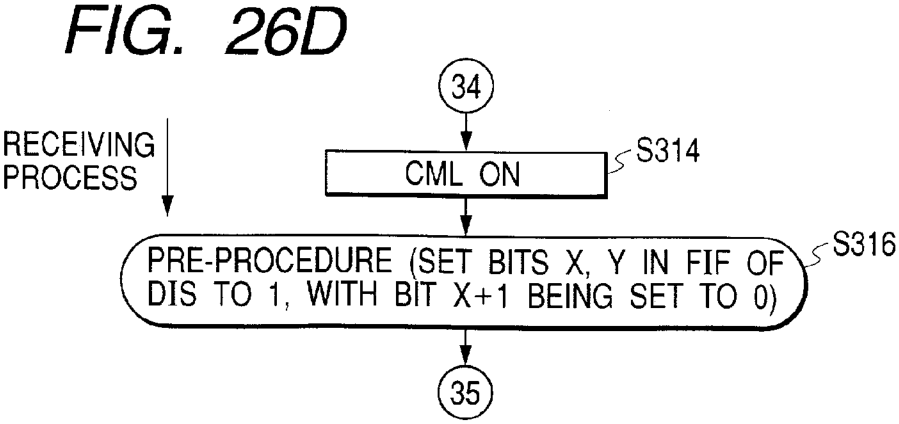

Following to the step S256, in the step S258 shown in FIG. 23, it is judged whether the side flag is "front" or not. If the side flag is "front", i.e., if the image on the front side is being transmitted, the processing goes to a step S260; whereas, if the side flag is "back", i.e., if the image on the back side is being transmitted, the processing goes to a step S290 (FIG. 25).

Figure 24A:
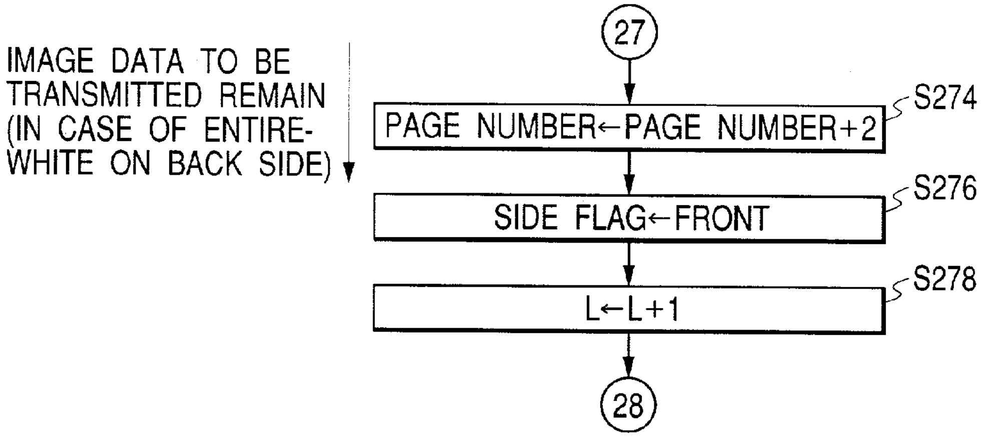
FIGS. 24A and 24B are flow charts showing communication control of the CPU 22 of the second embodiment.
Figure 24B:
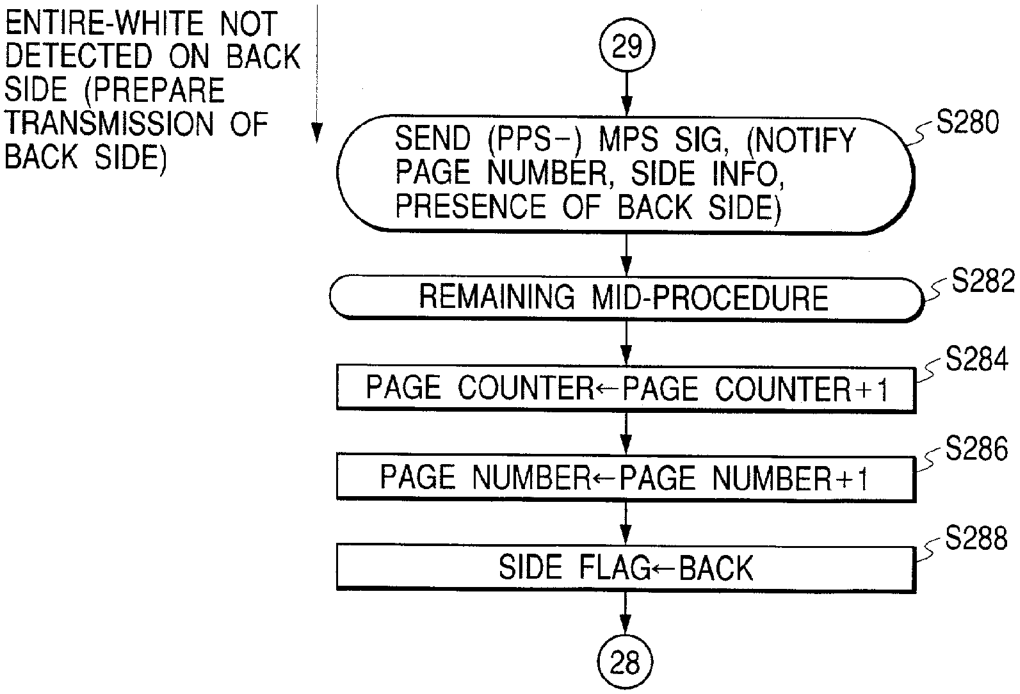

If the image on the front side is being transmitted, in the step S260, it is judged whether the back side (back side corresponding to the front side now transmitted) of the page of the variable L shown by the physical page counter is entire-white or not. If affirmative in the step S260, the processing goes to a step S262; whereas, if negative, the processing goes to a step S280 (FIG. 24).

In the step S262, it is judged whether the value of the variable L is greater than the value of the variable K. At this stage, since the variable L indicates the number transmitted and the variable K indicates the number read, after all, here, it is judged whether the number read is completely transmitted or not. If affirmative in the step S262, the processing goes to a step S264; whereas, if negative, the processing goes to a step S268.

In the step S264, (PPS-)EOP signal is transmitted as the post message signal. Here, informations regarding page number (PN), side information (SIDE) and presence/absence of the back side (bit 1 in Page Information) are informed. In the step S264, since the back side is entire-white (refer to the step S260), here, the presence/absence of the back side is "1" (back side is skipped).

In a step S266, the remaining post-procedure of the facsimile is carried out, and the processing is returned to the step S208 shown in FIG. 20.

On the other hand, in the step S262, if the original image to be transmitted is remaining, in the step S268, (PPS-)MPS signal is transmitted as the post message signal. Here, informations regarding page number (PN), side information (SIDE) and back side skip (bit 1 in Page Information) are informed. In the step S268, since the back side is entire-white (refer to the step S260), here, the presence/absence of the back side is "1" (back side is skipped).

In a step S270, the remaining intermediate procedure is carried out, and, in a step S272, the value of the page counter is incremented by one. In a step S274 shown in FIG. 24, the value of the page counter is incremented by two.

Further, in a step S276, the side flag is set to "front", and, in a step S278, the value of the variable L is incremented by one (increment is effected only when the back side is transmitted), and the processing is returned to the step S256 shown in FIG. 22, where the transmission of the front side of the next original is started.

On the other hand, if the back side is not entire-white in the step S260 (FIG. 23), in the step S280, (PPS-)MPS signal is transmitted as the post message signal. Here, informations regarding page number (PN), side information (SIDE) and presence/absence of the back side (bit 1 in Page Information) are informed. In the step S280, since the back side is not entire-white (refer to the step S260), here, the value of the presence/absence of the back side is "0" (not skipped).

In a step S282, the remaining informediate procedure is carried out.

In a step S284, the value of the page counter is incremented by one, and in a step S286, the value of the page number is incremented by one, and in a step S288, the side flag is set to "back", and the processing is returned to the step S256 shown in FIG. 22, where the transmission of the back side of the next original is started.

On the other hand, in the step S258 shown in FIG. 23, if the side flag is not the front side, in the step S290 shown in FIG. 25, it is judged whether the value of the variable L is greater than the value of the variable K. Similar to the step S262, this is judgement whether the number read is completely transmitted or not. If affirmative in the step S290, the processing goes to a step S292; whereas, if negative, the processing goes to a step S296.

In the step S292, (PPS-)EOP signal is transmitted as the post message signal. Here, informations regarding page number (PN), side information (SIDE) and presence/absence of the back side (bit 1 in Page Information) are informed. Since the step S292 is transmission of the post message signal corresponding to the back side information, although the value of the presence/absence of the back side is meaningless, here, such value is set to "0" (not skipped).

In a step S294, the remaining post-procedure of the facsimile is carried out, and the processing is returned to the step S208 shown in FIG. 20.

On the other hand, in the step S290, if the original image to be transmitted is remaining, in the step S296, (PPS-)MPS signal is transmitted as the post message signal. Here, informations regarding page number (PN), side information (SIDE) and presence/absence of the back side (bit 1 in Page Information) are informed. Similar to the step S292, the value of the presence/absence of the back side is set to "0" (not skipped).

In a step S298, the remaining intermediate procedure is carried out.

In a step S300, the value of the page counter is incremented by one, and in a step S302, the value of the page number is incremented by one. In a step S304, the side flag is set to "front".

In a step S306, the value of the variable L is incremented by one (increment is effected only when the back side is transmitted), and, in order to transmit the front side of the next original, the processing is returned to the step S256 shown in FIG. 22, where the transmission of the front side of the next original is started.

On the other hand, in the step S244 shown in FIG. 22, if the receiver supports the normal dual-side mode, in a step S308 shown in FIG. 26, the dual-side information is transmitted by using the conventional dual-side communication protocol. Here, the entire-white image information on the back side is also transmitted.

Further, in the step S244 shown in FIG. 22, if the receiver merely supports the single-side mode, in a step S310 shown in FIG. 26, the dual-side information is transmitted as the single-side information. Here, all of the read image informations are transmitted by using the conventional single-side procedure alone.

Further, in the step S214 shown in FIG. 20, if the dual-side transmission is not selected, in a step S312 shown in FIG. 26, the single-side transmission is effected. Here, only the front sides of the originals are read by the reading circuit 14, and all of the read image informations are transmitted by using the conventional single-side procedure alone.

Further, in the step S210 shown in FIG. 20, if the facsimile reception is selected, in a step S314 shown in FIG. 26, CML of the NCU 2 is turned on via the bus 26, thereby connecting the telephone line 2*a* to the facsimile apparatus (hybrid circuit 6).

In a step S316, pre-procedure of the facsimile is carried out. In the illustrated embodiment, bit X and bit Y of FIF in the DIS signal are set to 1, and bit (X+1) is set to 0. Namely, the fact that the dual-side communication in the alternate mode is permitted (bit X=1) and the dual/single side mixture mode of the present invention is permitted (bit Y=1) and the continuous mode is not supported (bit (X+1)=0) is declared to the transmitter. Incidentally, in the illustrated embodiment, in order to simplify the explanation, it is assumed that only the alternate mode and the dual/single side mixture mode of the present invention are supported.

Figure 27:
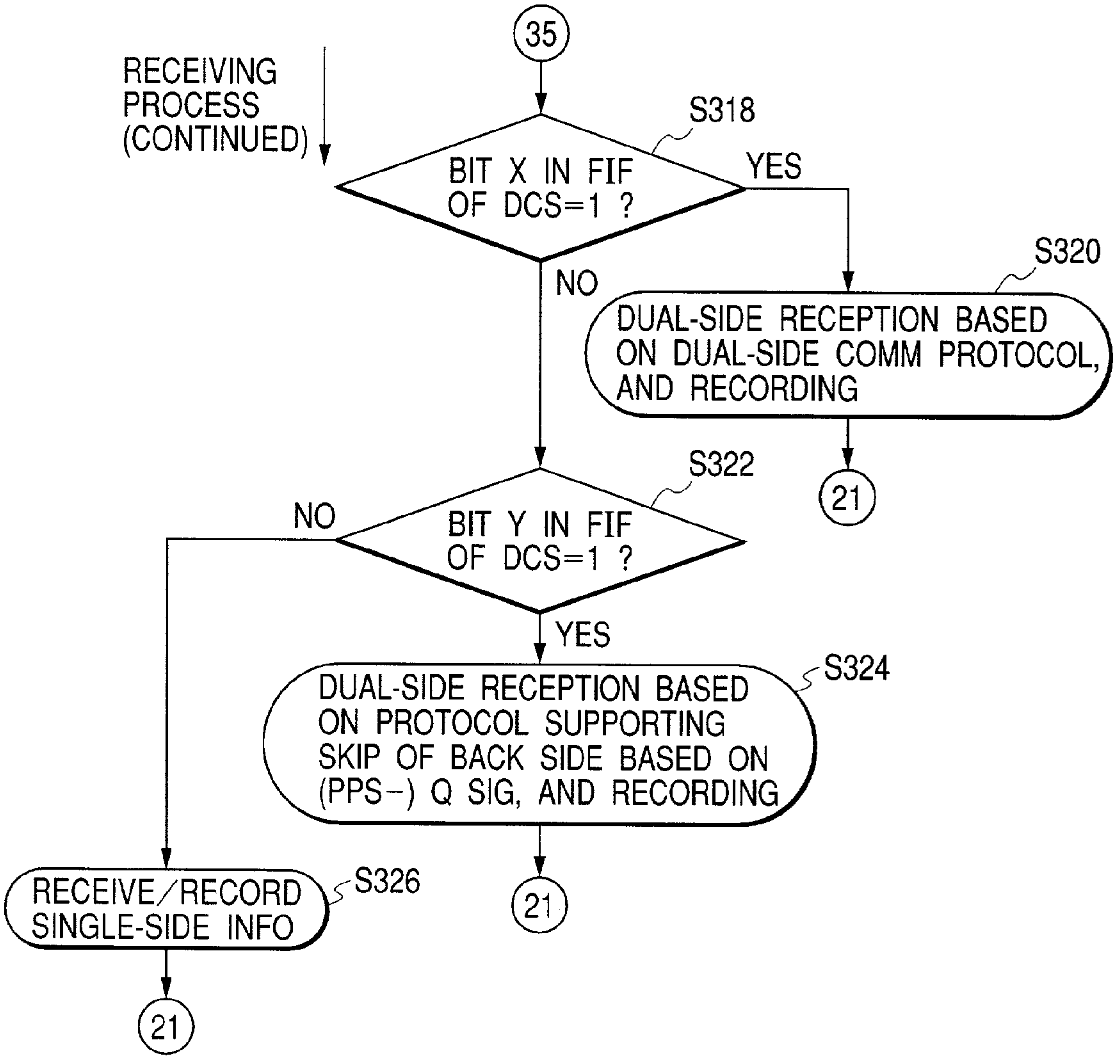
FIG. 27 is a flow chart showing communication control of the CPU 22 of the second embodiment.

In a step S318 shown in FIG. 27, it is judged whether bit X of FIF in the received DCS signal is 1 or not. Namely, it is judged whether the transmitter (calling side) designates the dual-side communication in the alternate mode or not. If affirmative in the step S318, the processing goes to a step S320; whereas, if negative, the processing goes to a step S322. Incidentally, in the illustrated embodiment, since bit (X+1) is set to 0 in the step S316, the judgement of bit (X+1) is not effected.

In the step S320, reception is effected on the basis of the conventional dual-side communication protocol. The dual-side communication is executed in the alternate mode, and images received in order of front, back, front . . . are recorded by the recording circuit 16. Here, the back sides are not skipped.

On the other hand, in the step S318, if bit X of FIF in the received DCS signal is not 1, in a step S322, it is judged whether bit Y of FIF in the DCS signal is 1 or not. Namely, it is judged whether the transmitter designates the dual/single side mixture mode of the present invention or not. If affirmative in the, step S322, the processing goes to a step S324; whereas, if negative, the processing goes to a step S326.

In the step S322, if bit Y of FIF in the DCS signal is 1, in a step S324, the images received on the basis of the PPS-Q or Q signal (post message signal) in the dual/single side mixture mode of the present invention are recorded by the recording circuit 16. In this case, the back sides are skipped as mentioned above, and the header information including the page number produced as mentioned above is added to the image on each of non-skipped original sides, and such images are transmitted. At the receiver side, so long as bit 0 of the post message signal is monitored, it can be judged whether the image should be recorded on the front side or the back side of the recording paper, and, so long as bit 1 of the post message signal immediately after the image message of the front side is monitored, it can be judged whether there is the image on the back side corresponding to such front side, and, on the basis of both judged results, the recording processing of the recording circuit 16 can be controlled.

In a step S326, the image reception on the basis of the conventional single-side protocol and the recording processing of the recording circuit 16 are carried out.

In this way, according to the illustrated embodiment, the following advantages can be obtained.

If the original back side is substantially entire-white, since only the effective image information on the front side is transmitted and the transmission of the back side is skipped, the image data including dual/single side mixture can be transmitted and received efficiently at a high speed.

Further, since the page number (PN) and the front/back discrimination information (SIDE) stipulated in the ITU-T Recommendation are in the same manner as the case where the transmission of the back side is not skipped with respect to the images on the respective sides to be transmitted without skipping, the communication exchangeability is not deteriorated.

Further, since the header information (transmitter information) regarding the back side to be skipped is controlled not to be recorded at the receiver side and the page number recorded at the receiver side as header information is counted as the page number of the effective image informations and the image informations on the skipped back sides are not counted, the natural header information which does not afford the strange impression to the user at the receiver side can be recorded.

Incidentally, in the above explanation, while an example that the dual/single side mixture mode of the present invention is effected only in the alternate mode was explained, the skipping of the back side on the basis of bit 1 of the post message signal according to the present invention can be executed also in the continuous mode, and, the production of the page number of the header information can similarly be effected.

In summary, since the difference between the alternate mode and the continuous mode is merely that the images on the front and back sides are transmitted into the transferring path in different order, for example, in the above-mentioned flow chart, by replacing the transmission of the image by the storing of the image in the image memory, image data to be transmitted in the continuous mode can be prepared, and then, the image data may be transmitted in order corresponding to the continuous mode.

Further, in the above explanation, while an example that the header information (transmitter information) is produced at the transmitter side as the image information and then is transmitted (step S256 in FIG. 22) was explained, the header information (transmitter information) and the value of the page counter (entire page number) included therein can be transmitted in any other style than the image data style (for example, transmitted by using FIF in a specific facsimile procedure signal), and they may be converted into images and be recorded at the receiver side.

In the above explanation, while the facsimile exclusive machine was described, the present invention is not limited to the facsimile exclusive machine but can be applied to other types of facsimile apparatuses. For example, the present invention can be applied to an arrangement in which a FAX MODEM is externally or internally mounted to a general-purpose terminal such as a personal computer and facsimile communication is effected by software control. In this case, a control program of the present invention can be stored in and supplied from not only the above-mentioned ROM 24 but also any computer readable storing medium such as a hard disk, a floppy disk, an optical disk, a magneto-optical disk or a memory card. Further, it should be noted that the present invention can also be applied to a so-called digital composite machine in which a FAX communication interface or a network interface is mounted to an image forming apparatus.

Third Embodiment

In a third embodiment of the present invention, the same elements as those in the first embodiment are designated by the same reference numerals, and explanation thereof will be omitted.

In the third embodiment, both the dual-side alternate transferring (alternate mode) in which front side images and back side images of respective originals are alternately transmitted and the dual-side continuous transferring (continuous mode) in which all of the front side images of the originals are firstly transmitted and then all of the back side images of the originals are transmitted are supported, and, in both cases, transmission and reception of image on any side (front or back) can be skipped. This function can be utilized to enhance the transferring efficiency, for example, by skipping the transferring of the entire-white image information and is referred to as "dual/single side mixture mode" hereinafter.

In the dual/single side mixture mode according to the third embodiment, the page number (Page Number) and side information (SIDE transmitted as Page Information; i.e., information regarding front−0, back−1) to be transmitted in the Q signal are advanced (increment) also with respect to the skipped side.

Since the transmitter side does not transmit the Q signal regarding the skipped side, although the page number and the side information become discontinuous ultimately, by utilizing the page number and the side information in the Q signal in combination with declaration of the dual/single side mixture mode (described later) and "entire page number" (entire number or serial number), the page position to be recorded and the side to be recorded can be determined correctly at the receiver side.

Further, in the dual/single side mixture mode according to the third embodiment, the transmitter and the receiver clearly declare to each other in the procedure signals such as DIS/DTC/DCS signals (via bit Y and bit (Y+1) which will be described later), and the mode is not executed if such declaration is not effected. The reason is that, if the page number and the side information having discontinuity are transmitted by the Q signal without such clear declaration, unintended communication error may occur, as mentioned above.

Further, in the illustrated embodiment, entire page number (entire number or serial number) (regardless of front and back) successively advanced and applied without discontinuity such as "1, 2, 3, . . . " in correspondence to the image data transmitted as effective images without skipping is included in the Q signal. When the dual/single side mixture mode according to the illustrated embodiment is declared, by monitoring the state of the entire number at the receiver side, it can be ascertained that the image data and the Q signal do not become void due to the error even if there is discontinuity in the page number and the side information.

The procedure signal format and communication sequence according to the illustrated embodiment are shown in FIGS. 29, 30 and 31 to 34.

FIG. 29 is a graph showing construction of information for designating dual-side transferring in FIF of a DIS signal (digital identification signal: transmitted from an image receiving station), a DTC signal (digital transmit command signal: transmitted from an image transmitting station) and a DCS signal (digital command signal: transmitted from the image transmitting station).

Although bit X and bit (X+1) have already been described in the Recommendation T.30, in the illustrated embodiment, in correspondence to bit X and bit (X+1) of each of the DIS/DTC/DCS signals, bit Y and bit (Y+1) (any bit position is possible) are provided for declaring the dual/single side mixture mode according to the illustrated embodiment. In the DIS/DTC/DCS signals, bit Y declares the dual/single side mixture mode in the alternate mode and bit (Y+1) declares the dual/single side mixture mode in the continuous mode (Similar to bit X and bit (X+1), when bit (Y+1) is set to 1, bit Y is also set to 1).

FIG. 30 shows a frame structure of the Q signal (more specifically, EOP (end-of-page) or MPS (multipage signal) or EOM (end-of-message) or the like) in normal G3 transferring and the PPS-Q signal (more specifically, post message signal such as PPS-EOP or PPS-MPS or PPS-EOM or PPS-NULL signal) in ECM communication.

In addition to the contents already described in the Recommendation T.30, in the illustrated embodiment, Page Information is followed by a field of the entire page number (also referred to as "entire PN" hereinafter) by which FCS (frame check sequence) and Flag (flag) are followed. The field of the entire page number has an appropriate width such as 1 to 2 octets.

Among them, as a rule, Page number (page number: also referred to as "PN") is increased one by one from "1" for each side whenever front and back sides of dual-side originals are transmitted. Further, Page information (page information) has a data width of 1 octet and indicates whether the image information side is "front" or "back" (SIDE: side information: bit 0=0 represents the front and bit 0=1 represents the back). At present, bits 1 to 6 are reservation bits and functions thereof are not defined, and a bit 7 is always set to 0 as an expansion bit.

Further, the entire page number is successively increased one by one and added without discontinuity such as "1, 2, 3, . . . " in correspondence to the image data transmitted as the effective images without skipping.

Incidentally, PC, BC and FC are not included in the Q signal used in the normal G3 communication and are used only in the PPS-Q signal used in ECM communication.

Figure 50:
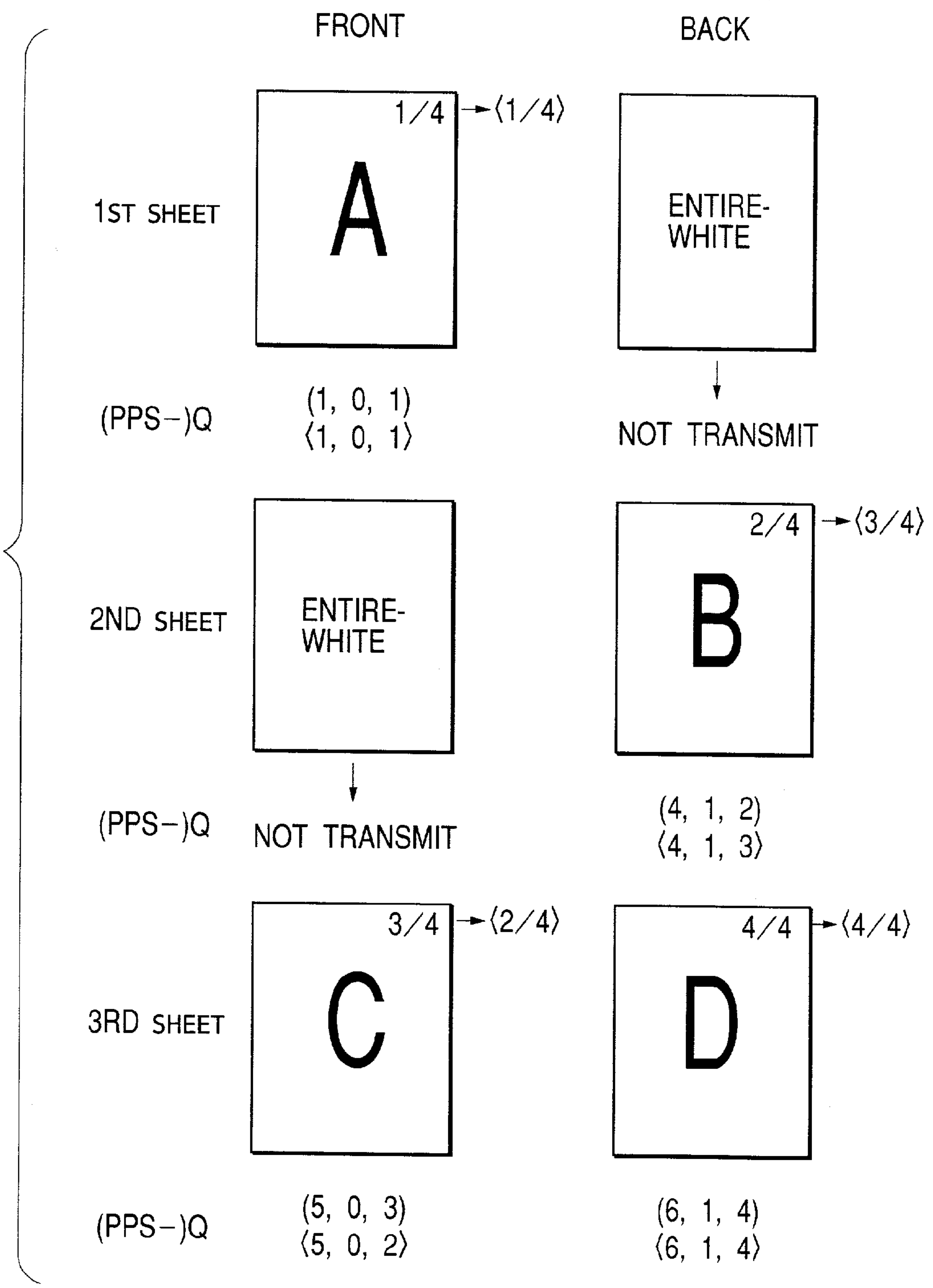
FIG. 50 is an explanatory view showing constructions of original images transmitted in the third embodiment of the present invention.

FIG. 50 shows a state of the dual-side transferring in the illustrated embodiment. FIG. 50 shows a case where transmitting of two image signals regarding a back side of a first original and a front side of a second original (these sides are entire-white) is skipped when three originals are transmitted. Other than the back side of the first original and the front side of the second original, remaining sides are not entire-white and are transmitted together with the Q signal as effective images.

An item such as (1, 0, 1) shown below each effective image corresponds to (page number, side information, entire page number) transmitted regarding said image in the alternate mode. Further, an item such as (1, 0, 1) corresponds to (page number, side information, entire page number) transmitted regarding said image in the continuous mode.

Further, there are indications 1/4 to 4/4 at right upper shoulders of the respective effective images, and, they are header informations produced at the receiver side by utilizing the entire page number in the alternate mode transferring and printed as a part of transmitter information. In 1/4 to 4/4, a numerator indicates the entire page number and a denominator indicates the received total page number (corresponding to the last entire page number). Further, indication such as (3/4) is header information similarly produced in the continuous mode transferring and printed as a part of transmitter information. The reason why the order of functions of these header informations differs from that in the alternate mode is that the transmitting order of the original side images is different between the continuous mode and the alternate mode.

Figure 31:
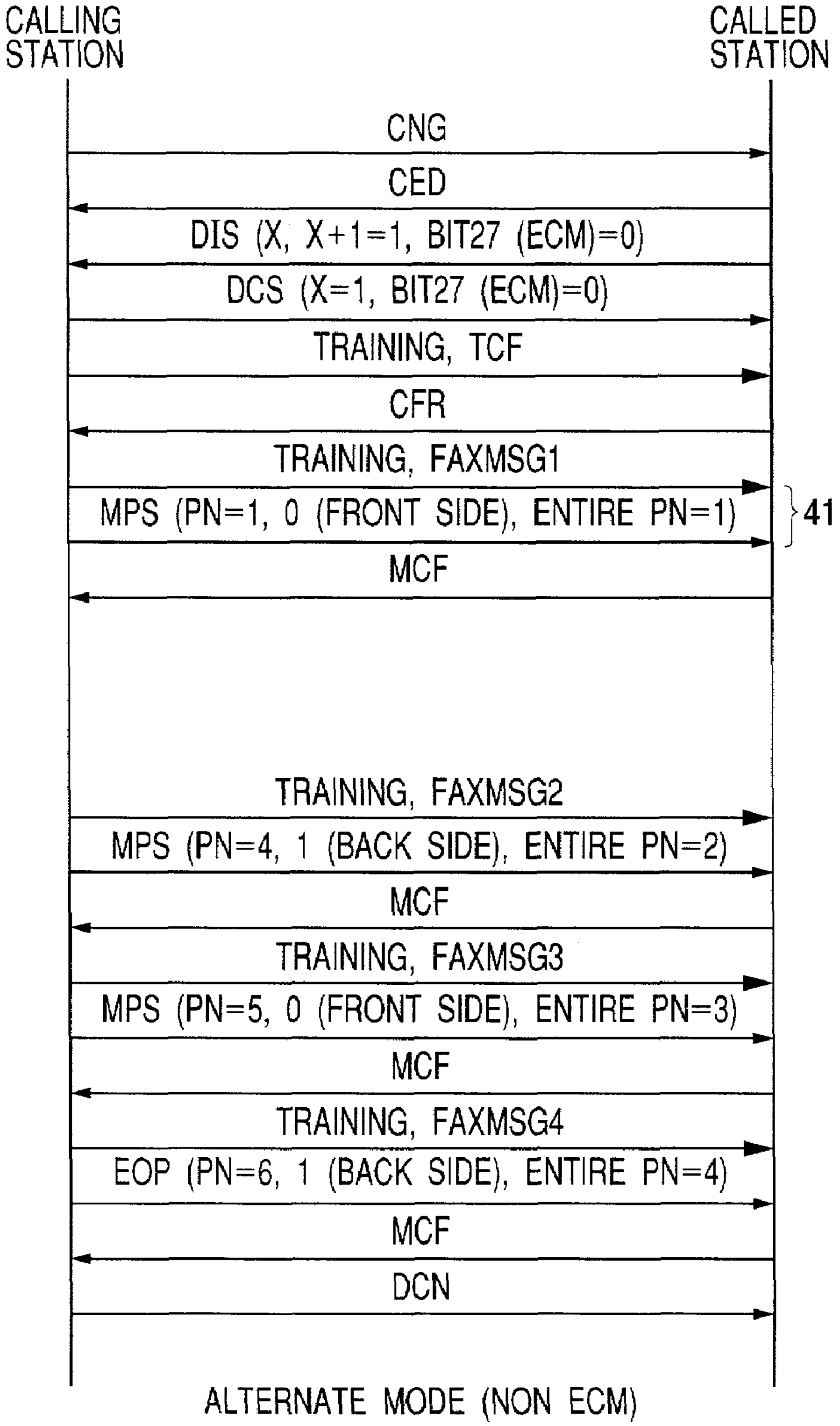
FIG. 31 is an explanatory view showing a state of dual-side transmission at an alternate mode in a non-ECM transmission mode of the present invention.
Figure 32:
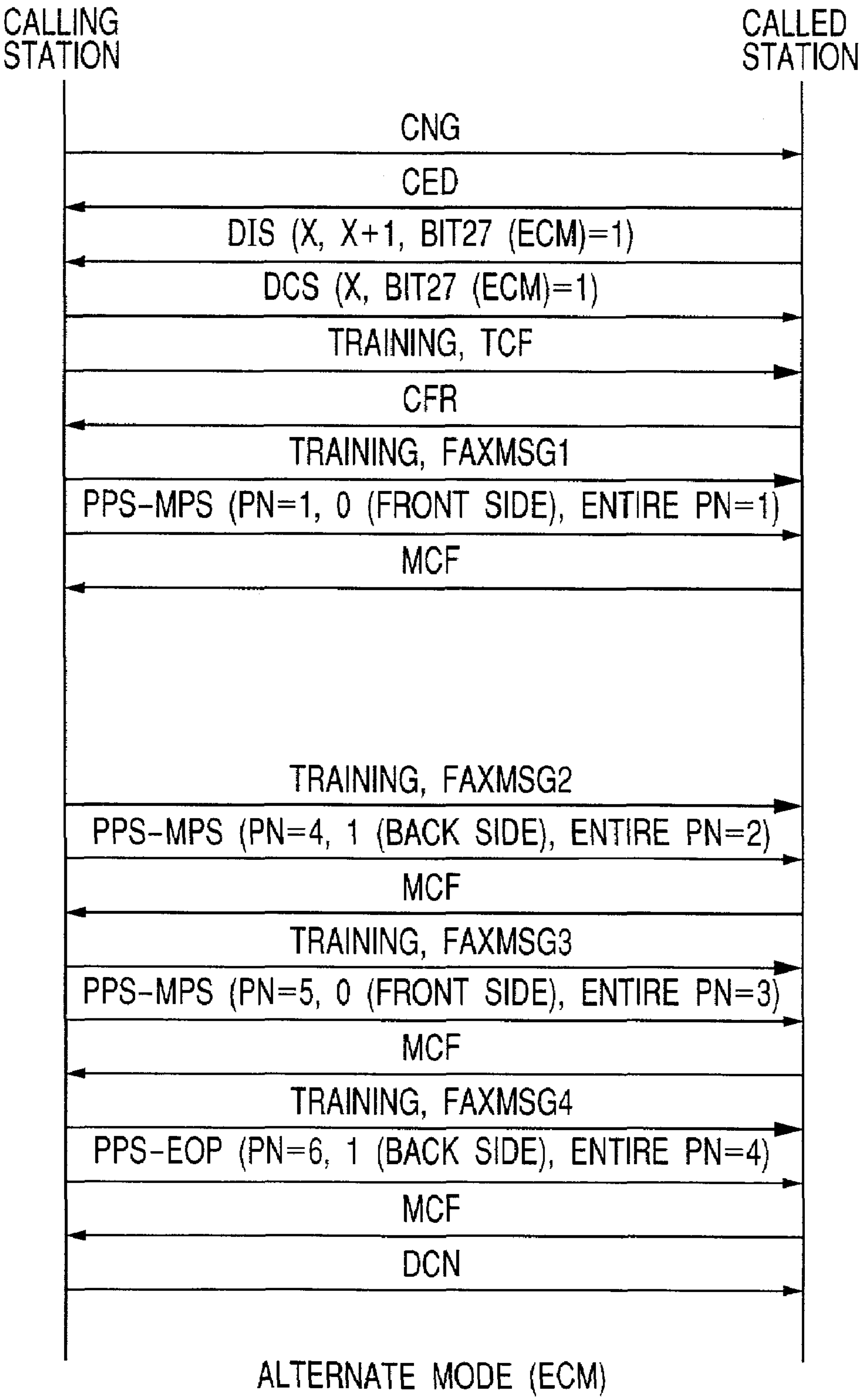
FIG. 32 is an explanatory view showing a state of dual-side transmission at an alternate mode in an ECM transmission mode of the present invention.
Figure 33:
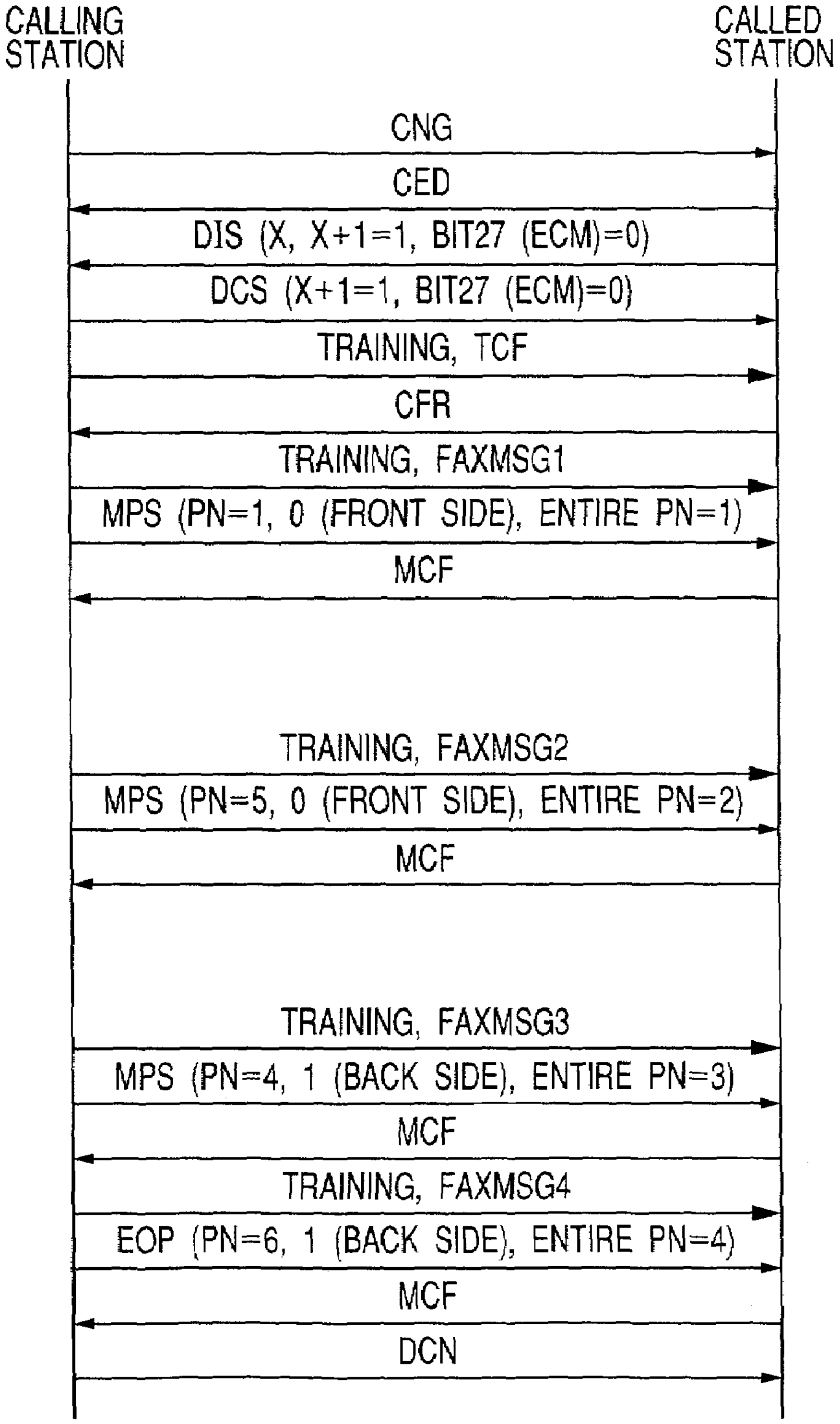
FIG. 33 is an explanatory view showing a state of dual-side transmission at a continuous mode in the non-ECM transmission mode of the present invention.
Figure 34:
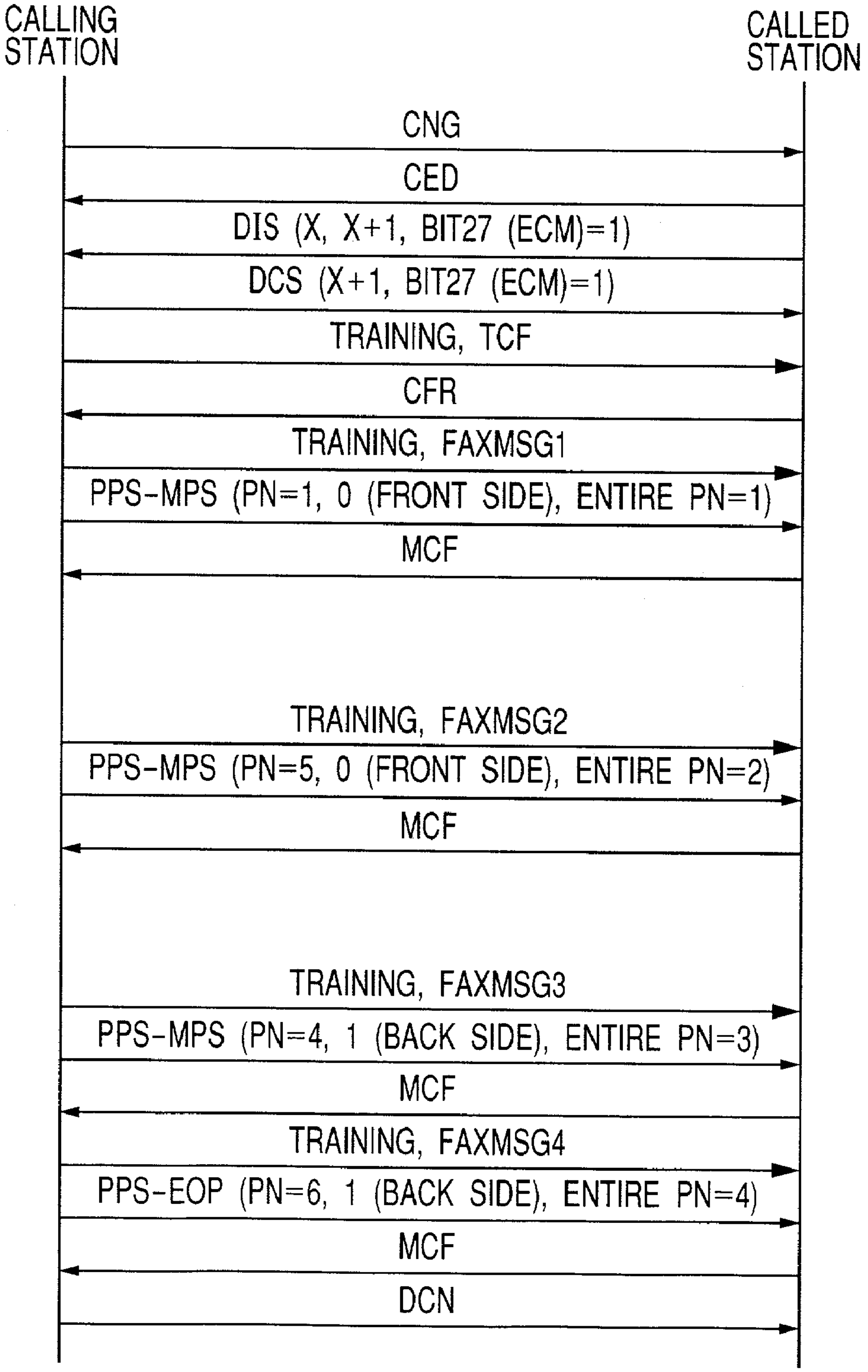
FIG. 34 is an explanatory view showing a state of dual-side transmission at a continuous mode in the ECM transmission mode of the present invention.

FIGS. 31 to 34 show states of communication in the dual/single mixture mode according to the illustrated embodiment. In FIGS. 31 to 34, a signal sequence is shown when the three originals shown in FIG. 50 are transmitted while skipping the back side of the first original and the front side of the second original, where FIG. 31 shows a state of transferring in the dual/single mixture mode at the alternate mode in the normal G3 mode, FIG. 32 shows a state of transferring in the dual/single mixture mode at the alternate mode in the ECM communication mode, FIG. 33 shows a state of transferring in the dual/single mixture mode at the continuous mode in the normal G3 mode, and FIG. 34 shows a state of transferring in the dual/single mixture mode at the continuous mode in the ECM communication mode, respectively.

As shown in FIGS. 31 to 34, the dual-side transferring function (both alternate mode and the continuous mode are possible) of the receiver is indicated by bit X and bit (X+1) of the DIS signal, and the dual-side transferring mode to be executed from now by the transmitter is declared by bit X and bit (X+1) of the DCS signal. In the continuous modes shown in FIGS. 33 and 34, by setting bit (X+1) of the DCS signal to 1, the transmission in the continuous mode is declared. Further, in the illustrated embodiment, in order to designate the dual/single mixture mode in the alternate mode and the continuous mode, bit Y and bit (Y+1) are set in the same condition as bit X and bit (X+1), respectively (since the conditions of bit Y and bit (Y+1) are the same as these of bit X and bit (X+1), bit Y and bit (Y+1) are omitted from illustration in FIGS. 33 and 34).

Further, as shown in FIGS. 31 and 33, in case of the normal mode, the MPS signal is used as the post message signal, and, as shown in FIGS. 32 and 34, in case of ECM, the PPS-MPS signal is used as the post message signal.

Here, three originals are transmitted, and, in FIGS. 31 to 34, "PN" indicates the Page Number.

For example, the MPS signal designated by 41 in FIG. 31 (alternate mode) is illustrated as "MPS (PN=1, 0 (front side))", and, this indicates that the image information having page number 1 (PN=1) and front side (0 (front side)) was transmitted (in FIGS. 32 to 33, expression of the MPS or PPS-MPS signal is the same as the above).

That is to say, in the alternate modes shown in FIGS. 31 and 32, the image informations on the originals are transmitted in order of a front side (0) of a first original (PN=1), a back side (1) of a second original (PN=4), a front side (0) of a third original (PN=5), a back side (1) of the third original (PN=6).

Further, in the continuous modes shown in FIGS. 33 and 34, the image informations on the originals are transmitted in order of a front side (0) of a first original (PN=1), a front side (0) of a third original (PN=5), a back side (1) of a second original (PN=4), a back side (1) of the third original (PN=6).

Further, in all of FIGS. 31 to 34, the entire page number (entire PN) is increased (increment) as 1, 2, 3, . . . in the transmitted order.

Communication control to be executed by the CPU 22 in order to perform the facsimile communication according to the illustrated embodiment is shown in FIGS. 35 to 47, 48 and 49. FIGS. 35 to 49 show a flow of processing of the CPU 22 for realizing the communication control according to the illustrated embodiment as flow charts, and, in FIGS. 35 to 49, the same numerical number indicates continuation. The control procedure shown in FIGS. 35 to 49 is stored in the ROM 24 as a program for the CPU 22.

Figure 35:
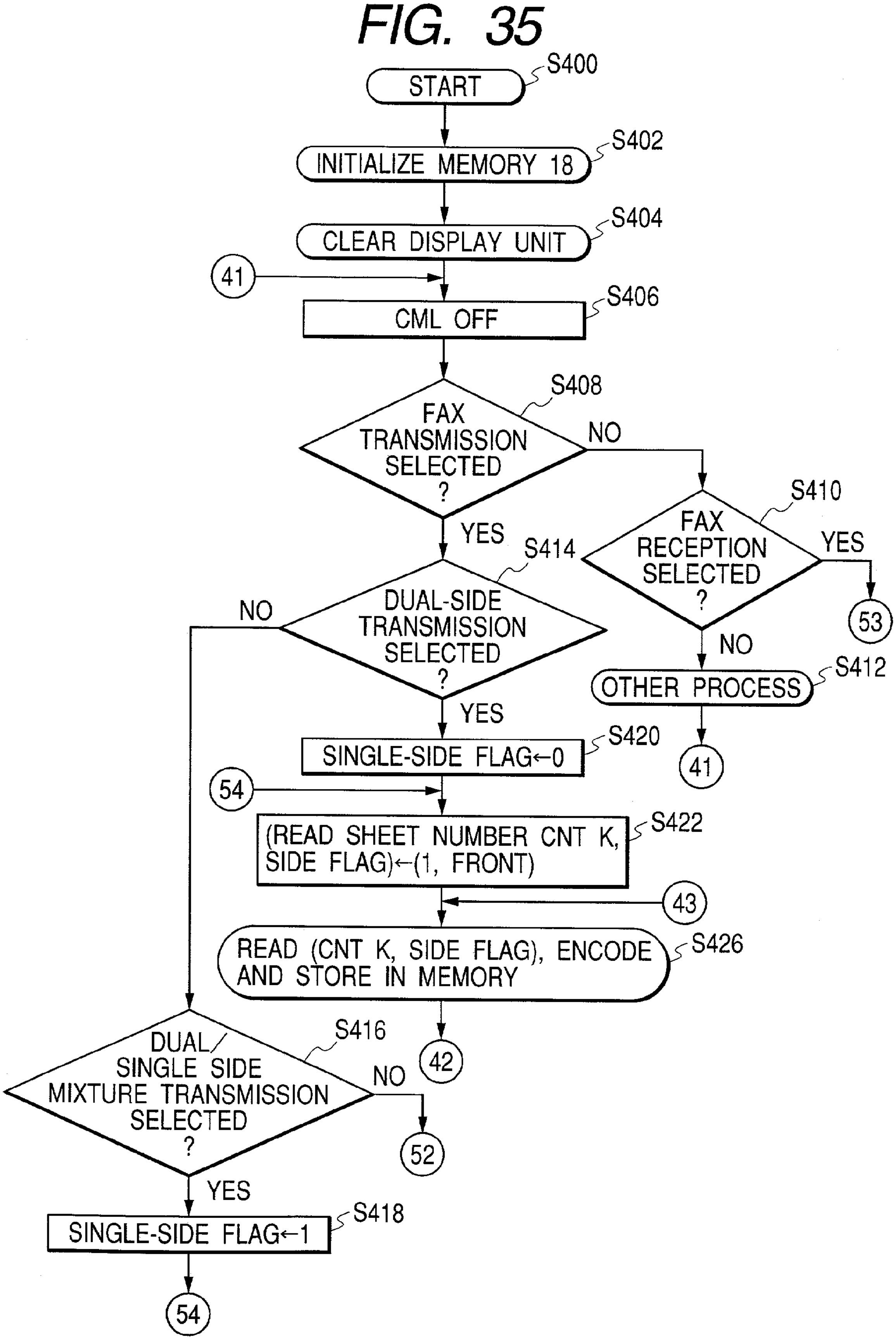
FIG. 35 is a flow chart showing transmission control effected by a CPU 22 of the third embodiment.
Figure 36:
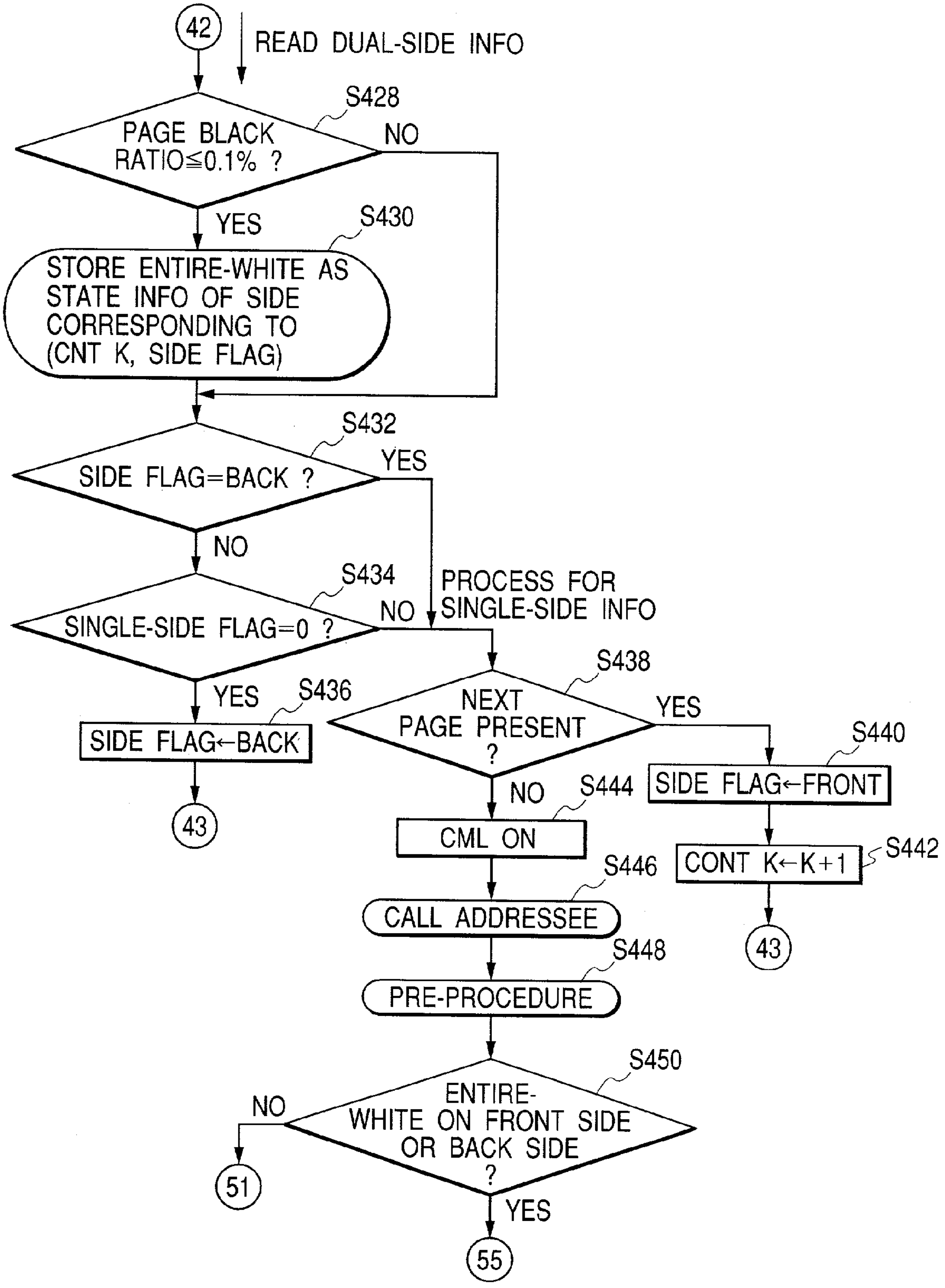
FIG. 36 is a flow chart showing transmission control effected by the CPU 22 of the third embodiment.
Figure 37:
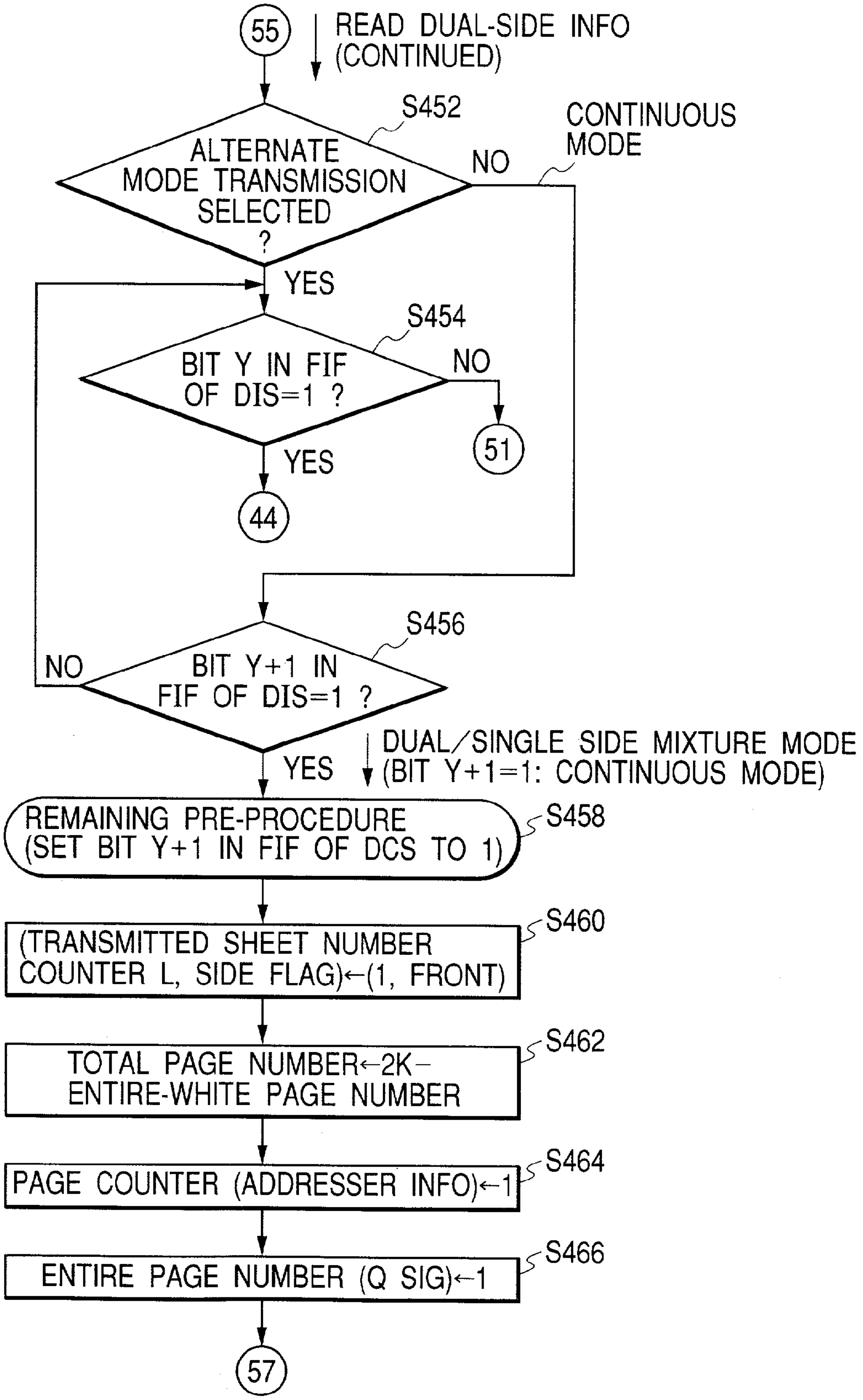
FIG. 37 is a flow chart showing transmission control effected by the CPU 22 of the third embodiment.
Figure 47:
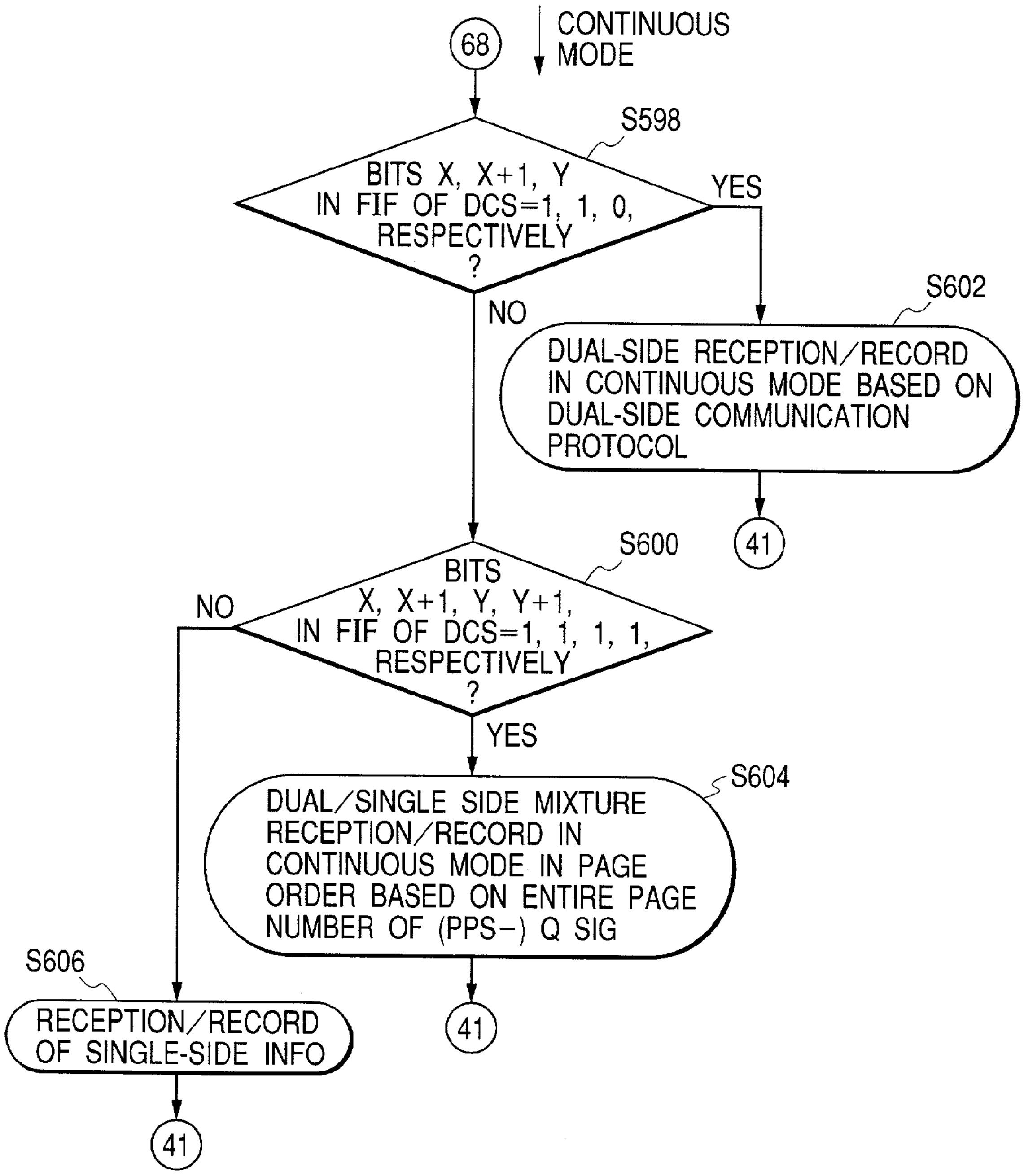
FIG. 47 is a flow chart showing reception control effected by the CPU 22 of the third embodiment.
Figure 48:
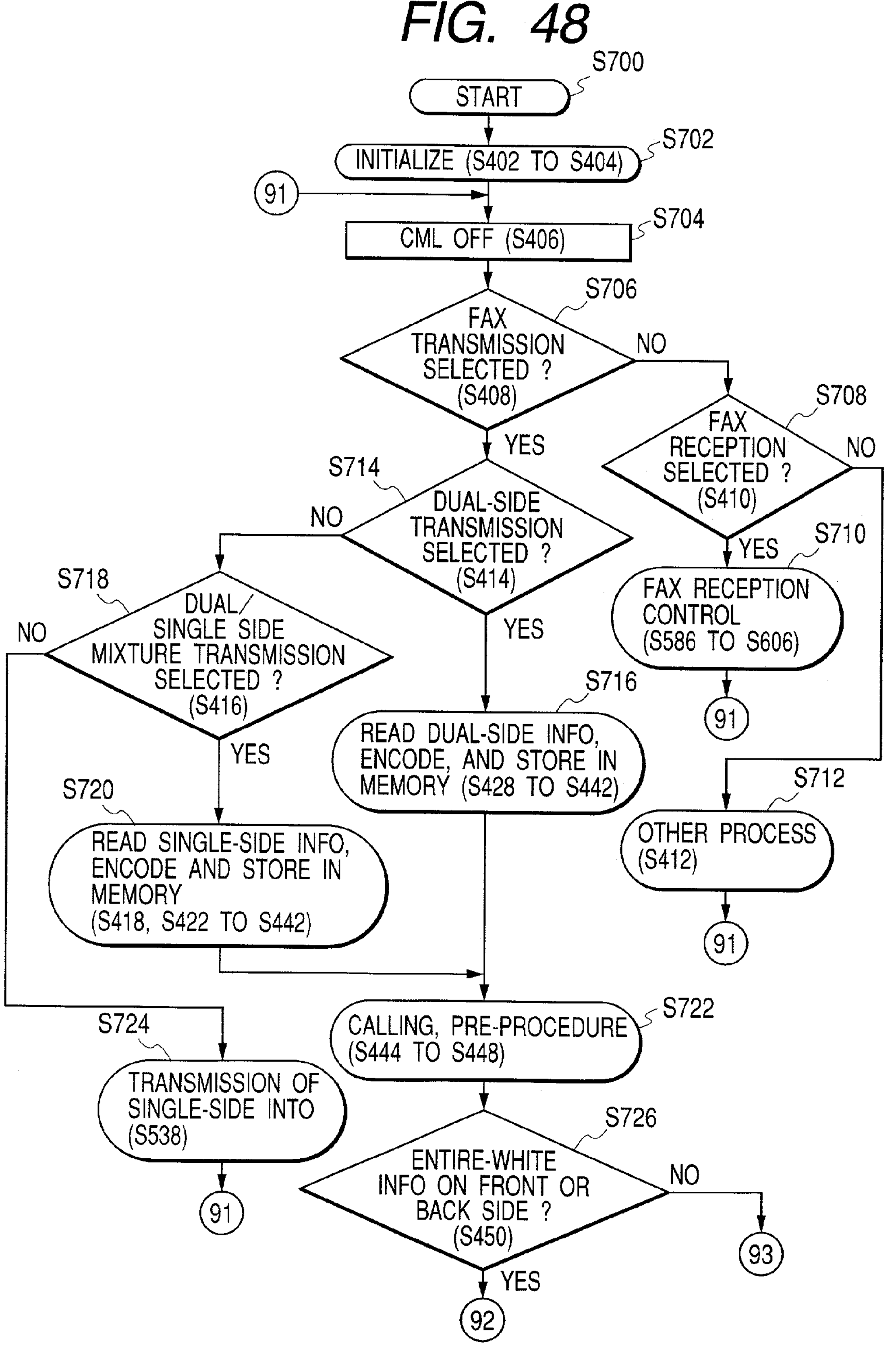
FIG. 48 is a flow chart showing entire flow of the transmission control effected by the CPU 22 of the third embodiment.
Figure 49:
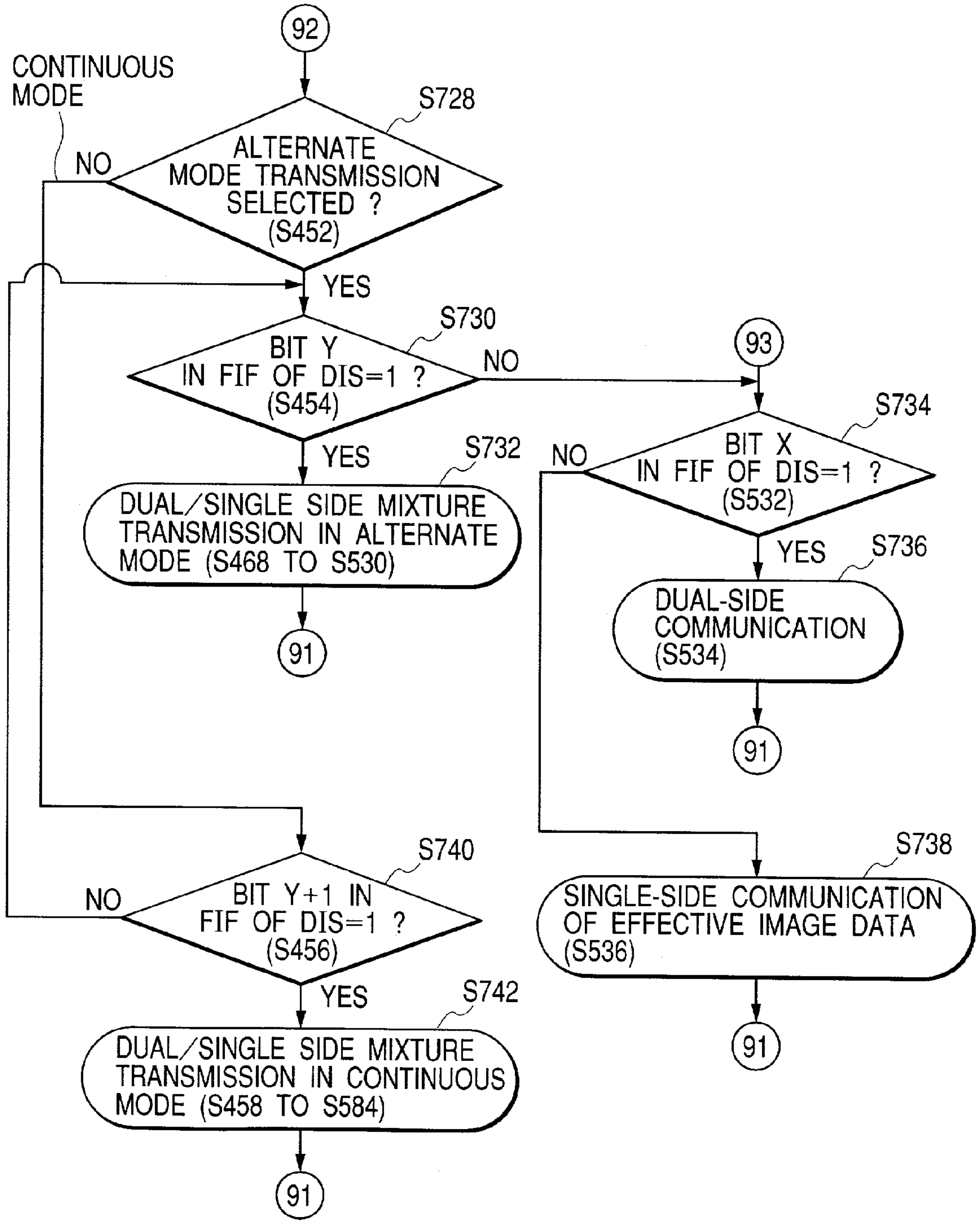
FIG. 49 is a flow chart showing entire flow of the transmission control effected by the CPU 22 of the third embodiment.

FIGS. 48 and 49 schematically show the entire flow of the control procedure shown in FIGS. 35 to 37 in detail. First of all, the entire flow of the control procedure will be explained with reference to FIGS. 48 and 49. Step numbers with a parenthesis "( )" included in explanation regarding FIGS. 48 and 49 correspond to step numbers in FIGS. 35 to 47 which will be described later.

In FIG. 48, a step S700 shows start of the processing initiated by predetermined reset operation.

After start of processing, in a step S702, the memory circuit 18 and various parts of the apparatus are initialized (step S402 to step S404). Further, in the step S702, CML of the NCU 2 is turned OF (step S406 in FIG. 35).

In steps S706 and S708, it is judged whether the facsimile transmission or the facsimile reception is selected. The processing goes to a step S714 upon transmission, to a step S710 upon reception, and to a step S712 except for transmission and reception (steps S408 and S410 in FIG. 35).

Figure 46:
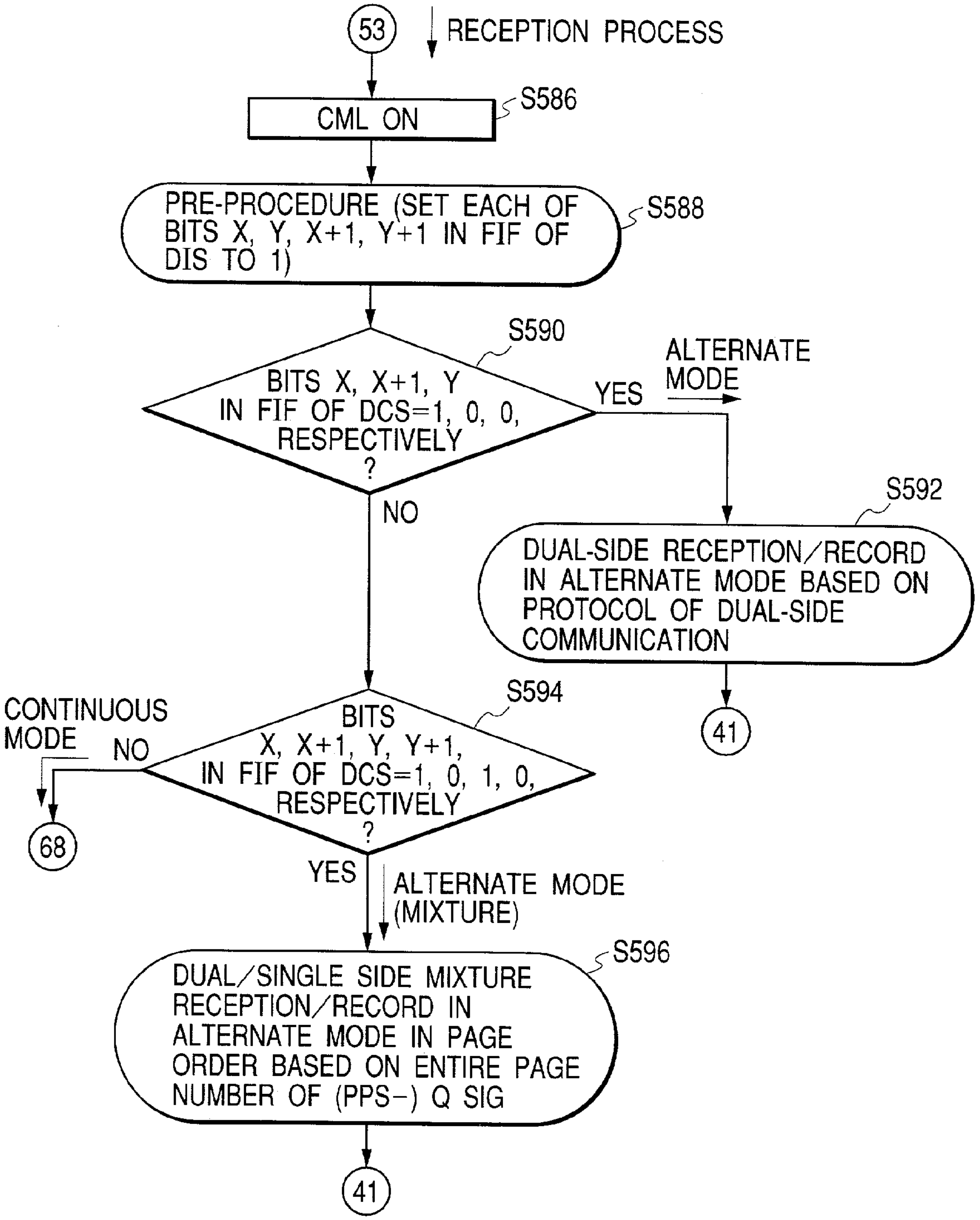
FIG. 46 is a flow chart showing reception control effected by the CPU 22 of the third embodiment.

In case of the facsimile reception, in the step S710, facsimile reception control is effected (steps S586 to S606 in FIG. 46). Other than transmission/reception, in the step S712, other processing (copying of original image or the like) is carried out (step S412 in FIG. 35). After such processing, the processing is returned to the step S704.

In case of the transmission, in the step S714, it is judged whether the transmission in the dual-side transmission mode is effected, or, in a step S718, it is judged whether the single-side information is transmitted by using the dual/single side mixture mode or not (steps S414 and S416 in FIG. 35) In the steps S714 and S718 in FIG. 48, the fact that the designation is judged by the user's clear designating operation is considered, in actual, the dual-side transmission mode and the dual/single side mixture mode are handled by common control flow in the following processing.

When the dual-side transmission is performed, in a step S716, dual-side original informations are read by the reading circuit 14 and the read data are decoded and stored in the memory circuit 18 (step S420 in FIG. 35 to step S442 in FIG. 36). And, in a step S722, an opponent station is called and the pre-procedure of the facsimile is carried out (steps S444 to S448 in FIG. 36).

In case of the transmission in the dual/single side mixture mode, in a step S720, single-side informations are read by the reading circuit 14 and the read data are decoded and stored in the memory circuit 18 (step S418 in FIG. 35, step S422 in FIG. 35 to step S442 in FIG. 36), and the processing goes to a step S722 for calling.

In case of the single-side transmission, in a step S724, the transmission (step S538) of single-side information is executed (step S416 in FIG. 35), and the processing is returned to the step S704.

In a step S726, it is judged whether there is entire-white information on the front or back side of the original. If there is the entire-white information, the processing goes to a step S728 in FIG. 49; whereas, if there is no entire-white information, the processing goes to a step S734 in FIG. 49 (step S450 in FIG. 36).

If there is the entire-white information on either front or back side of the original, in the step S728 in FIG. 49, it is judged whether the alternate mode is selected or not. If affirmative in the step S728, the processing goes to a step S730; whereas, if negative, the processing goes to a step S740 (step S452 in FIG. 37).

In the step S730, it is judged whether bit Y of FIF in the DIS signal obtained from the receiver side is 1 or not, i.e., whether the receiver supports the dual/single side mixture mode of the present invention or not (step S454 in FIG. 37). If affirmative in the step S730, the processing goes to a step S732, where the dual/single side mixture mode in the alternate mode is carried out (step S468 in FIG. 38 to step S530 in FIG. 41), and the processing is returned to the step S704. If negative in the step S730, the processing goes to a step S734.

Figure 41A:
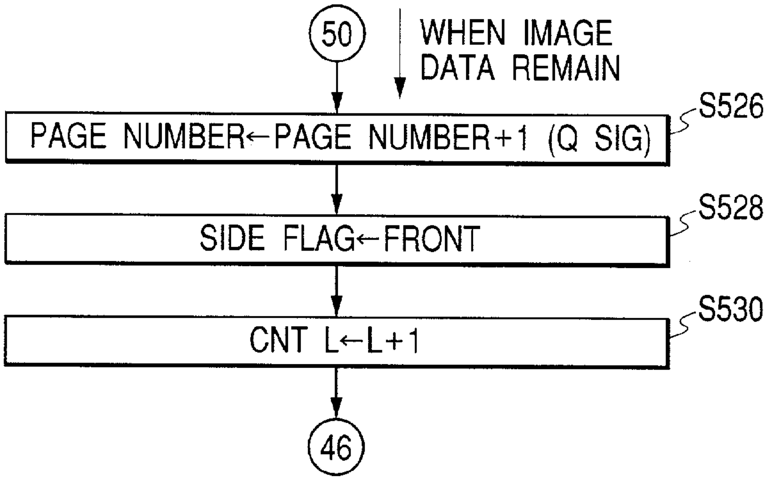
FIGS. 41A, 41B and 41C are flow charts showing transmission control effected by the CPU 22 of the third embodiment.
Figure 41B:
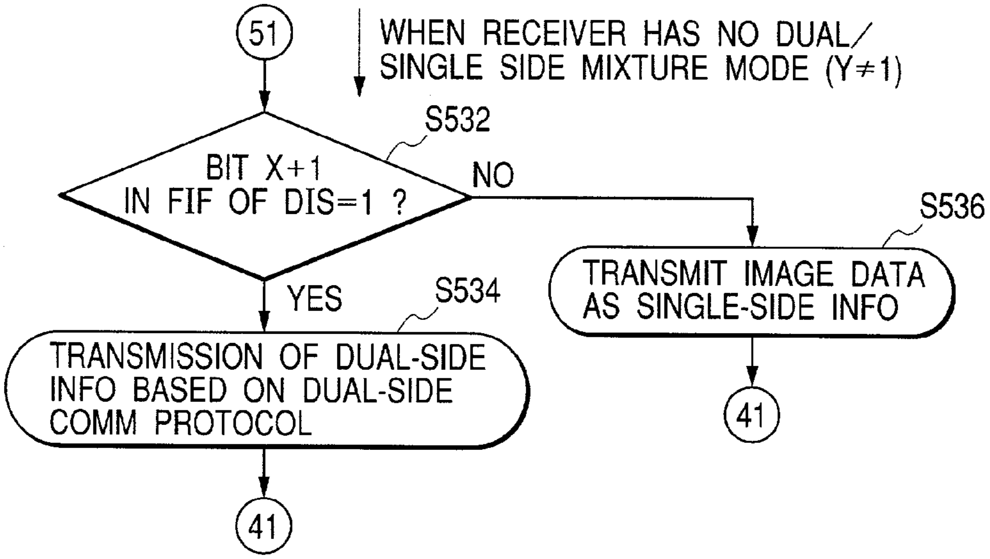
Figure 41C:
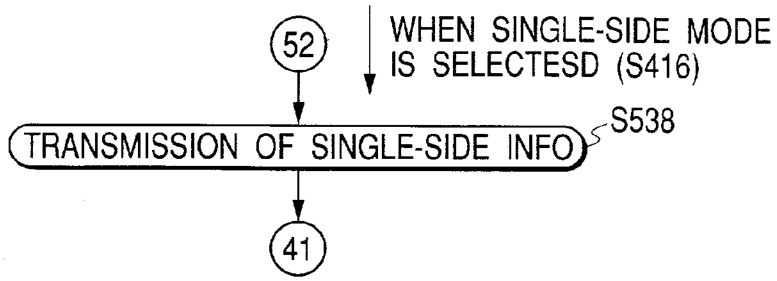

If bit Y of FIF in the DIS signal obtained from the receiver side is not 1, i.e., if the receiver does not support the dual/single side mixture mode of the present invention, in the step S734, it is judged whether bit X of FIF in the DIS signal is 1 or not (i.e., whether or not standard dual-side communication is supported) (step S532 in FIG. 41). If affirmative in the step S734, the processing goes to a step S736, where the dual-side communication is executed in the standard style (step S534 in FIG. 41), and the processing is returned to the step S704. If negative in the step S734, in a step S738, effective image information is transmitted in the single-side communication mode (step S536 in FIG. 41), and the processing is returned to the step S704.

In the step S728, if the continuous mode is selected, in a step S740, it is judged whether bit (Y+1) of FIF in the DIS signal obtained from the receiver side is 1 or not (step S456 in FIG. 37).

Figure 45:
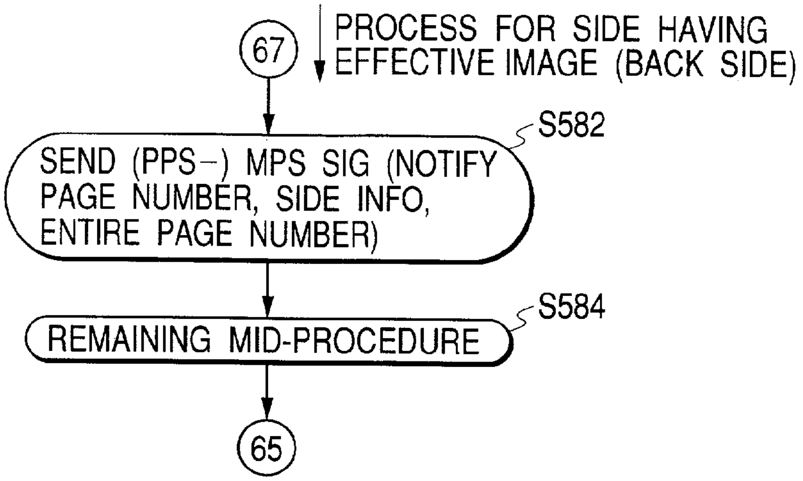
FIG. 45 is a flow chart showing transmission control effected by the CPU 22 of the third embodiment.

If affirmative in the step S740, the processing goes to a step S742, where the transmission in the dual/single mixture mode is effected by using the continuous mode (step S458 in FIG. 37 to step S584 in FIG. 45). If negative in the step S740, the processing goes to the step S730.

Next, the above processing will be fully explained with reference to FIGS. 35 to 47.

In FIG. 35, a step S400 shows start of the processing initiated by predetermined reset operation.

In a step S402, the memory circuit 18 is initialized via the bus 26, and, in a step S404, the display portion of the operation unit 20 is initialized (cleared) via the bus 26.

In a step S406, CML of the NCU 2 is turned off via the bus 26, thereby connecting the telephone line 2*a* to the telephone set 4.

In a step S408, the operation information of the operation unit 20 is inputted via the bus 26, and it is judged whether the facsimile transmission is elected. If the facsimile transmission is elected, the processing goes to a step S414; whereas, if the facsimile transmission is elected, the processing goes to a step S410.

In the step S410, it is judged whether the facsimile reception is elected. If the facsimile reception is elected, the processing goes to a step S586 in FIG. 46. If negative in the step S410, the processing goes to a step S412, where other processing (copying of original image or the like) is carried out.

In case of the transmission, first of all, in a step S414, the information of the operation unit 20 is inputted via the bus 26, and it is judged whether the transmission of the dual-side original is selected or not. If affirmative in the step S414, the processing goes to a step S420; whereas, if negative, the processing goes to a step S416.

If negative in the step S414, in the step S416, it is judged whether the fact that the single-side informations are transmitted in the dual/single side mixture mode is selected or not. If affirmative in the step S416, the processing goes to a step S418.

If negative in the step S416, the processing goes to a step S538 (FIG. 41), where the image data is transmitted in the conventional single-side procedure, and the processing is returned to the step S406. In the single-side transmission, only page information having the image signal may be transmitted.

In a step S418, a single-side flag (represented by "single-side FLG" in FIG. 35) is set to 1. The single-side flag is set to 1 when the single-side informations are transmitted in the dual/single side mixture mode and set to 0 when the dual-side transmission is effected. A storing area of the single-side flag is assigned by using the memory circuit 18 (flags and counters described herein below are the same).

On the other hand, if affirmative in the step S414, in the step S420, the single-side flag is set to 0.

In a step S422, a combination of (reading number counter, side flag) is set to (to 1, front).

In a step S426, image information on the original side represented by the reading number counter and the side flag is read, and the read data is stored in the image memory area of the memory circuit 18.

In a step S428 shown in FIG. 36, it is judged whether the original image read in the step S426 is substantially white (not effective image information) or not. This can be achieved, for example, by judging whether percentage of the number of black dots is smaller than 0.1% (his reference value can appropriately be selected by any skilled person in the art). If affirmative in the step S428, the processing goes to a step S430; whereas, if negative, the processing goes to a step S432.

In the step S430, the information that the side is entire-white is stored in a predetermined area for storing a state of the side (entire-white or not) corresponding to the reading number counter K and the side flag.

In the step S432, it is judged whether the side flag is "back" or not. If the side flag is "back", the processing goes to a step S438; whereas, if the side flag is not "back", the processing goes to a step S434.

In the step S434, it is judged whether the single-side flag is 0 or not. If the single-side flag is 0, the processing goes to a step S436; whereas, if the single-side flag is not 0, the processing goes to a step S438.

In the step S436, the side flag is set to "back", and the processing is looped to the step S426 to read the back side.

In the step S434, if the single-side flag is 1, in a step S438, it is judged whether there is a next page. If affirmative in the step S438, the processing goes to a step S440; whereas, if negative in the step S438, the processing goes to a step S444.

In the step S440, the side flag is set to "front", and, in a step S442, the value of the reading number counter is incremented by one.

In the step S444, CML of the NCU 2 is turned on via the bus 26, thereby connecting the telephone line 2*a* to the facsimile apparatus (hybrid circuit 6).

In a step S446, the calling circuit 10 is controlled via the bus 26 to call a designated address. The address is designated by the ten-key or the one-touch key in the operation unit 20.

In a step S448, pre-procedure of the facsimile is carried out.

In a step S450, by checking the entire-white information stored in the step S430, it is judged whether there is any entire-white information on the front or back sides of the image data. If affirmative in the step S450, the processing goes to a step S452 (FIG. 37); whereas, if negative in the step S450, the processing goes to a step S532 (FIG. 41).

In the step S452 in FIG. 37, by checking the operation condition of the operation unit 20 (or a register storing it), it is judged whether transmission in the alternate mode is selected or not. If the transmission in the alternate mode is selected , the processing goes to a step S454; whereas, if the transmission in the alternate mode is not selected, the processing goes to a step S456.

In the steps S454 and S456, bit Y and bit (Y+1) of FIF in the DIS signal obtained from the receiver side and regarding the dual/single side mixture mode of the present invention are judged.

First of all, in the step S454, it is judged whether bit Y of FIF in the DIS signal obtained from the receiver side in the facsimile pre-procedure is 1 or not. If affirmative in then step S454, the processing goes to a step S468 (FIG. 38); whereas, if negative in the step S454, the processing goes to the step S532 (FIG. 41).

In the step S456, it is judged whether bit (Y+1) of FIF in the DIS signal is 1 or not. If affirmative in the step S456, the processing goes to a step S458; whereas, if negative, the processing goes to the step S454. Steps S458 to S466 will be described later, together with a flow in FIG. 42.

On the other hand, if affirmative in the step S454, if bit Y in the DIS signal in the alternate mode is 1, the dual/single side mixture mode of the present invention (continuous mode) is used. In this case, in the step S468 in FIG. 38, the remaining facsimile pre-procedure is carried out, and, here, bit Y of FIF in the DCS signal is set to 1 (bit (Y+1) is 0).

In a step S470, a combination of (transmitting number counter, side flag) is set to (to 1, front).

In a step S472, a total page number register is set to (2L−entire-white page number).

In a step S474, a page counter (counter for counting page number added to the transmitter information) is set to 1.

In a step S476, entire page number used in the Q signal (or PPS-Q signal) is set to 1.

In a step S478, page number (used in the Q signal or PPS-Q signal) is set to 1.

In a step S482, it is judged whether the image information represented by (transmitting number counter L, side flag) is entire-white or not. If affirmative in the step S482, the processing goes to a step S488 (FIG. 39); whereas, if negative in the step S482, the processing goes to the step S484.

In the step S484, the image information represented by (transmitting number counter L, side flag) is transmitted to the receiver side. In this case, as the transmitter information, header for "page number of value of page counter/total page number" (refer to FIG. 50) is produced and transmitted.

Figure 40A:
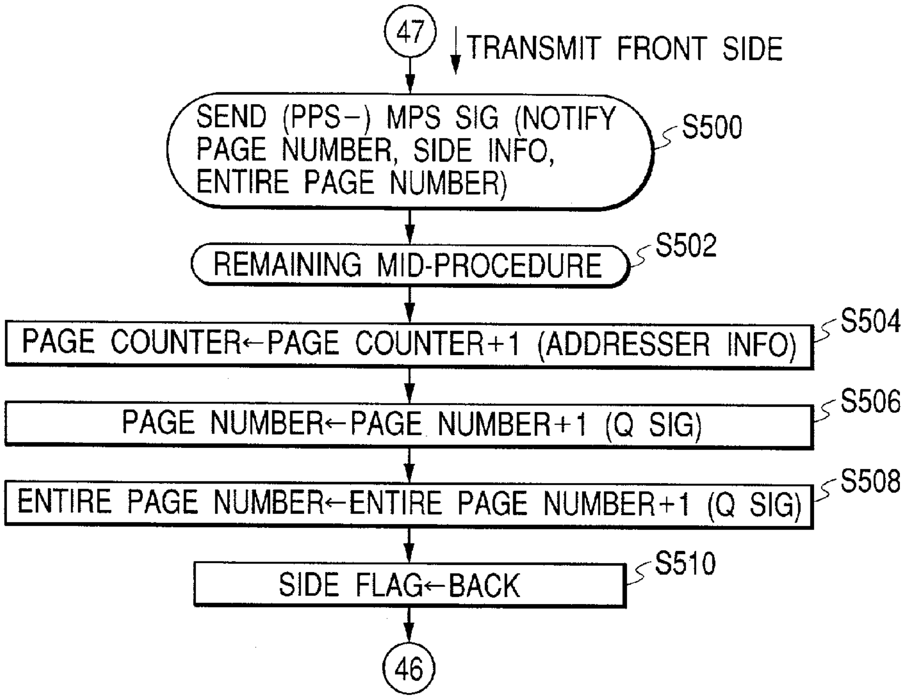
FIGS. 40A and 40B are flow charts showing transmission control effected by the CPU 22 of the third embodiment.
Figure 40B:
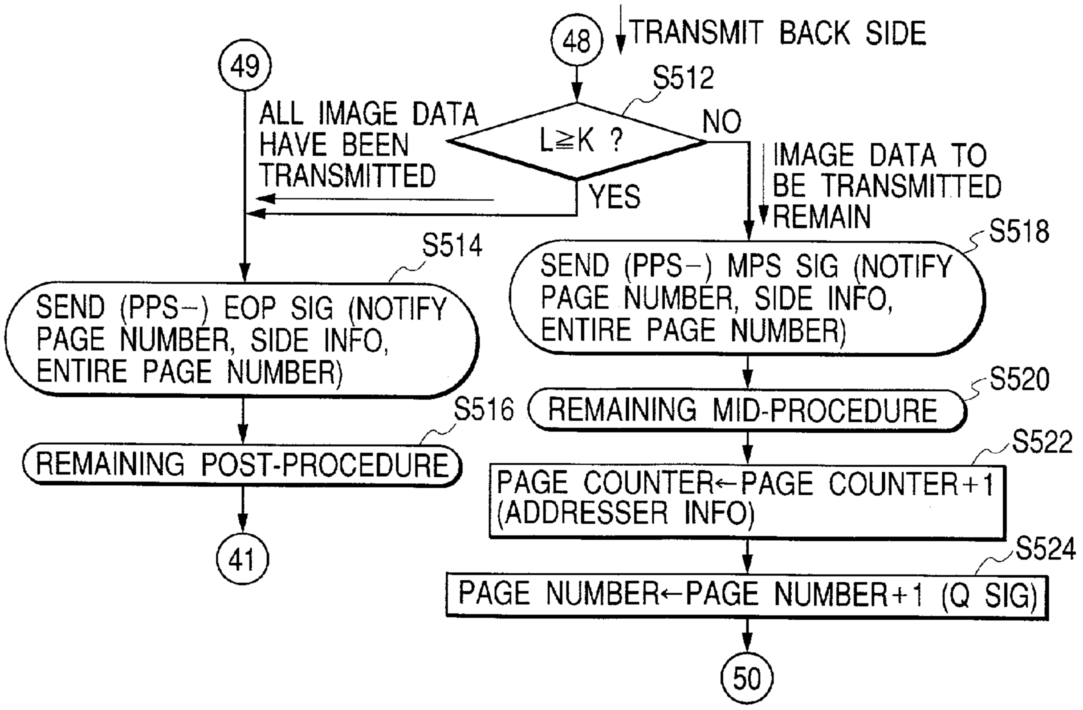

In a step S486, it is judged whether the side flag is "front" or not. If the side flag is "front", the processing goes to a step S500 (FIG. 40); whereas, if the side flag is "back", the processing goes to the step S512 (FIG. 40).

Figure 39:
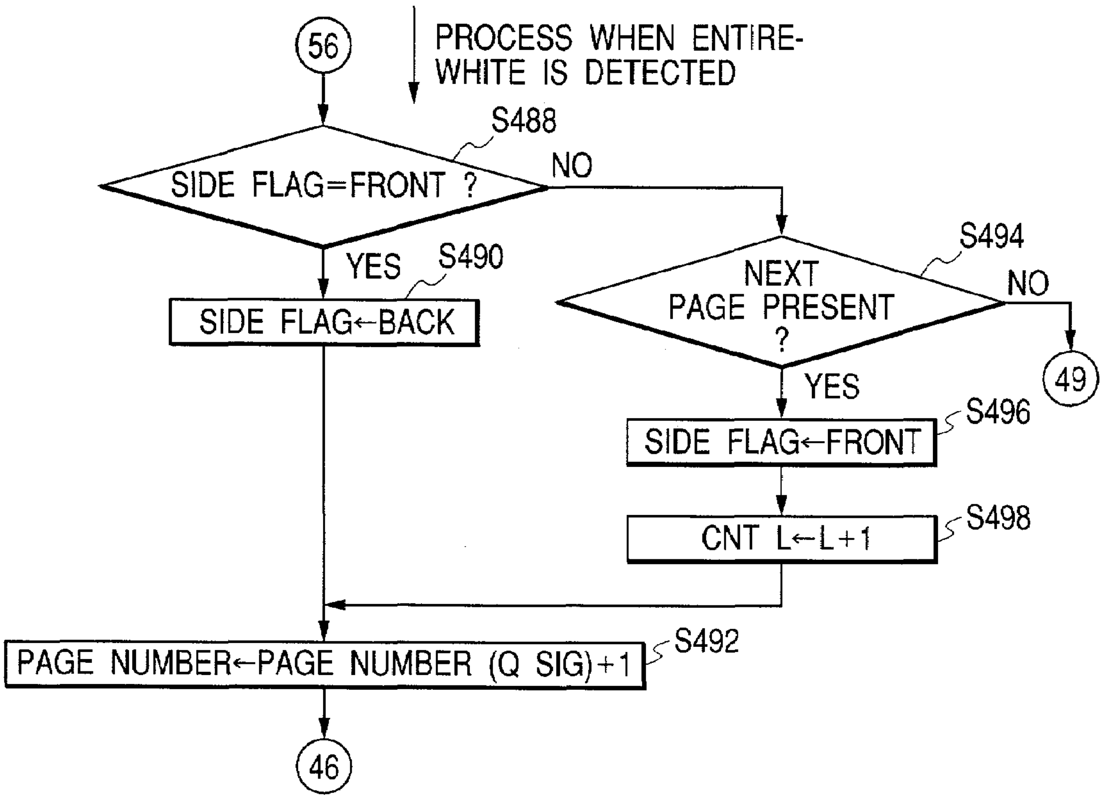
FIG. 39 is a flow chart showing transmission control effected by the CPU 22 of the third embodiment.

If the entire-white side is detected in the step S482, in the step S488 in FIG. 39, it is judged whether the side flag is "front" or not. If the side flag is "front", the processing goes to a step S490; whereas, if the side flag is "back", the processing goes to the step S494.

Figure 38:
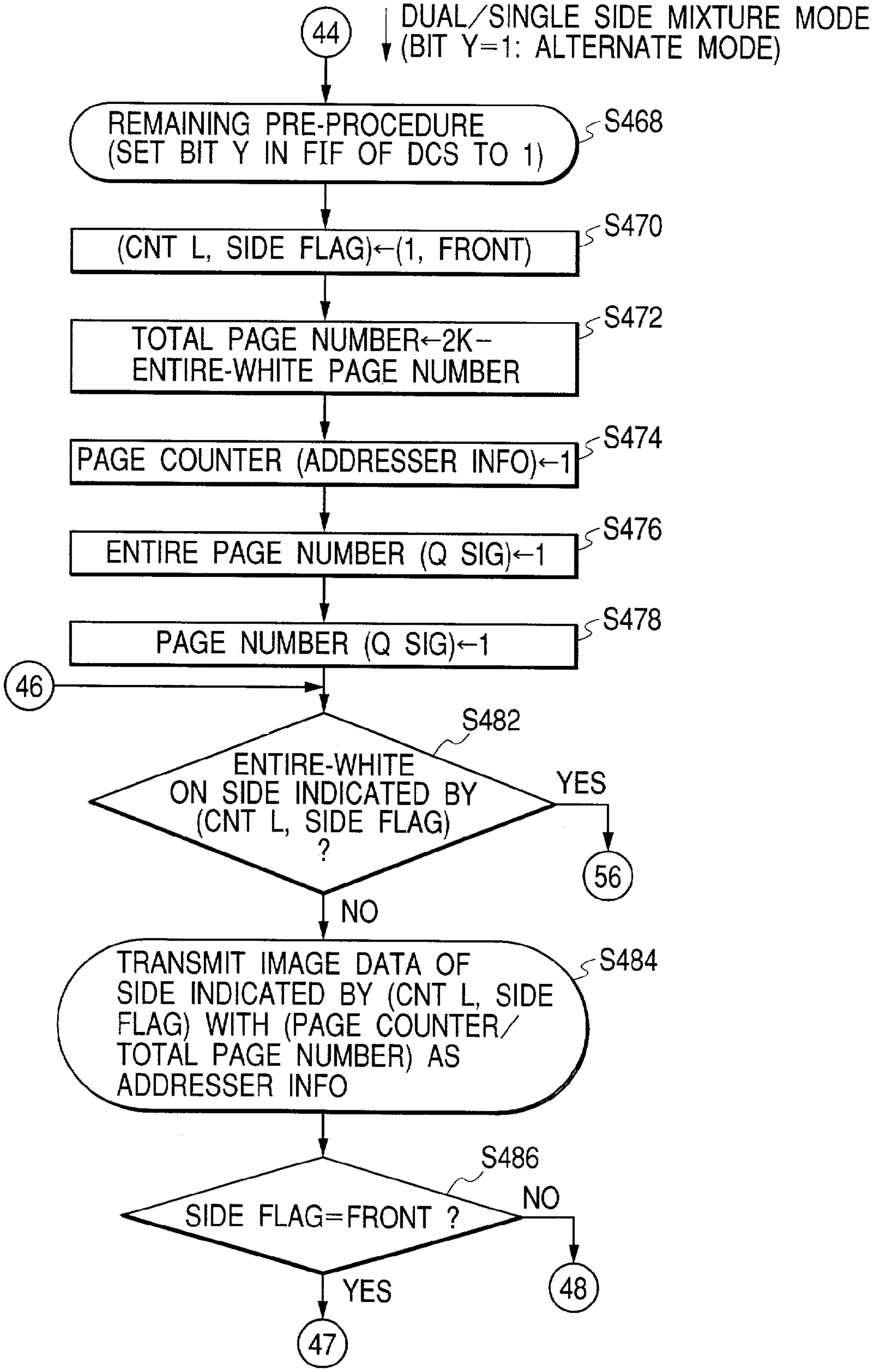
FIG. 38 is a flow chart showing transmission control of the CPU 22 of the third embodiment.

In the step S490, the side flag is set to "back", and, in a step S492, the value of the page counter is incremented by one, and the processing is looped to the step S482 (FIG. 38).

If the side flag is "back" in the step S488, in the step S494, it is judged whether there is a next page to be processed. If there is the next page, the processing goes to a step S496; whereas, if there is no next page, the processing goes to a step S514 (FIG. 40).

In the step S496, the side flag is set to "front", and, in a step S498, the value of L is incremented by one, and further, in a step S492, the value of the page number is incremented by one, and the processing is looped to the step S482 (FIG. 38).

If the side flag is "front" in the step S486, in the step S500 (PPS-)MPS signal is transmitted. Here, by the format shown in FIG. 30, the page number (PN), side information (SIDE), and the entire page number of the present invention are informed. In a step S502, the remaining intermediate procedure is carried out.

In steps S504, S506 and S508, each of the page counter, page number and entire page number are incremented by one, respectively, and, in a step S510, the side flag is set to "back", and the processing is looped to the step S482 (FIG. 38).

In a step S512, it is judged whether the transmitting number counter L is greater than the reading number counter K (already determined). Namely, it is judged whether original images corresponding to the read number are transmitted or not. If affirmative in the step S512, the processing goes to a step S514; whereas, if negative in the step S512, the processing goes to the step S518.

If there is no image to be transmitted, in the step S514, (PPS-)EOP signal is transmitted as the Q signal. Here, the page number, side information, and the entire page number of the present invention are informed.

In a step S516, the remaining facsimile post-procedure is carried out, and the processing is returned to the step S406.

On the other hand, if the image to be transmitted is remaining, in a step S518, (PPS-)MPS signal is transmitted as the Q signal. Here, by the format shown in FIG. 30, the page number, side information, and the entire page number of the present invention are informed. In a step S520, the remaining intermediate procedure is carried out.

In steps S522 and S524 and a step S526 in FIG. 41, the page counter, entire page number and page number are incremented by one, respectively. In a step S528, the side flag is set to "front", and, in a step S530, the transmitting number counter is incremented by one, and the processing is looped to the step S482 (FIG. 38), where the above-mentioned transmission processing is repeated.

On the other hand, in the step S454 in FIG. 37, if bit Y of FIF in the DIS signal obtained from the receiver side is not 1, in a step S532 in FIG. 41 and so on, dual-side or single-side transferring is effected.

First of all, in the step S532, it is judged whether bit X of FIF in the DIS signal obtained from the receiver side is 1 or not. If affirmative in the step S532, the processing goes to a step S534; whereas, if negative, the processing goes to the step S536.

In the step S534, the transmission (alternate mode) of the dual-side information is effected on the basis of the dual-side communication protocol displayed, and, in a step S536, the image data is transmitted as the single-side information. In this single-side transmission, only page information having the image signal may be transmitted. The step S538 was already explained.

On the other hand, in the step S456 in FIG. 37, if bit (Y+1) of FIF in the DIS signal obtained from the receiver side is 1, in a step S458 (FIG. 37) to a step S466 and a step S540 (FIG. 42) and so on, the transmission in the dual/single side mixture mode of the present invention is effected by using the continuous mode. Here, first of all, the effective images on the front sides are transmitted, and then, the effective images on the back sides are transmitted.

If affirmative in the step S456 in FIG. 37, i.e., if it is judged that the dual/single side mixture mode of the present invention is possible, in the step S458, the remaining facsimile pre-procedure is carried out. Here, in order to declare the transmission in the dual/single side mixture mode of the present invention (continuous mode), bit (Y+1) of FIF in the DCS signal is set to 1 and the transmission is effected (In this case, bit Y is also set to 1 due to rule of FIG. 29).

Further, in a step S460, the combination of (transmitting number counter L, side flag) is set to (to 1, front).

In a step S462, the total page number register is set to (2L−entire-white page number).

In a step S464, the page counter (counter for counting page number added to the transmitter information) is set to 1.

In a step S466, the entire page number used in the Q signal (or PPS-Q signal in ECM) is set to 1. Due to the continuity of the entire page number, page void of the image signals can be detected at the receiver side.

Figure 42:
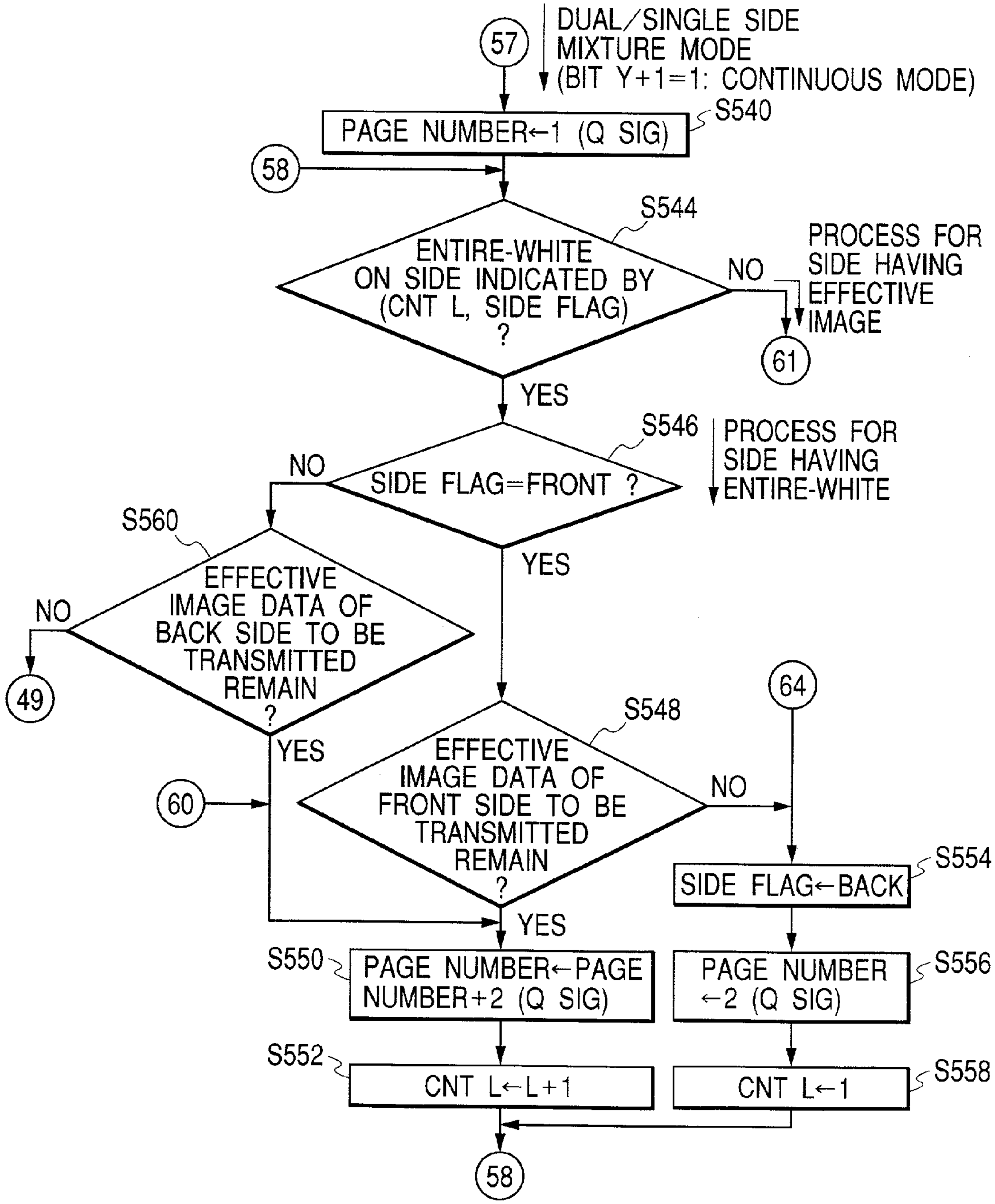
FIG. 42 is a flow chart showing transmission control effected by the CPU 22 of the third embodiment.

In a step S540 in FIG. 42, the counter of the page number (used in the Q signal) is set to 1.

Figure 43:
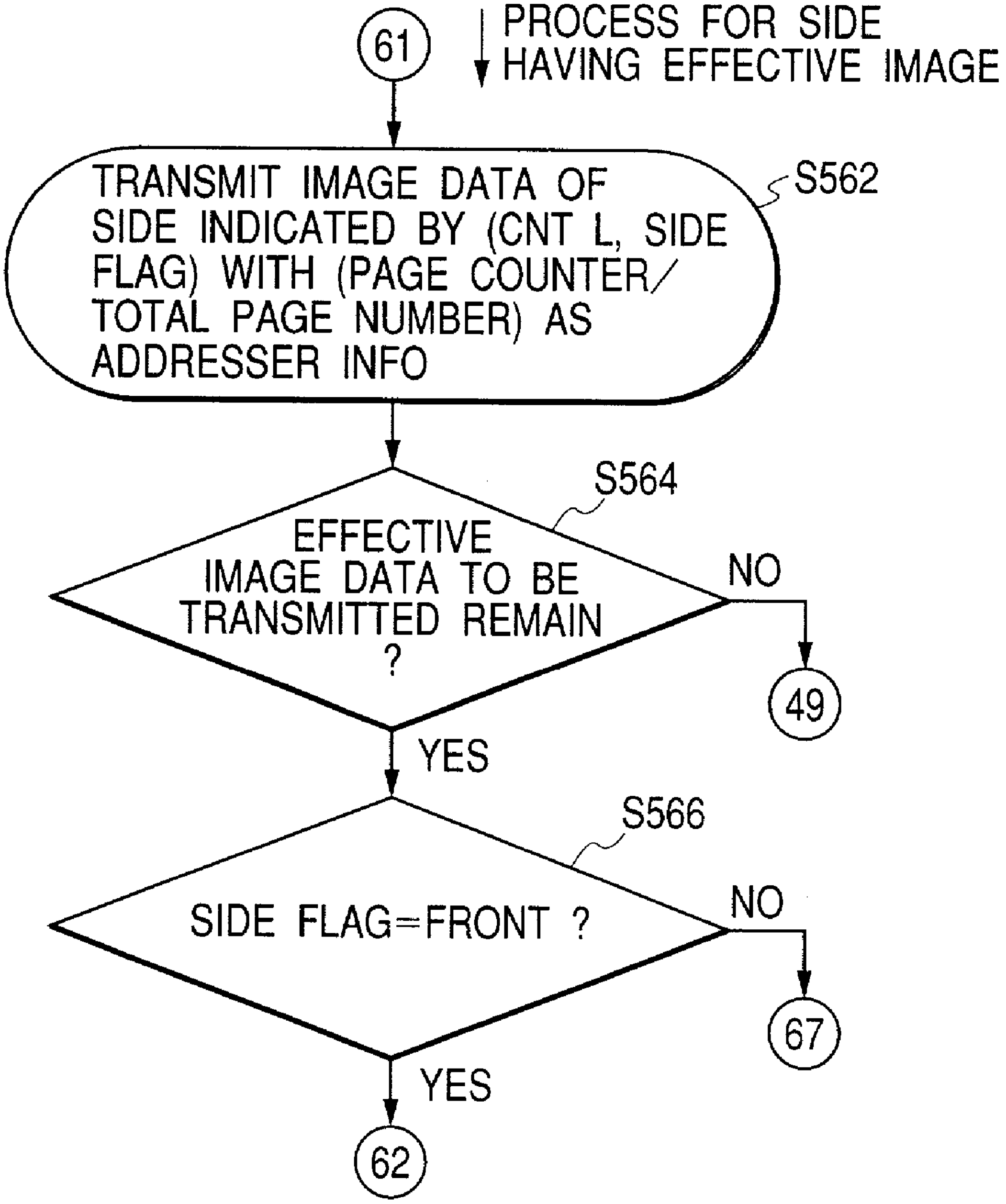
FIG. 43 is a flow chart showing transmission control effected by the CPU 22 of the third embodiment.

In a step S544, it is judged whether the image information represented by (reading number counter L, side flag) is entire-white or not. If affirmative in the step S544, the processing goes to a step S546; whereas, if negative in the step S544, the processing goes to the step S562 (FIG. 43).

In the step S546, it is judged whether the side flag is "front" or not. If affirmative in the step S546, the processing goes to a step S548; whereas, if negative in the step S546, the processing goes to a step S560.

In the step S548, it is judged whether there is effective information on the side which is not transmitted. If affirmative in the step S548, the processing goes to a step S550; whereas, if negative in the step S548, the processing goes to the step S554.

Further, in the step S560, it is judged whether there is effective image information on the back side which is not transmitted. If affirmative in the step S560, the processing goes to the step S550. If negative in the step S560, all of the (effective) images on the back sides are transmitted, and, since no image to be transmitted is remaining the processing goes to the step S514 (FIG. 40), where the (PPS-)EOP signal is transmitted.

If any image which is not transmitted is remaining in the step S548 or S560, in the step S550, the value of the page number is incremented by two. The reason is that the transmission of the front sides or the back sides is continuous in the continuous mode (refer to FIG. 50). On the other hand, in a step S552, the value of the transmitting number counter L is incremented by one.

On the other hand, if there is no effective information on the side which is not transmitted in the step S548, in order to start the transmission of the back side, in as step S554, the side flag is set to "back". Further, in a step S556, the page number is set to 2 (page number of back side always starts from 2).

Further, in a step S558, the transmitting number counter L is set to 1. That is to say, although the image data group on the back side are re-counted from 1, in the dual/single side mixture more in the continuous mode, since the last of the image data group on the front and back sides is detected in the step S548 or S560, it is not necessary that the transmitting number counter L is used in the processing.

When the step S552 or S558 is finished, the processing is looped to the step S544.

On the other hand, in the step S544, if the image information represented by (reading number counter L, side flag) is not entire-white, i.e., if the side has the effective image, in a step S562 in FIG. 43, the image data represented by (transmitting number counter L, side flag) is transmitted. Here, header regarding "page number indicated by the value of page counter/total page number" is produced as transmitter information is generated and transmitted (see FIG. 50).

In a step S564, it is judged whether there is effective image information which is not transmitted. If affirmative in the step S564, the processing goes to a step S566; whereas, if negative in the step S564, the processing goes to the step S514 (FIG. 40), where the (PPS-)EOP signal is transmitted.

In the step S566, it is judged whether the side flag is "front". If the side flag is "front", the processing goes to a step S568 in FIG. 44; whereas, if the side flag is "back", the processing goes to a step S582 in FIG. 45.

Figure 44:
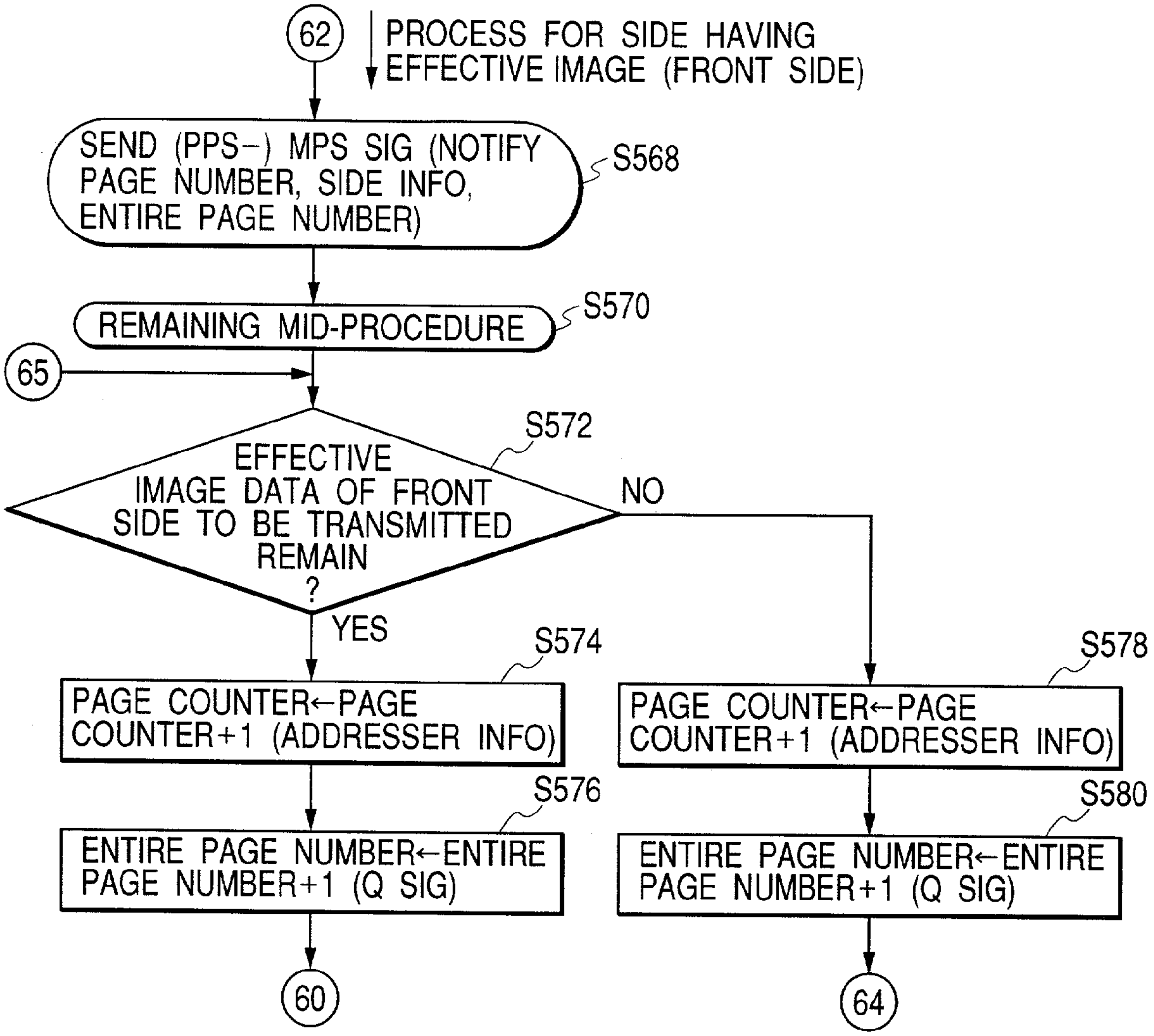
FIG. 44 is a flow chart showing transmission control effected by the CPU 22 of the third embodiment.

In the step S568 in FIG. 44, (PPS-)MPS signal is transmitted as the Q signal by the format of FIG. 30. Here, the page number, side information, and the entire page number of the present invention are informed. In a step S570, the remaining intermediate procedure is carried out.

In a step S572, it is judged whether there is effective image information on the front side which is not transmitted. If affirmative in the step S572, the processing goes to a step S574; whereas, if negative in the step S572, the processing goes to a step S578.

In steps S574 and S576, each of the page counter and the entire page number is incremented by one, respectively. After the step S576, the processing goes to the step S550.

Further, in steps S578 and S580, each of the page counter and the entire page number is incremented by one, respectively. After the step S580, the processing goes to a step S554 in FIG. 42.

In the step S566 in FIG. 43, if the side flag is "back", in a step S582 in FIG. 45, the transmission of (PPS-)MPS signal as the Q signal is carried out. Here, the page number, side information, and the entire page number of the present invention are informed by the format of FIG. 30.

In a step S584, the remaining intermediate procedure is carried out, and the processing goes to a step S572 in FIG. 44.

In the step S410 in FIG. 35, if the facsimile reception is selected, the reception processing shown in FIGS. 46 and 47 is carried out.

In the reception processing, first of all, in a step S586 in FIG. 46, CML of the NCU 2 is turned on via the bus 26, thereby connecting the telephone line 2*a* to the facsimile apparatus (hybrid circuit 6).

In a step S588, the facsimile pre-procedure is carried out. Here, bit X, bit Y, bit (X+1) and bit (Y+1) of FIF in the DIS signal are set to 1. Here, although the fact that all dual-side modes and the dual/single side mixture mode of the present invention are supported is declared, of course, in the actual article, bit patterns of bit X, bit Y, bit (X+1) and bit (Y+1) may be adjusted to declare that only required mode(s) is supported.

The following steps S590 and S594, and steps S598 and S600 in FIG. 47, bit patterns formed by bit X, bit Y, bit (X+1) and bit (Y+1) of FIF in the DCS signal received from the transmitter side are judged.

That is to say, in the step S590, it is judged whether bit X=1, bit (X+1)=0 and bit Y=0, and, in the step S594, it is judged whether bit X=1, bit (X+1)=0, bit Y=1 and bit (Y+1)=0, and, in the step S598, it is judged whether bit X=1, bit (X+1)=1 and bit Y=0, and, in the step S600, it is judged whether bit X=1, bit (X+1)=1, bit Y=1 and bit (Y+1)=1.

If either of the steps S590, S594, S598 or S600 is affirmative, the processing goes from the respective steps to a step S592 (standard alternate mode), step S596 (dual/single side mixture mode in alternate mode), step S602 (standard continuous mode) and step S604 (dual/single side mixture mode in continuous mode).

In the step S592, the image data are received in the standard alternate mode and are recorded.

In the step S596, the image data are received in the dual/single side mixture mode (alternate mode) of the present invention. In this case, by monitoring the continuity of the entire page number of the (PPS-)Q signal, the image data are received while ascertaining whether the image data become void.

In the step S602, the image data are received in the standard continuous mode and are recorded.

In the step S604, the image data are received in the dual/single side mixture mode (continuous mode) of the present invention. In this case, by monitoring the continuity of the entire page number of the (PPS-)Q signal, the image data are received while ascertaining whether the image data become void.

Figure 51:
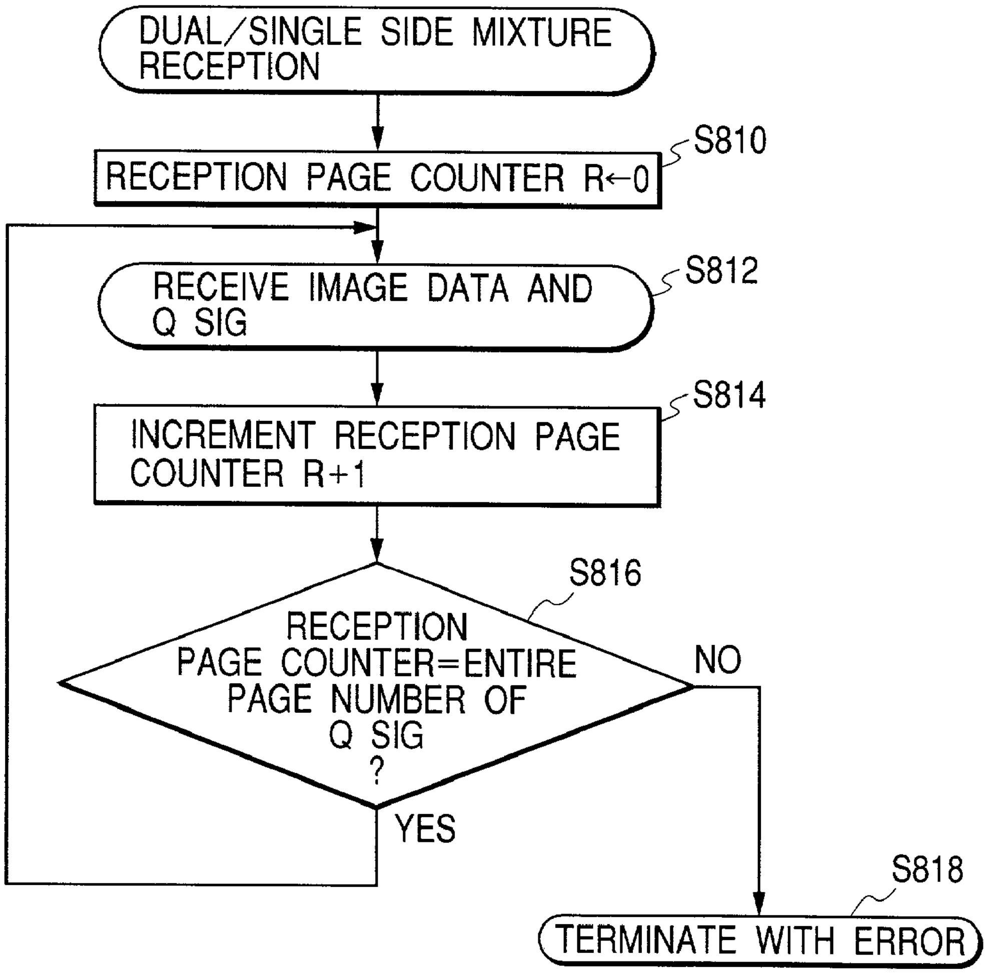
FIG. 51 is a flow chart showing an example of communication control upon reception effected by the CPU 22 of the third embodiment.

FIG. 51 shows an example of detection processing for detecting presence/absence of communication error effected by utilizing the entire page number received by the Q signal in the dual/single side mixture mode in the steps S596 and S604. FIG. 51 shows a rough flow of the reception processing in the dual/single side mixture mode in the steps S596 and S604.

In a step S810 in FIG. 51, a reception page counter R is reset to 0. In a step S812, image information corresponding to one page and the Q signal are received (refer to FIGS. 31 to 34).

In a step S814, the reception page counter R is incremented by one. And, in a step S816, it is judged whether the entire page number received by the Q signal coincides with the value of the reception page counter R. If the entire page number coincides with the value of the reception page counter R, the processing is looped to the step S8123, where the reception of the image information is continued. If the entire page number does not coincide with the value of the reception page counter R, in a step S818, the processing is terminated with error.

Further, in the steps S596 and S604, since the transmitter information including the page number produced by the transmission side on the basis of the page counter as mentioned above is transmitted as the heater information, the transmission information is recorded by the recording circuit 16 as shown in FIG. 50. The recording page positions and recorded sides of the received image data can be determined in the conventional manner on the basis of the page number (PN) received by the Q signal and the page information (SIDE).

Incidentally, in the above-mentioned construction, while an example that the page number used as the transmitter information is produced on the basis of the page counter increased (increment) simultaneously with the counter of the entire page number was explained, since the value of the page counter coincides with the entire page number, the page number may be produced by using the value of the counter of the entire page number.

In this way, in the dual/single side mixture mode, the transmission of the entire-white sides can be omitted, the page-to-page procedure which was required in the prior art can be reduced, the communication time can be shortened, and the communication cost can be reduced.

In addition, in the dual/single side mixture mode according to the illustrated embodiment, since clear declaration between the transmitter and the receiver is effected by newly adding bit Y and bit (Y+1) to the DIS/DTS/DCS signals and such mode is executed only when the transmitter and the receiver have the same functions, the communication exchangeability is not deteriorated.

Further, by transmitting the entire page number to the Q signal such as (PPS-)MPS or (PPS-)EOP and by monitoring the continuity of the entire page number at the receiver side, the original images including the dual/single side mixture can be transferred positively while ascertaining whether error such as void of the image data occurs.

Further, since the page counter is incremented whenever the effective image information is transmitted (no increment regarding the entire-white side which is not transmitted) and is transmitted together with the effective image information and is recorded at the receiver side, unlike to the prior art, the header information is not recorded on the entire-white page and the page number of the header information does not become the value also including the entire-white pages, the natural transmitter information can be recorded without affording the strange impression to the user at the receiver side.

In the above explanation, while the facsimile exclusive machine was described, the present invention is not limited to the facsimile exclusive machine but can be applied to other types of facsimile apparatuses. For example, the present invention can be applied to an arrangement in which a FAX MODEM is externally or internally mounted to a general-purpose terminal such as a personal computer and facsimile communication is effected by software control. In this case, a control program of the present invention can be stored in and supplied from not only the above-mentioned ROM 24 but also any computer readable storing medium such as a hard disk, a floppy disk, an optical disk, a magneto-optical disk or a memory card. Further, it should be noted that the present invention can also be applied to a so-called digital composite machine in which a FAX communication interface or a network interface is mounted to an image forming apparatus.

What is claimed is:

1. A facsimile apparatus capable of using dual-side communication for communicating dual-side image information between a transmitter and a receiver, comprising:

communication means for effecting communication of image information; and informing means for informing of presence/absence of image information transmission of which is omitted, by an intermediate procedure signal transmitted from said transmitter to said receiver, wherein the intermediate procedure signal is a Q signal or a PPS-Q signal.

2. A facsimile apparatus according to claim 1, further comprising reception means as said communication means, and judging means for judging communication error by judging which page is not transmitted by said transmitter by means of said informing means.

3. A facsimile apparatus according to claim 1, further comprising reception means as said communication means, and recording means for effecting dual-side recording by judging which page is not transmitted by said transmitter by means of said informing means.

4. A facsimile apparatus according to claim 1, further comprising transmission means as said communication means, and counting means for counting entire page number of only the image information transmitted by said transmission means, wherein said informing means informs of the entire page number counted by said counting means, by the intermediate procedure signal.

5. A facsimile apparatus according to claim 1, further comprising reception means as said communication means, and detection means for detecting presence/absence of communication error by monitoring continuity of the informed entire page number wherein said informing means is informed of entire page number in which only the image information transmitted is counted, from said transmitter by the intermediate procedure signal.

6. A facsimile apparatus according to claim 1, wherein said transmitter includes reading means for reading image information from both sides of an original, and if the image information read from a back side of the original is substantially entire-white, the transmission of the image information on the back side is omitted by using the procedure signal.

7. A facsimile apparatus according to claim 1, wherein negotiation whether or not a dual/single side mixture mode is used is effected between said transmitter and said receiver by using a facsimile procedure signal, and only when both said transmitter and said receiver have the same mode, transmission and reception of the image information in said mode are effected.

8. A facsimile apparatus according to claim 7, wherein said receiver informs said transmitter of presence/absence of a function for receiving dual/single side mixture image information by using a DIS signal, and said transmitter designates, to said receiver, the fact that the dual/single side mixture image information is transmitted, by using a DCS signal.

9. A facsimile apparatus according to claim 1, further comprising:

means for informing of presence/absence of a function for receiving dual/single side mixture image information in an alternate mode in which images on front sides of originals and images on back sides of the originals are alternately received, from said receiver to said transmitter;

means for informing of presence/absence of a function for receiving dual/single side mixture image information in a continuous mode in which all of images on front sides of originals are received and then all of images on back sides of the originals are received, from said receiver to said transmitter;

means for designating that the dual/single side mixture image information is transmitted in the alternate mode in which the images on the front sides of the originals and the images on the back sides of the originals are alternately received, from said transmitter to said receiver; and means for designating that the dual/single mixture image information is transmitted in the continuous mode in which all of the images on the front sides of the originals are received and then all of the images on the back sides of the originals are received, from said receiver to said transmitter.

10. A facsimile apparatus according to claim 1, wherein said communication means transmits the image information on all of front sides and said, informing means omits transmission of the image information on a back side based on the Q signal or the PPS-Q signal of the image information on the front side.

11. A facsimile apparatus according to claim 10, wherein, even when transmission and reception of the image information on a back side regarding a single-side image are omitted, said transmitter and said receiver are caused to transmit and receive page number and front/back discrimination information transmitted and received by a post message signal in the same manner as when the transmission and the reception of the back side regarding images on respective sides to be transmitted and received are not omitted.

12. A facsimile apparatus according to claim 1, further comprising header control means for effecting control in such manners that header information (transmitter information) regarding a back side transmission/reception of which is omitted is not recorded at a receiver side, and that, regarding page number recorded at the receiver side as the header information, page number of only effective image information is counted and the image information of the back side the transmission/reception of which is omitted is not counted.

13. A facsimile method capable of using dual-side communication for communicating dual-side image information between a transmitter and a receiver, comprising:

a communicating step for effecting communication of image information; and an informing step for informing of presence/absence of image information transmission of which is omitted, by an intermediate procedure signal transmitted from said transmitter to said receiver, wherein the intermediate procedure signal is a Q signal or a PPS-Q signal.

14. A facsimile method according to claim 13, wherein said communicating step transmits the image information on all of front sides and said informing step omits transmission of the image information on a back side based on the Q signal or the PPS-Q signal of the image information on the front side.

15. A facsimile method according to claim 14, wherein, even when transmission and reception of the image information on a back side regarding a single-side image are omitted, said transmitter and said receiver are caused to transmit and receive page number and front/back discrimination information transmitted and received by a post message signal in the same manner as when the transmission and the reception of the back side regarding images on respective sides to be transmitted and received are not omitted.

16. A facsimile method according to claim 13, wherein negotiation whether or not a dual/single side mixture mode is used is effected between said transmitter and said receiver by using a facsimile procedure signal, and only when both said transmitter and said receiver have the same mode, transmission and reception of the image information in said mode are effected.

17. A facsimile method according to claim 16, wherein said receiver informs said transmitter of presence/absence of a function for receiving dual/single side mixture image information by using a DIS signal, and said transmitter designates, to said receiver, the fact that the dual/single side mixture image information is transmitted, by using a DCS signal.

18. A facsimile method according to claim 13, further comprising a reception step as said communicating step, and a judging step for judging communication error by judging which page is not transmitted by said transmitter by means of said informing step.

19. A facsimile method according to claim 13, further comprising a reception step as said communicating step, and a recording step for effecting dual-side recording by judging which page is not transmitted by said transmitter by means of said informing step.

20. A facsimile method according to claim 13, further comprising a transmission step as said communicating step, and a counting step for counting entire page number of only the image information transmitted in said transmission step, wherein said informing step informs of the entire page number counted in said counting step, by the intermediate procedure signal.

21. A facsimile method according to claim 13, further comprising a reception step as said communicating step, and a detecting step for detecting presence/absence of communication error by monitoring continuity of the informed entire page number wherein said informing step is informed of entire page number in which only the image information transmitted is counted, from said transmitter by the intermediate procedure signal.

22. A facsimile method according to claim 13, wherein said transmitter includes a reading step for reading image information from both sides of an original, and if the image information read from a back side of the original is substantially entire-white, the transmission of the image information on the back side is omitted by using the procedure signal.

23. A facsimile method according to claim 13, further comprising the steps of:

informing of presence/absence of a function for receiving dual/single side mixture image information in an alternate mode in which images on front sides of originals and images on back sides of the originals are alternately received, from said receiver to said transmitter;

informing of presence/absence of a function for receiving dual/single side mixture image information in a continuous mode in which all of images on front sides of originals are received and then all of images on back sides of the originals are received, from said receiver to said transmitter;

designating that the dual/single side mixture image information is transmitted in the alternate mode in which the images on the front sides of the originals and the images on the back sides of the originals are alternately received, from said transmitter to said receiver; and designating that the dual/single side mixture image information is transmitted in the continuous mode in which all of the images on the front sides of the originals are received and then all of the images on the back sides of the originals are received, from said receiver to said transmitter.

24. A facsimile method according to claim 13, further comprising a header controlling step for effecting control in such manners that header information (transmitter information) regarding a back side transmission/reception of which is omitted is not recorded at a receiver side, and that, regarding page number recorded at the receiver side as the header information, page number of only effective image information is counted and the image information of the back side the transmission/reception of which is omitted is not counted.

25. A program stored on a computer readable medium for controlling a facsimile apparatus capable of using dual-side communication for communicating dual-side image information between a transmitter and a receiver, comprising:

a communicating step for effecting communication of image information; and an informing step for informing of presence/absence of image information transmission of which is omitted, by an intermediate procedure signal transmitted from said transmitter to said receiver, wherein the intermediate procedure signal is a Q signal or a PPS-Q signal.

26. A program stored on a computer readable medium according to claim 25, wherein said communicating step transmits the image information on all of front sides and said informing step omits transmission of the image information on a back side based on the Q signal or the PPS-Q signal of the image information on the front side.

27. A program stored on a computer readable medium according to claim 26, wherein, even when transmission and reception of the image information on a back side regarding a single-side image are omitted, said transmitter and said receiver are caused to transmit and receive page number and front/back discrimination information transmitted and received by a post message signal in the same manner as when the transmission and the reception of the back side regarding images on respective sides to be transmitted and received are not omitted.

28. A program stored on a computer readable medium according to claim 25, wherein negotiation whether or not a duall/single side mixture mode is used is effected between said transmitter and said receiver by using a facsimile procedure signal, and only when both said transmitter and said receiver have the same mode, transmission and reception of the image information in said mode are effected.

29. A program stored on a computer readable medium according to claim 28, wherein said receiver informs said transmitter of presence/absence of a function for receiving dual/single side mixture image information by using a DIS signal, and said transmitter designates, to said receiver, the fact that the dual/single side mixture image information is transmitted, by using a DCS signal.

30. A program stored on a computer readable medium according to claim 25, further comprising a reception step as said communicating step, and a judging step for judging communication error by judging which page is not transmitted by said transmitter by means of said informing step.

31. A program stored on a computer readable medium according to claim 25, further comprising a reception step as said communicating step, and a recording step for effecting dual-side recording by judging which page is not transmitted by said transmitter by means of said informing step.

32. A program stored on a computer readable medium according to claim 25, further comprising a transmission step as said communicating step, and a counting step for counting entire page number of only the image information transmitted in said transmission step, wherein said informing step informs of the entire page number counted in said counting step, by the intermediate procedure signal.

33. A program stored on a computer readable medium according to claim 25, further comprising a reception step as said communicating step, and a detecting step for detecting presence/absence of communication error by monitoring continuity of the informed entire page number wherein said informing step is informed of entire page number in which only the image information transmitted is counted, from said transmitter by the intermediate procedure signal.

34. A program stored on a computer readable medium according to claim 25, wherein said transmitter includes a reading step for reading image information from both sides of an original, and if the image information read from a back side of the original is substantially entire-white, the transmission of the image information on the back side is omitted by using the procedure signal.

35. A program stored on a computer readable medium according to claim 25, further comprising the steps of:

informing of presence/absence of a function for receiving dual/single side mixture image information in an alternate mode in which images on front sides of originals and images on back sides of the originals are alternately received, from said receiver to said transmitter;

informing of presence/absence of a function for receiving dual/single side mixture image information in a continuous mode in which all of images on front sides of originals are received and then all of images on back sides of the originals are received, from said receiver to said transmitter;

designating that the dual/single side mixture image information is transmitted in the alternate mode in which the images on the front sides of the originals and the images on the back sides of the originals are alternately received, from said transmitter to said receiver; and designating that the dual/single side mixture image information is transmitted in the continuous mode in which all of the images on the front sides of the originals are received and then all of the images on the back sides of the originals are received, from said receiver to said transmitter.

36. A program stored on a computer readable medium according to claim 25, further comprising a header controlling step for effecting control in such manners that header information (transmitter information) regarding a back side transmission/reception of which is omitted is not recorded at a receiver side, and that, regarding page number recorded at the receiver side as the header information, page number of only effective image information is counted and the image information of the back side the transmission/reception of which is omitted is not counted.

* * * * *

UNITED STATES PATENT AND TRADEMARK OFFICE

CERTIFICATE OF CORRECTION

PATENT NO. : 7,085,019 B2
APPLICATION NO. : 10/106767
DATED : August 1, 2006
INVENTOR(S) : Takehiro Yoshida et al.

It is certified that error appears in the above-identified patent and that said Letters Patent is hereby corrected as shown below:

ON THE TITLE PAGE ITEM [56] REFERENCES CITED:

Foreign Patent Documents, "02003134316" should read --2003-134316--.

COLUMN 5:

Line 61, "page, and" should read --page, . . . and--.

COLUMN 7:

Line 4, "massage" should read --message--;
Line 10, "massage" should read --message--;
Line 12, "massage" should read --message--; and
Line 24, "massage" should read --message--.

COLUMN 8:

Line 27, "massage" should read --message--.

COLUMN 10:

Line 5, "pate" should read --page--.

COLUMN 11:

Line 31, "if" should read --if the receiver--; and
Line 38, "if" should read --if the receiver--.

COLUMN 12:

Line 55, "step." should read --step--.

COLUMN 15:

Line 21, "sow" should read --show--.

COLUMN 17:

Line 12, "number" should read --number of--.

UNITED STATES PATENT AND TRADEMARK OFFICE
CERTIFICATE OF CORRECTION

PATENT NO. : 7,085,019 B2 
APPLICATION NO. : 10/106767
DATED : August 1, 2006
INVENTOR(S) : Takehiro Yoshida et al.

It is certified that error appears in the above-identified patent and that said Letters Patent is hereby corrected as shown below:

COLUMN 18:

Line 37, “informediate” should read --intermediate--.

COLUMN 20:

Line 6, “the,” should read --the--.

COLUMN 21:

Line 54, “front-0, back-l)” should read --front=0, back=l)--.

COLUMN 22:

Line 42, “(multipage” should read --(multi-page--.

COLUMN 24:

Line 45, “OF” should read --OFF--.

COLUMN 26:

Line 46, “(to 1,” should read --(1,--.

COLUMN 27:

Line 58, “(to 1,” should read --(1,--.

COLUMN 29:

Line 37, “(to 1,” should read --(1,--.

COLUMN 30:

Line 1, “remaining” should read --remaining,--.

COLUMN 34:

Line 24, “said,” should read --said--; and
Line 45, “the” should read --of the--.

UNITED STATES PATENT AND TRADEMARK OFFICE

CERTIFICATE OF CORRECTION

PATENT NO. : 7,085,019 B2 
APPLICATION NO. : 10/106767
DATED : August 1, 2006
INVENTOR(S) : Takehiro Yoshida et al.

It is certified that error appears in the above-identified patent and that said Letters Patent is hereby corrected as shown below:

COLUMN 36:

Line 17, “the” should read --of the--; and
Line 49, “duall/single” should read --dual/single--.

COLUMN 38:

Line 28, “the” (second occurrence) should read --of the--.

Signed and Sealed this

Twelfth Day of June, 2007

JON W. DUDAS
*Director of the United States Patent and Trademark Office*